US012767494B2

(12) United States Patent
Hamon

(10) Patent No.: US 12,767,494 B2
(45) Date of Patent: Oct. 20, 2026

(54) LADDER HOIST AND CART SYSTEM

(71) Applicant: MulePro Industries LLC, Benbrook, TX (US)

(72) Inventor: Richard A. Hamon, Benbrook, TX (US)

(73) Assignee: MulePro Industries LLC, Benbrook, TX (US)

( * ) Notice: Subject to any disclaimer, the term of this patent is extended or adjusted under 35 U.S.C. 154(b) by 222 days.

(21) Appl. No.: 18/709,352

(22) PCT Filed: Nov. 11, 2022

(86) PCT No.: PCT/US2022/049659
§ 371 (c)(1),
(2) Date: May 10, 2024

(87) PCT Pub. No.: WO2023/086541
PCT Pub. Date: May 19, 2023

(65) Prior Publication Data

US 2025/0340407 A1 Nov. 6, 2025

Related U.S. Application Data

(63) Continuation-in-part of application No. 17/883,110, filed on Aug. 8, 2022, now Pat. No. 12,252,936, and (Continued)

(51) Int. Cl.
*B66C 23/16* (2006.01)
*E06C 7/12* (2006.01)

(52) U.S. Cl.
CPC .............. *B66C 23/166* (2013.01); *E06C 7/12* (2013.01)

(58) Field of Classification Search
CPC ........... B62B 1/14; B62B 5/0023; B62B 5/06; B62B 2206/006; B62B 2203/00; E06C 7/12; B66D 1/60; B66D 2700/0116
See application file for complete search history.

(56) References Cited

U.S. PATENT DOCUMENTS 2,576,755 A 11/1951 Gaskins et al.
2,856,018 A 10/1958 Fegel
(Continued)

FOREIGN PATENT DOCUMENTS

AT 9638 B 1/2008
FR 2658804 A1 4/1992
(Continued)

OTHER PUBLICATIONS

Office Action dated Feb. 25, 2025 from U.S. Appl. No. 17/869,625.
(Continued)

*Primary Examiner* — Toan C To
(74) *Attorney, Agent, or Firm* — James E. Walton

(57) ABSTRACT

A tool cart and ladder hoist system for providing a safe and efficient manner for carrying tools. The tool cart includes a tool compartment, a hoist ring, at least one wheel, and at least one support strap. The tool cart is defined by a pair of side walls, a back wall, a handle portion, and a base. The ladder hoist component includes a winch casing, a removable carrier casing, and at least one fastener pin. The ladder hoist component interacts with the hoist ring to provide a method for lifting tools. The tool cart may also include compartments for carrying and housing various tank components.

5 Claims, 67 Drawing Sheets

Related U.S. Application Data a continuation-in-part of application No. 17/869,625, filed on Jul. 20, 2022, now Pat. No. 12,459,104, and a continuation-in-part of application No. 17/869,651, filed on Jul. 20, 2022, now Pat. No. 12,096,841.

(60) Provisional application No. 63/319,713, filed on Mar. 14, 2022, provisional application No. 63/294,600, filed on Dec. 29, 2021, provisional application No. 63/286,040, filed on Dec. 5, 2021, provisional application No. 63/279,061, filed on Nov. 12, 2021, provisional application No. 63/279,058, filed on Nov. 12, 2021.

(56) References Cited

U.S. PATENT DOCUMENTS 2,964,328 A 12/1960 Muir
3,827,707 A 8/1974 Bierman
3,885,722 A 5/1975 Robertson
3,915,432 A 10/1975 Bustamante
3,998,476 A 12/1976 Kazmark, Sr.
4,145,028 A 3/1979 Kelley et al.
4,253,716 A 3/1981 Turner, Jr.
4,438,764 A 3/1984 Eppolito
4,614,331 A 9/1986 Simon
4,623,124 A 11/1986 Lewis
4,688,657 A 8/1987 Erickson
4,694,934 A 9/1987 Erickson
4,917,401 A 4/1990 Iwaki
D320,879 S 10/1991 Tsai
5,333,885 A 8/1994 Pullman
5,370,263 A 12/1994 Brown
5,396,885 A 3/1995 Nelson
5,419,569 A 5/1995 Walla
5,431,428 A 7/1995 Marchwiak et al.
5,447,216 A 9/1995 Freyvogel
5,474,278 A 12/1995 Cleveland
5,564,720 A 10/1996 Stringer
5,769,431 A 6/1998 Cordova
5,799,958 A 9/1998 Bishop
5,803,694 A 9/1998 Steele
5,829,585 A 11/1998 Kao et al.
5,947,351 A 9/1999 Garofalo et al.
6,070,888 A * 6/2000 Wang .................. A45C 13/262
280/37
6,499,610 B2 12/2002 Spitsbergen
6,945,438 B1 9/2005 Shih et al.
6,969,090 B1 11/2005 Works
7,143,912 B2 12/2006 Caneba
7,246,805 B2 7/2007 Neal
7,431,313 B1 10/2008 Torres et al.
7,438,084 B2 10/2008 Trettin et al.
7,913,978 B1 * 3/2011 Trihey .................. B66D 3/006
254/323
7,942,429 B2 5/2011 Hill
8,035,525 B2 10/2011 Noonchester
8,132,819 B2 3/2012 Landau et al.
8,226,092 B2 * 7/2012 Oliver ...................... B62B 1/14
280/35
8,240,683 B1 * 8/2012 Haslup, Sr. .............. B62B 1/14
280/47.27
8,262,108 B2 9/2012 Al-Hasan
8,641,056 B1 2/2014 Carter
8,915,504 B1 12/2014 Seibert
9,616,562 B2 4/2017 Hoppe et al.
10,315,841 B2 * 6/2019 Georgas ............... B65F 1/1452
10,421,651 B1 9/2019 Coleman et al.
10,683,199 B2 6/2020 Stumpf
10,730,542 B1 8/2020 Guirlinger
10,738,533 B2 8/2020 Weyrauch et al.
11,317,700 B2 5/2022 Boyd
11,400,850 B1 * 8/2022 Curtis, III ................ B66F 9/18
11,505,226 B1 * 11/2022 Taranto .................... B62B 1/12
11,882,922 B2 1/2024 Joko et al.
11,897,533 B2 2/2024 Bradley et al.
12,012,140 B2 6/2024 Marchal et al.
12,252,936 B2 * 3/2025 Hamon .................... B62B 1/14
12,459,104 B2 * 11/2025 Hamon ................. B25H 3/022
2003/0019689 A1 1/2003 Dorsett
2004/0084880 A1 5/2004 Kim
2004/0129602 A1 7/2004 Sapyta
2004/0144606 A1 7/2004 Han
2005/0017467 A1 1/2005 Edwards
2005/0217025 A1 * 10/2005 Barattia ............... A61G 7/1046
5/81.1 R
2005/0230340 A1 10/2005 Barger, Sr. et al.
2006/0226619 A1 10/2006 Sadow
2006/0261567 A1 11/2006 Knox et al.
2007/0045973 A1 * 3/2007 Grosso .................. A01K 97/08
280/47.26
2007/0145700 A1 6/2007 Ambrose
2007/0194543 A1 8/2007 Duvigneau
2008/0042379 A1 2/2008 Amran
2009/0229914 A1 9/2009 Liles
2011/0264014 A1 10/2011 Angold
2013/0026726 A1 1/2013 Thomas
2013/0161917 A1 * 6/2013 Trapnell .................... B62B 1/14
280/47.29
2013/0213920 A1 8/2013 Oliver et al.
2014/0084229 A1 3/2014 Morrison
2014/0246271 A1 * 9/2014 Davies ...................... E06C 7/48
182/103
2015/0251680 A1 9/2015 Carter
2015/0300090 A1 * 10/2015 Strand ....................... E06C 7/12
182/103
2019/0233266 A1 8/2019 Delaney et al.
2022/0363523 A1 * 11/2022 Marshall, III ........... B66D 1/60
2022/0371637 A1 * 11/2022 Wallace .................... B62B 1/14

FOREIGN PATENT DOCUMENTS

GB 2216862 A 10/1989
JP 2019094145 A 6/2019
KR 101500525 B1 3/2015
NO 309465 B1 2/2001
SE 443555 B 3/1986
WO 0135736 A1 5/2001
WO 2019102078 A1 5/2019

OTHER PUBLICATIONS

Office Action issued by the USPTO dated Jun. 20, 2025 for U.S. Appl. No. 17/869,625.
Amendment After Final Office Action dated Jun. 25, 2025 for U.S. Appl. No. 17/869,625.
Notice of Allowance issued by the USPTO dated Jul. 11, 2025 for U.S. Appl. No. 17/869,625.
Amendment dated Jun. 13, 2024 from U.S. Appl. No. 17/869,651.
Notice of Allowance dated Jul. 31, 2024 from U.S. Appl. No. 17/869,651.
Office Action dated Mar. 22, 2024 from U.S. Appl. No. 17/883,110.
Internet Advertisement from unknown date, located on Google Shopping.
Office Action dated Sep. 28, 2023 from U.S. Appl. No. 17/869,651.
Office Action dated Oct. 12, 2023 from U.S. Appl. No. 17/869,651.
Office Action dated Mar. 13, 2024 from U.S. Appl. No. 17/869,651.
International Search Report dated Apr. 18, 2023 from International Appl. No. PCT/US2022/049659.
International Preliminary Report on Patentability dated Jun. 20, 2024 from International Appl. No. PCT/US2022/049659.

* cited by examiner

LADDER HOIST AND CART SYSTEM

1. FIELD OF THE INVENTION

The present application relates in general to tool carrying systems. In particular, the present application related to carrying system.

2. DESCRIPTION OF RELATED ART

It is common that buildings contain air conditioning, heating, and refrigeration equipment outside on top of the roof of the buildings themselves. Also, not every building has an easy access to allow users, such as commercial and industrial technicians, to get up onto the roof. Some have stairs, externally located building side ladders, internal building ladders that lead up through roof hatches, and some have no roof access stairs or ladders at all. This creates the present problem when the equipment on the roof needs maintenance or repair and the tools and equipment needed to repair them have to be physically transported up onto the roof and to the equipment. There might also be situations where firefighters, paramedics, police, or other individuals might need to bring equipment onto the roof as well and they will face the same hardships. The overall safety and physical strain put on the user when getting the tools and equipment up onto and off of the top of the roof and to the equipment is the main concern here. At the moment with the prior art, a user can only get the equipment up onto and off of the roof of a building by either dangerously single handedly carrying the equipment up and down the ladders and stairs of a building, or by dangerously tying a rope to the equipment with no known or secure place to connect the rope to on the roof.

At times an individual user will have to take multiple trips up and down ladders or stairs given the large number of tools and other equipment needed in order to repair this type of equipment on roofs. This creates an even more significant amount of danger and physical stress to the user as the individual has to climb and descend the ladder or stairs multiple times while carrying the heavy equipment. The strain comes from the individual user climbing the ladder with heavy equipment and with bringing the heavy equipment to the location itself. Individual users will typically use one hand to carry their tools or bags from their vehicle all the way up the ladder which leaves an uneven strain on the individual. This puts more strain on one side of the body over the other and the individual will deal with pain over time because of this. Also, not every roof has locations where a user can safely and securely attach a rope to the roof and the object they wish to hoist. Without this security there is a chance the objects might not make it onto the roof and could become undone in transit which could be catastrophic.

The safety and physical stress of the individuals while working on these projects should be preserved but the current method of carrying up the equipment as the person single handedly goes up a ladder or stairs, or roping up the heavy equipment with no known secure place to connect a rope or rope clip to, and then when on the roof having to hand carry all the equipment and tools to the unit does not preserve this. There have been some improvements to this by using ropes or hoisting systems to lift the equipment as this will decrease the safety risk. However, there are still numerous concerns on the safety and physical strain that is put on the individuals in this work.

Although there are some methods of carrying equipment to job sites that require the use of ladders and multiple dollies, many shortcomings still remain.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

Figure 1:
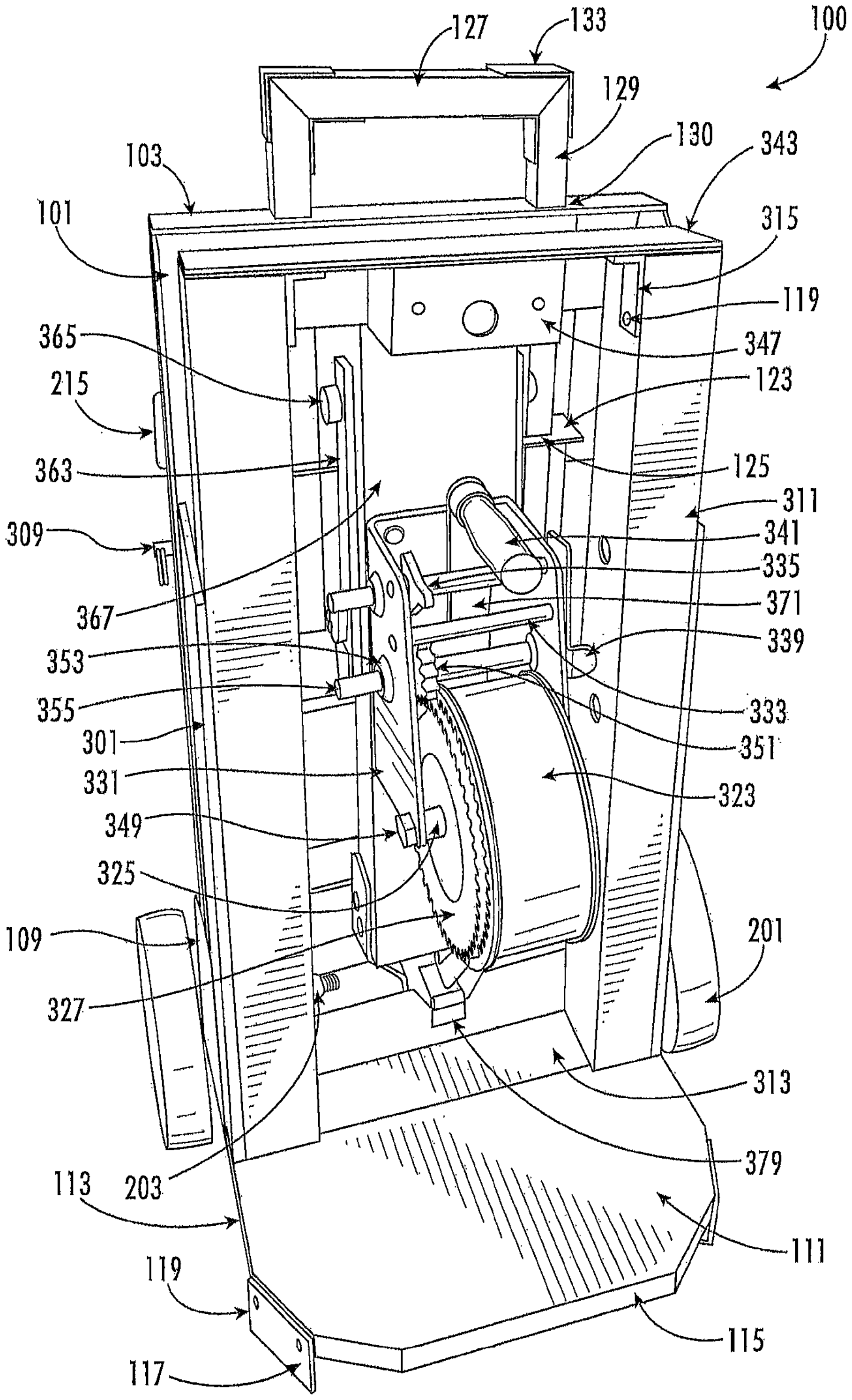
FIG. 1 is a perspective view of a building ladder hoist according to a preferred embodiment the present invention.

While the assembly of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the barrier film with features including mobility, adjustability, adaptability, and unhindered dispensing are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The embodiments described in the following paragraphs are configured for compatibility and interchangeability with each other, although many components are illustrated in individual embodiments for ease of description. It should be appreciated that any combination of the herein described elements may be used while maintaining the intended form of the present invention.

Referring now to FIG. 1 in the drawings, a building ladder hoist 100 is illustrated according to a preferred embodiment of the present invention. The structure of building ladder hoist 100 is split between removable dolly carrier/casing 200 and winch casing 300. FIG. 1 shows that removable dolly carrier/casing 200 comprises side walls 101, top plate 103, side supports 109, dolly base 111, dolly side wall 113, segmented dolly front wall 115, support tab 117, fasteners 119, supports 123, supports slot 125, handle 127, handle bars 129, handle supports 133, wheels 201, axles 203, and security strap 215. FIG. 1 shows that the winch casing 300 comprises side plate 301, fastener pin 309, end walls 311, base plate 313, side supports 315, winch strap 323, winch axle 325, main winch gear 327, winch outer plate 329, winch base 331, winch support bar 333, outer winch gear 335, rotational security bar 339, winch handle 341, upper top plate 343, lower top plate 345, support box 347, axle fastener 349, inner winch gear 351, winch handle tab base 353, winch handle tab 355, boom support bar 363, boom safety stop fasteners 365, boom 367, winch handle bar 371, and boom security tab 379. FIG. 1 shows how removable dolly carrier/casing 200 and winch casing 300 will be enjoined together in a way that will be easy for an individual to tow building ladder hoist 100 in its entirety. It is important that an individual will be able to swiftly and efficiently set up this equipment which is why winch casing 300 is designed to be easily disengaged from removable dolly carrier/casing 200. This allows the user to slide winch casing 300 off of carrier casing 200, which allows the user to easily and quickly get the dolly carrier/casing 200 and straps out of the way so winch hoist 300 can be easily installed on a building ladder.

Figure 2:
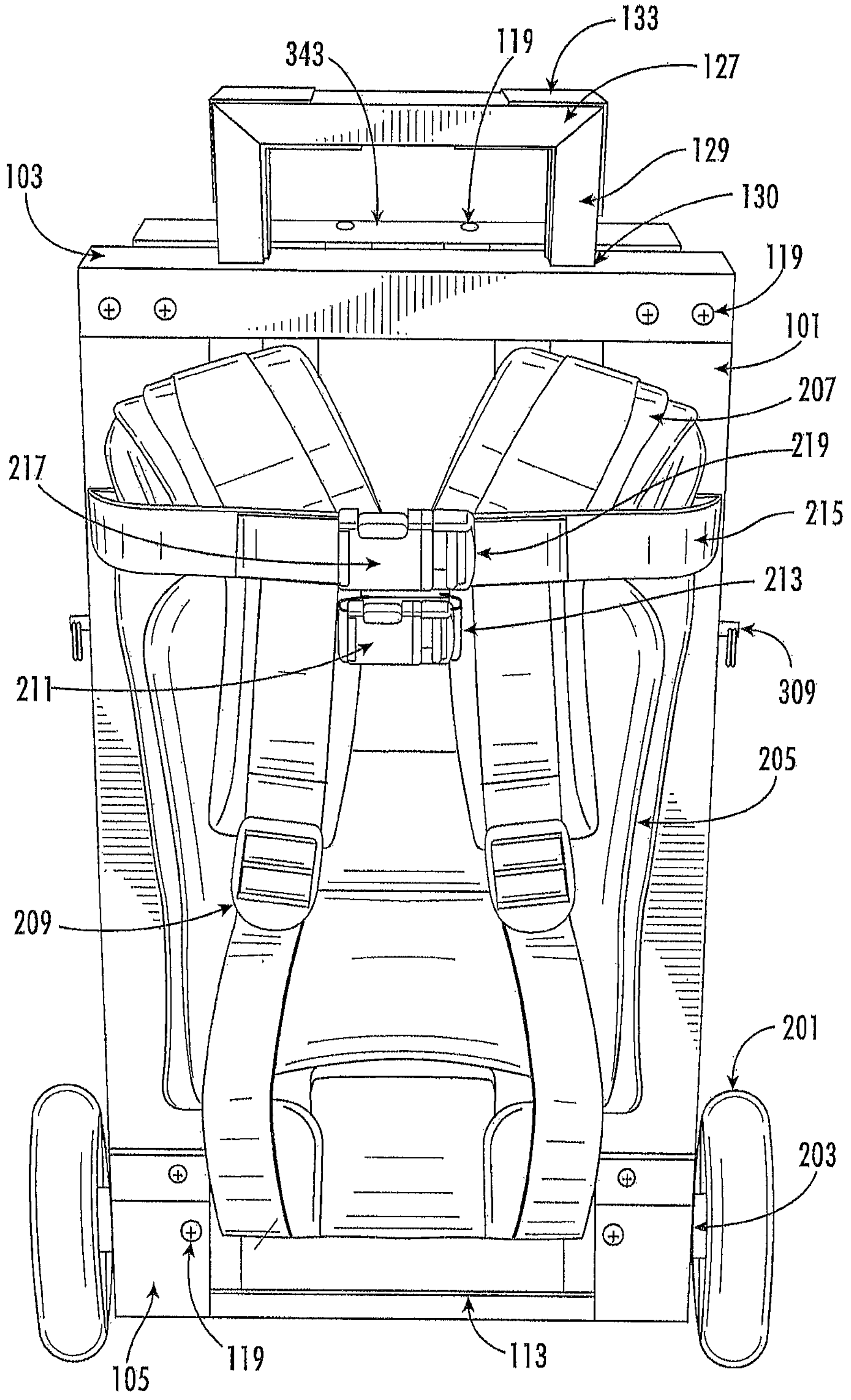
FIG. 2 is a rear view of the building ladder hoist of FIG. 1.

Referring now also to FIG. 2 in the drawings, the back of building ladder hoist 100 is illustrated. As shown in FIG. 2, building ladder hoist 100 further comprises padded back 205, padded replaceable straps 207, adjustment tabs 209, strap buckle housing 211, strap buckle insert 213, security strap 215, security strap buckle housing 217, and strap buckle insert 219. FIG. 2 also provides a back view of side walls 101, top plate 103, support box 105, dolly base 113, fasteners 119, handle 127, handle bar 129, handle supports 133, and upper top plate 343.

Padded back 205 is attached directly to the back of side walls 101. Padded back 205 supports the user while they are wearing the carrier and makes it easier for them to carry it around for longer periods of time. Padded back 205 is secured to the back of side walls 101 by back cushion fasteners 223 which can be seen in FIGS. 6 and 7. Connected to the top of padded back 205 are two padded replaceable straps 207 which are attached to the upper left and right side of padded back 205. Padded straps 207 allow the user to carry building ladder hoist 100 on their shoulders which will let users carry it for longer periods and experience less fatigue when having to go up building ladders, extension ladders, and stairs. Also, straps 207 being replaceable will allow the user to change them out if they become worn down or if the user desires straps that have more cushion. Padded replaceable straps 207 can also be tightened to fit the body of the user by using adjustment tab 209. Adjustment tab 209 uses the extra lengths of the straps to either make straps 207 tighter or looser on the user which will allow the user to set it to where it fits best on them so it's secured and comfortable.

Strap buckle housing 211 is found on the left padded strap 207 when looking at the back of building ladder hoist 100 and strap buckle insert 213 is on the right padded strap 207. Buckle insert 213 will be inserted into buckle housing 211 to secure the two padded straps 207 together. When secured in this fashion, the straps will not be able to slide off the user during movement. Security strap 215 provides a strap which holds the wide padded backpack straps up in place and keeps them high and tight and out of the way so they don't drag the ground or get damaged when not in use, storing, or towing building ladder hoist 100. Security strap 215 is attached to the sides of side walls 101 and strap 215 buckles over padded straps 211 when securing the straps to the carrier using security strap buckle housing 217 and security strap buckle insert 219. Security strap 215 is attached to end walls 101 by security strap fastener 221 which can be seen in FIG. 5, security straps 215 keep padded straps 207 high and tightly secured to the carrier when they are not in use.

Figure 3:
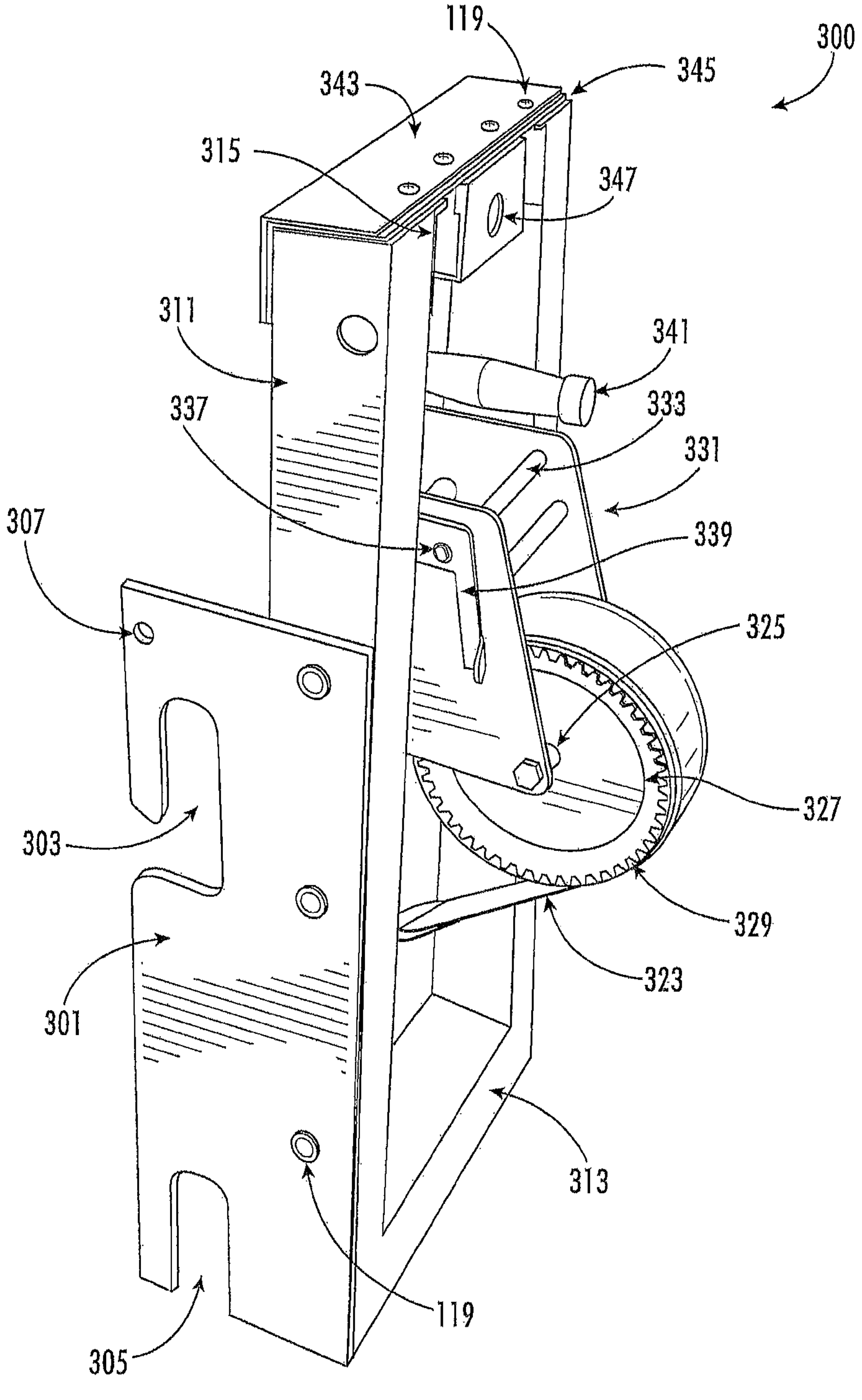
FIG. 3 is a perspective view of a winch casing of the building ladder hoist of FIG. 1.
Figure 4:
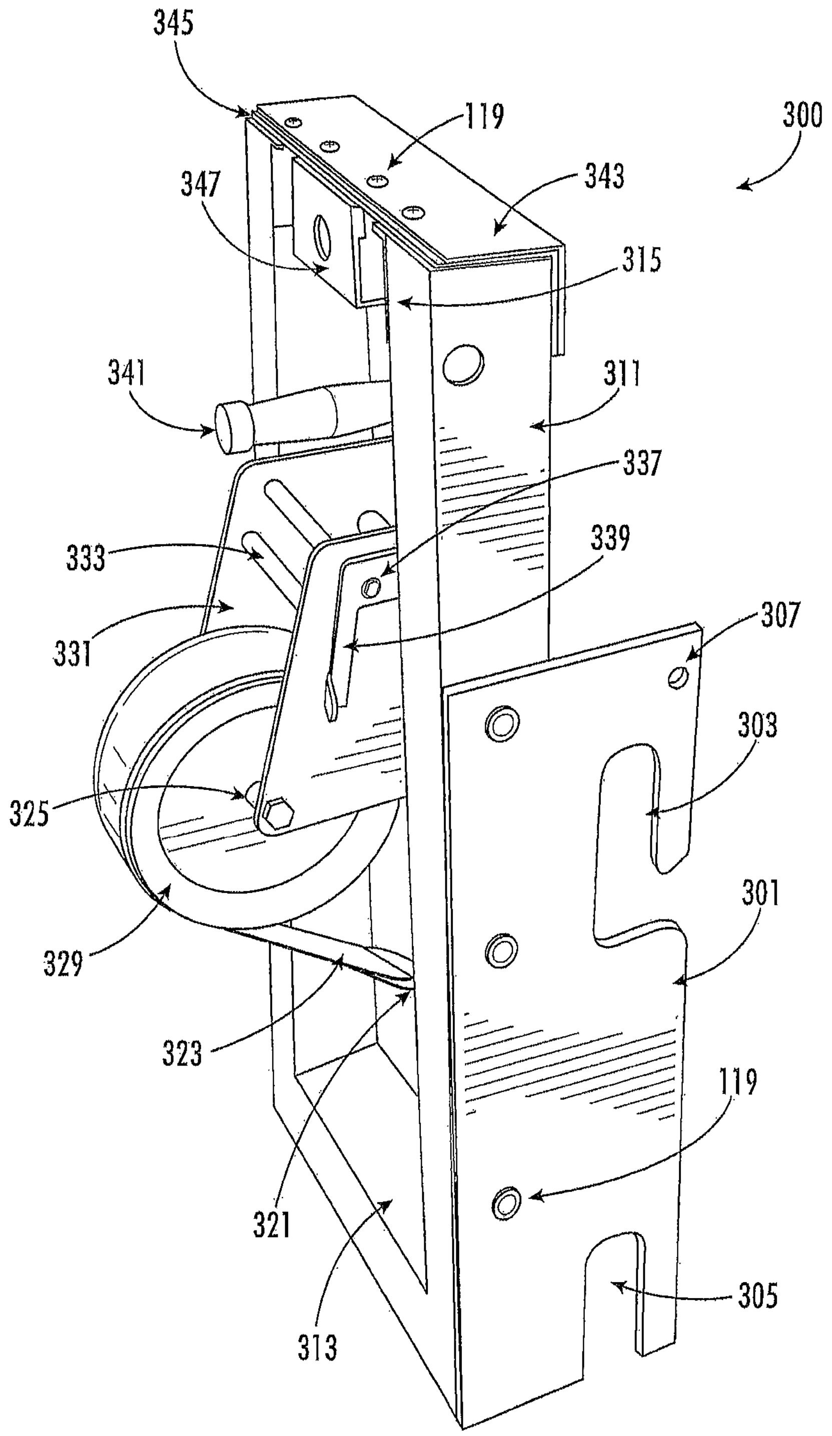
FIG. 4 is a perspective view of the winch casing of FIG. 3.

Referring now also to FIGS. 3 and 4 in the drawings, the sides of winch casing 300 with the winch boom 367 in the retracted position are depicted. These side views show that winch casing 300 comprises fasteners 119, side plate 301, upper groove 303, lower groove 305, fastener pin hole 307, end walls 311, base plate 313, side supports 315, hoist clip 321, winch strap 323, winch axle 325, winch main gear 327, winch outer plate 329, winch base 331, winch support bar 333, security bar fastener 337, rotational security bar 339, handle 341, upper top plate 343, lower top plate 345, and support box 347.

Winch casing 300 is rectangular in shape and is formed by end walls 311, base plate 313, upper top plate 343 and lower top plate 345. End walls 311 are hollow rectangular pillars that extend from the base to the top plates. End walls 311 may be made out of metal, wood, plastic, or any other light weight sturdy material. Being light weight, in combination with being hollow, allows winch casing 300 to be as light as possible to make it easy for individuals to carry building ladder hoist 100 with them. Base plate 311 is L-shaped and connects to the bottom of end walls 311. Attached to the top of base plate is boom security tab 379, shown in FIG. 1, which locks on to the end of boom 367 at the winch strap edge support 369 to keep it secured in the retracted position when not in use. Upper top plate 343 and lower top plate 345 connect to the top of end walls 311 and are stacked on top of each other to add extra support and stability for winch casing 300 when the winch is in use. Side supports 315 connect the side of end wall 311 to the bottom of lower top plate 345 and provide extra support to the top plates while securing them to end wall 311. Also, on the bottom of lower top plate 345 is support box 347 which is a hollow box that is designed to provide extra support to the top plates while winch casing 300 is in use. All of these supports are instrumental as the winch system may be used to hoist up objects that are larger and heavier than the winch itself. It is important winch casing 300 does not break or bend during the process of hoisting it and these supports provide the stability for the system to not buckle under the weight that is being lifted.

Side plate 301 is connected to the side end walls 311 either by general fasteners 119 or by these structures being welded together. Side plate 301 is, but is not limited to, rectangular in shape and on the section of side plate 301 which is not connected to end wall 311 are two grooves, upper groove 303 and lower groove 305. Upper groove 303 is nonlinear in shape and extends inward from the side of side plate 301 before extending upward. Lower groove 305 starts at the bottom of side plate 301 and extends upward before ending. These grooves are used to allow the user to have a quick and easy way to secure winch casing 300 to a ladder. The reason that upper groove 303 has its nonlinear shape is that it the notches will catch onto the ladder which will prevent winch casing 300 from coming undone during the process. At the upper portion of side plate 301 that is not connected to end wall 311 there is also fastener pin hole 307 which, when winch casing 300 and removable dolly carrier/casing 200 are together, fastener 309 will be inserted through it in order to secure these two casings together.

FIGS. 3 and 4 also provide a look at the winch system when it is not in use on winch casing 300. Connecting to the inside walls of end walls 311 is winch base 331. Between winch base 331 are support bars 333 which provide extra support for the whole system in order to keep it in place. Winch base 331 is C-shaped with the bottom edge extending further out then the upper edge. Rotational security bar 339 is connected to right side of winch base 331 by security bar fastener 337. Rotational security bar 339 is mostly flat with a tab protruding out from the end of it which the user will pull on to us it. Security bar 339 is designed so that a user will be able to pull on the bar in order to stop the gears inside the winch from turning in case the user wants to keep the item they are hoisting in place or if they lose control of the winch and need to stop it. Security bar 339 is connected to a support bar between winch base 331 which has an outer winch gear 335 attached to one end, as seen in FIG. 1. By pulling on rotational security bar 339, the support bars will be caught which will prevent outer winch gear 335 from turning which will also stop inner winch gear 351, shown in FIG. 1, which will stop the winch from turning and stopping the entire system.

Figure 8:
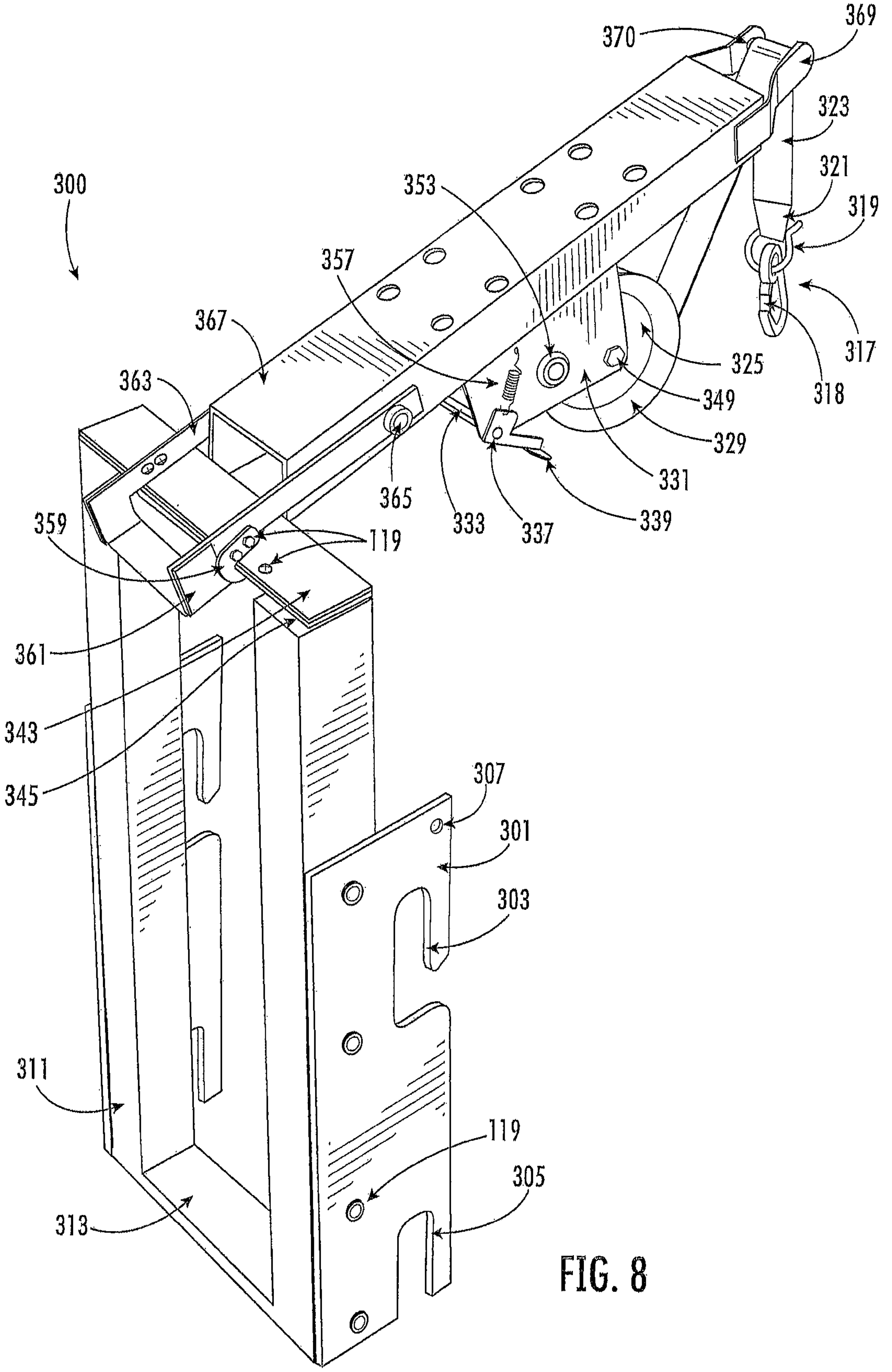
FIG. 8 is a perspective view of the winch casing of FIG. 3.

The winch system is between the two winch bases 331 and connecting both bases is winch axle 325. Attached to the ends of winch axle 325 but in-between the two sides of winch base 331 are two winch outer plates 329. Axle fastener 349, as seen in FIG. 8, extends through both outer plates 329 and through axle 325 to secure the winch system to winch base 331. On the outer side of the left out plate 329 there is winch main gear 327 which is the main gear that handle 341 is used to turn to lower and raise winch strap 323. It is also appreciated that the winch system could be replaced with an electrical winch where a user would be able to lower or raise the winch using an electrical system instead of doing it by hand using handle 341. The electrical winch may be plugged into local power source on the building or may use batteries or other portable sources of energy for power. Winch strap 323 is stored by being wrapped around winch axle 325 when not in use and then winch main gear 327 is turned in order release and lower winch strap 323. Hoist clip 321 is a connecting loop at the end of winch strap 323 and connecting hook 319, which can be seen in FIG. 8, is secured through that loop. Connecting hook 319 is used to secure hoist hook 317, also seen in FIG. 8, to winch strap 323. Hoist hook 317 is used to attach to objects that the user wishes to hoist up a ladder or up a wall or any other space. Hook 317 has latch 318 which will secure the object in place where it is hooked, this latch will only be openable by putting pressure on it from the outside so any object putting pressure on it from the inside while being hoisted will not open latch 318.

Figure 5:
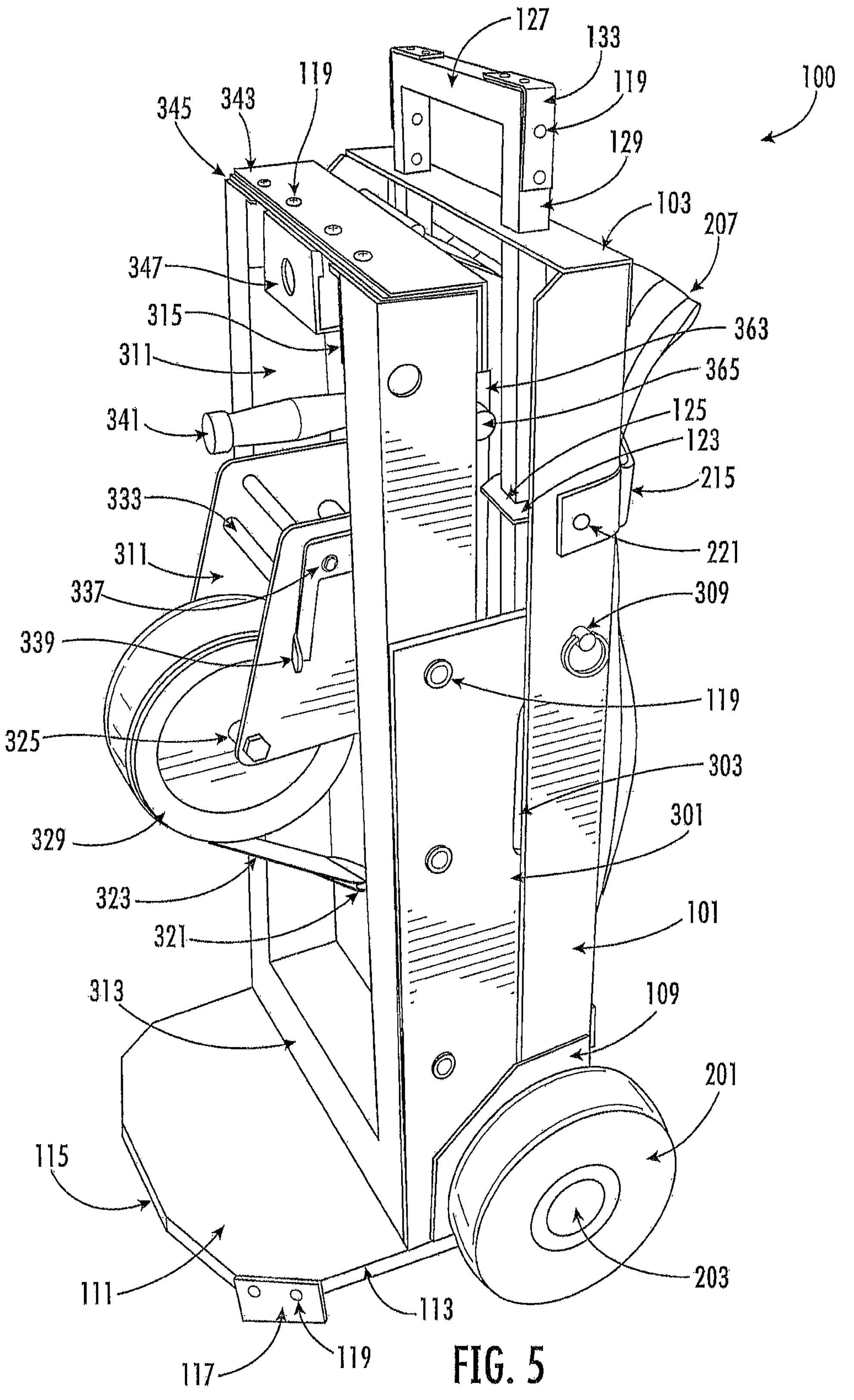
FIG. 5 is a perspective view of the building ladder hoist of FIG. 1.
Figure 6:
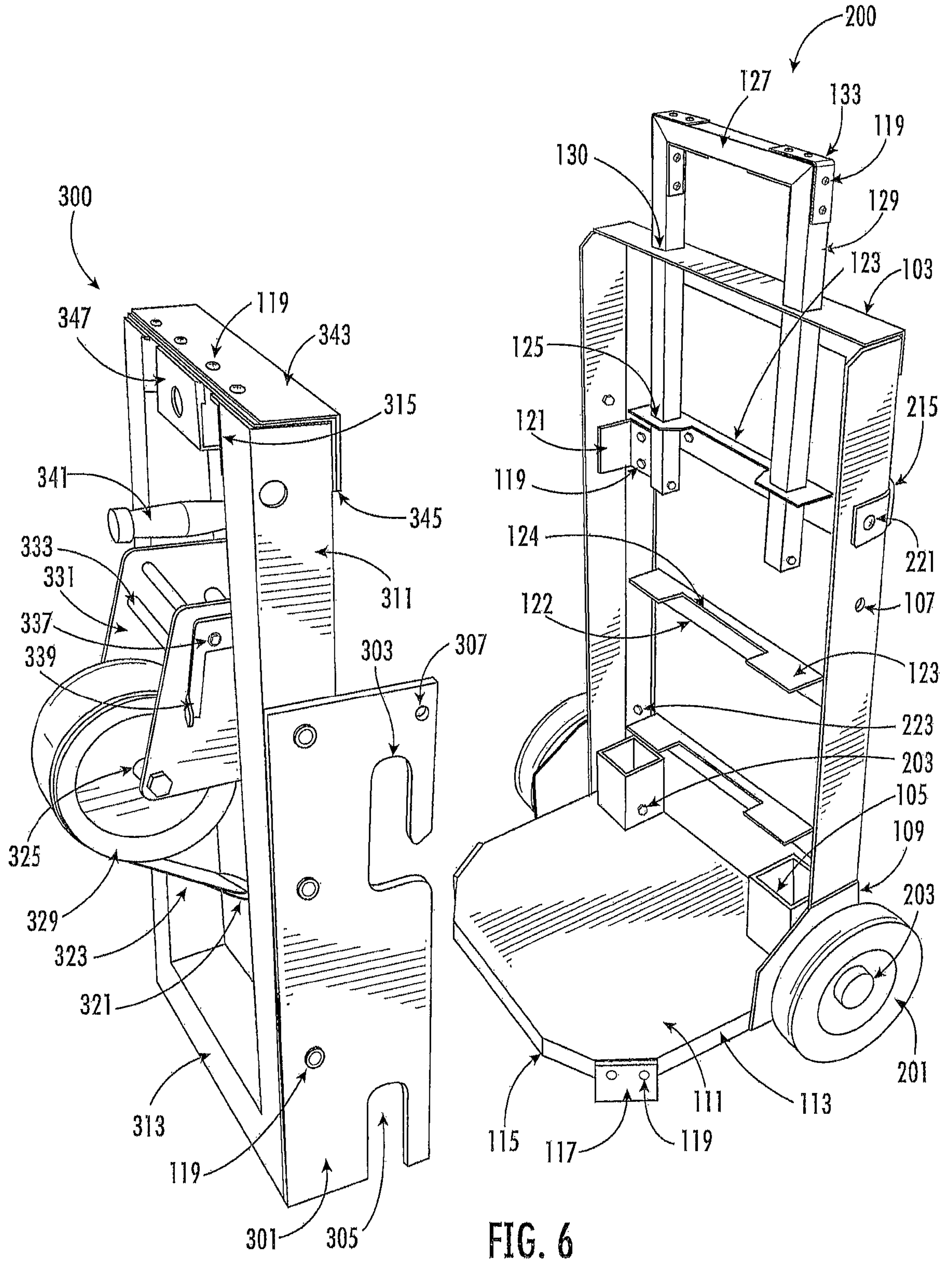
FIG. 6 is a perspective view of the winch casing of FIG. 3, separated from the remainder of the building ladder hoist of FIG. 1.

Referring now also to FIGS. 5 and 6 in the drawings, a perspective side view of building ladder hoist 100 is shown. FIG. 5 shows a perspective view of carrier casing 200 and winch casing 300 configured together. FIG. 6 then shows a view of winch casing 300 being unhooked from carrier casing 200 and the two casings being separated from each other in a perspective side view.

Figure 7:
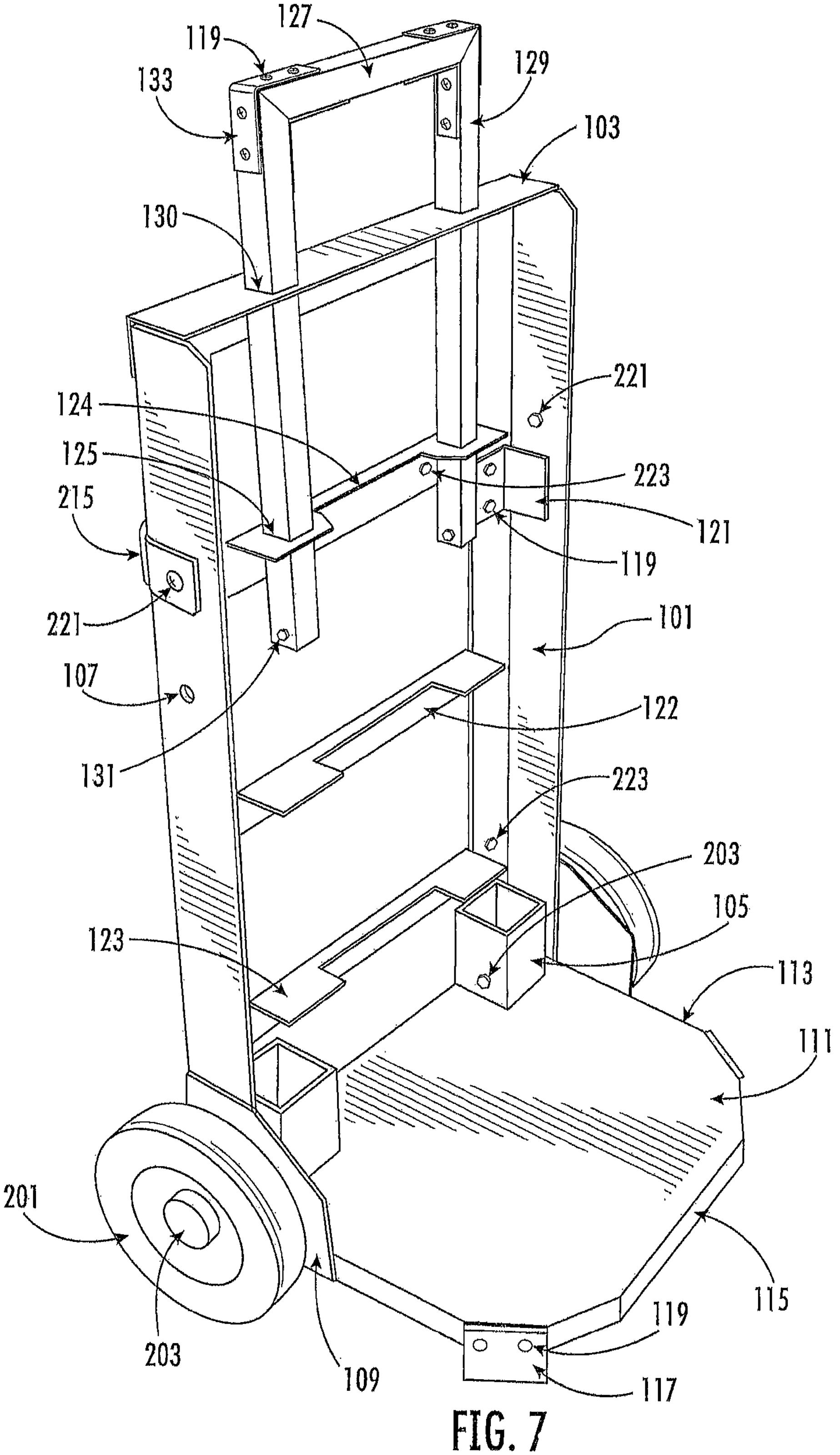
FIG. 7 is a perspective view of a removable dolly carrier/casing for the building ladder hoist of FIG. 1.

Referring now also to FIG. 7 in the drawings, a perspective view of removable dolly carrier/casing 200 is shown. FIG. 7 shows that removable dolly carrier/casing 200 further comprises side walls 101, top plate 103, support box 105, fastener hole 107, side supports 109, dolly base 111, dolly side wall 113, segmented dolly front wall 115, support tab 117, fasteners 119, side wall supports 121, back wall supports 122, boom supports 123, notch 124, supports slot 125, handle 127, handle bars 129, upper supports slot 130, handle bar stoppers 131, handle supports 133, wheels 201, axles 203, and security strap 215, security strap fastener 221, and back cushion fastener 223.

Side walls 101 are L-shaped and are connected at the top by top plate 103, also L-shaped, and then connect at the bottom to dolly base 111. Side wall supports 121 are also L-shaped and are on the inside of side walls 101 and are fastened to these walls in order to provide extra support and stability to the structure. The walls and bases of carrier casing 200 may be made out of metal, wood, plastic or any other sturdy light weight material. It is important that this material is light weight as the user needs to be able to carry this equipment with them and if it is too heavy that would not be possible. The material also needs to be sturdy in order to not lose its form when in use. Side walls 101 and top plate 103 may be connected by fasteners 119 or they may be welded together. Both side walls 101 and top plate 103 being L-shaped provided extra support and increases the stability of the structure as a whole.

Dolly base 111 connects to the bottom of side walls 101 and may be secured by fasteners 119 or by welding the parts together. On the top of base 111 and connected to the back part of wide walls 101 is support box 105 which leaves a space between it and the side of side walls 101. Support box 105 is square in shape and is used to support wench casing 300 when it is attached to carrier casing 200. Support box 105 provides a platform for parts of wench casing 300 to lean against so that when in movement these parts will not get damaged. Also, support box 105 further provides support for axle 203 as it goes through and is secured in place by support box 105 which maintains the stability of the wheels during movement.

The dolly portion of carrier casing 200 is used in order to tow other objects that the user wishes to bring with them so that way they can keep their hands free while also putting less strain on their bodies. The dolly is formed by dolly base 111, dolly side walls 113, and segmented dolly front wall 115. Dolly side walls 113 are straight and connect in the back to side walls 101 either through fasteners or by being welded together. Connected to the sides of side wall 101 and dolly side wall 113 is side support 109 which further connects these two ends to secure the parts together and provide extra stability. Side support 109 may connect these two side walls either through fasteners or by being welded together. Segmented front wall 115 is segmented into five sections, but is not limited to five and may be segmented into more or less sections. Attached to one of the sections of front wall 115 is support tab 117 which can either be fastened to front wall 115 with fasteners 119 or by being welded to it. Support tab 117 is a square plate which is used in order to support carrier casing 200 in the upright position when it is not in motion.

Connecting over the gap between the side walls 101 are back wall supports 122. These supports stretch the gap between side walls 101 as there is no back wall and provide support for carrier casing 200 while also providing a place for boom 367 to lean against when not in use. The lack of a back plate is to make it less weight and supports 122 are used to provide support and stability of the structure. Attached to the top of back wall supports 122 are boom supports 123 which project out from back wall supports 122. Boom supports 123 have a notch 124 in the middle of them which is the same width as boom 367 which will keep it secure when not in use. Back wall supports 122 and boom supports 123 together maintain the stability of the winch system when it is not in use and when the user is carting it from location to location. With all the movement involved, without these supports maintaining the system, there is a chance it could be damaged and become too dangerous to use.

At the top of carrier casing 200 is the handle system which allows the user to pull the cart behind them if they are already carrying something on their back or if they just do not desire to carry it. Handle 127 is rectangular in shape and is connected at both ends by handle bars 129. Handle supports 133 are used to secure handle 127 to handle bars 129 while also providing more stability, these sections can be secured together either with fasteners 119, or by being welded together. Handle bars 129 extend down through upper support slot 130 in top plate 103 and through support slot 125 in the upper most boom support 123. These slots are just big enough for handle bars 129 to slide through them but not big enough to provide leeway for movement in the horizontal direction so handle bars 129 will be secure in these slots and will only be able to move up or down. Handle bar stoppers 131 are installed at the bottom of handle bars 129 and they are protrusions that stick out from handle bar 129 to prevent it from being removed from the slots. These prevent the handle system from being removed from its housing which will allow the user to use it without concern that building ladder hoist 100 will get loose in transit.

Figure 9:
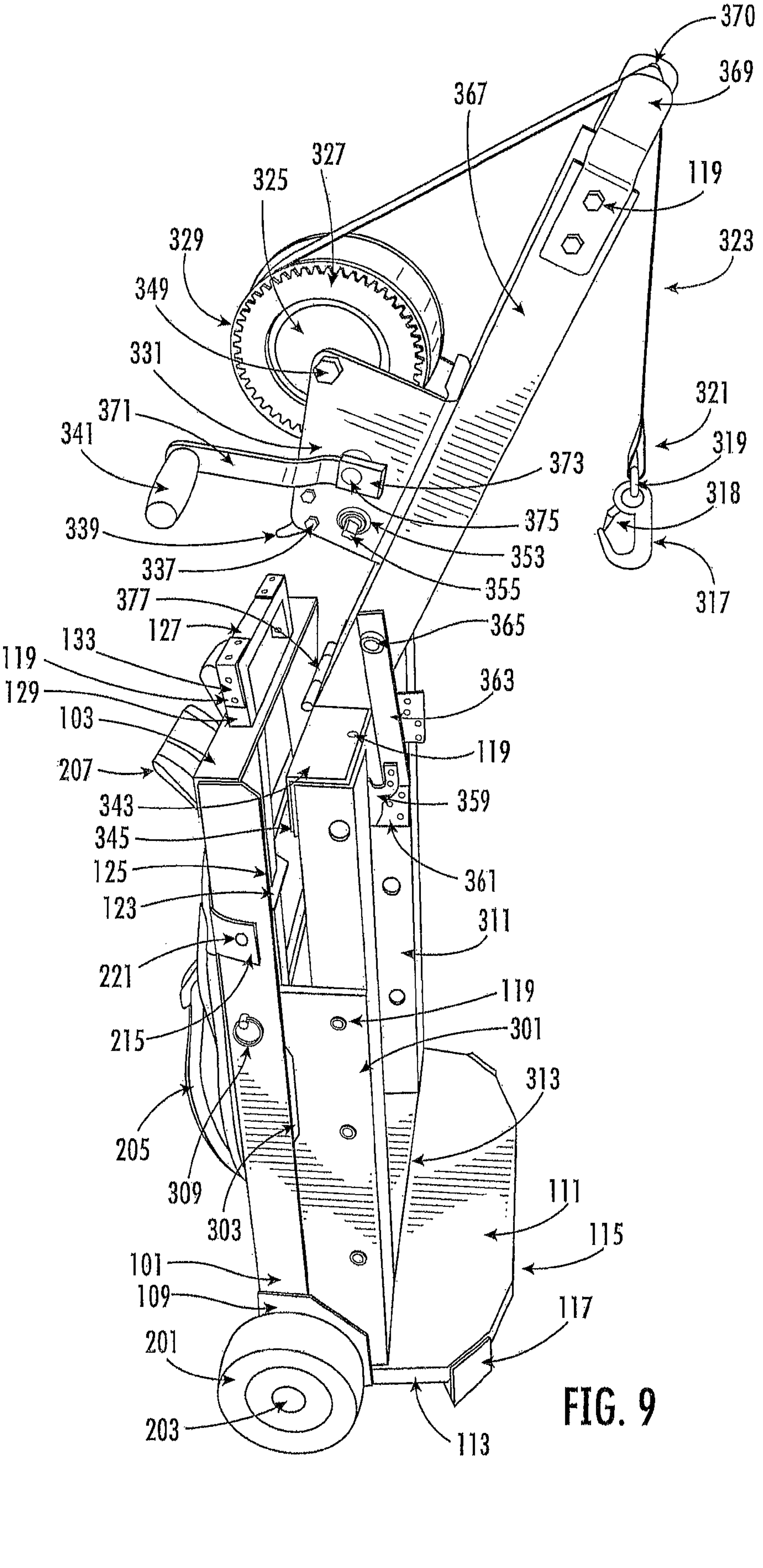
FIG. 9 is a perspective view of the building ladder hoist of FIG. 1.
Figure 10:
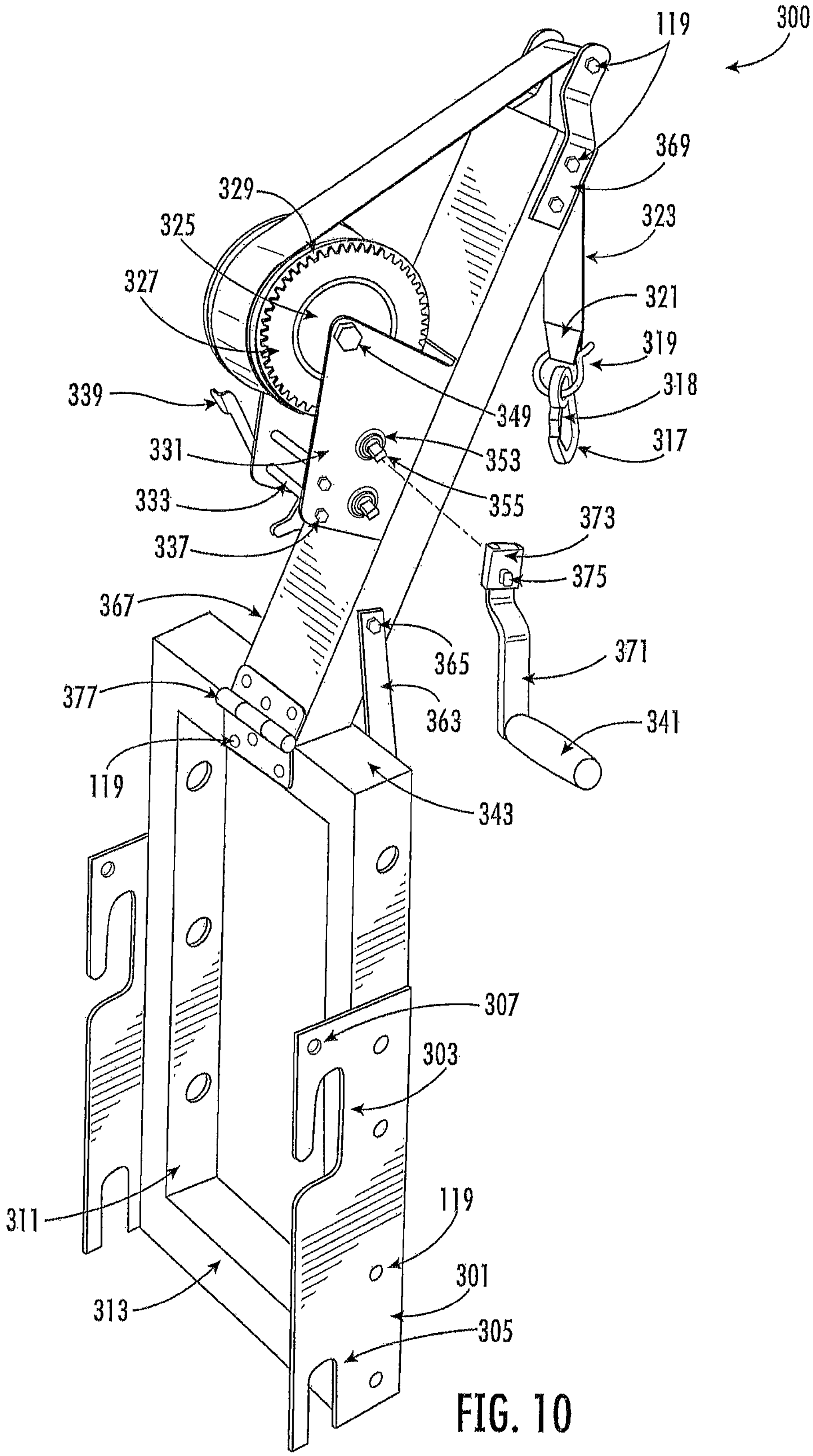
FIG. 10 is a perspective view of the winch casing of FIG. 3.

Referring now also to FIGS. 8, 9, and 10 in the drawings, building ladder hoist 100 is shown with the retractable boom in the retracted position with the boom safety stop engaged. These figures show that wench mechanism includes hoist hook 317, connecting hook 319, hoist clip 321, winch strap 323, winch axle 325, winch main gear 327, winch outer plate 329, winch base 331, winch support bar 333, security bar fastener 337, rotational security bar 339, handle 341, axle fastener 349, winch handle tab base 353, winch handle tab 355, security bar spring 357, rotation stopper 359, support plate 361, boom support bar 363, boom safety stop fastener 365, boom 367, winch strap edge support 369, edge support axle 370, winch handle bar 371, winch handle base 373, winch handle base slot 375, and hinge 377. These figures demonstrate how the winch system is attached to boom 367.

When using the winch system on building ladder hoist 100, handle 341 is removable to allow for easy storage when not in use. When not in use the handle can be stored between the two winch bases 331 as seen in FIG. 1. Handle 341 is attached on one end to winch handle bar 371 which extends at an angle. At the end of handle bar 371 is winch handle base 373 which is a square plate with base slot 375 in the middle of it. On the outside of the right winch base 331 there are two tabs which are formed by winch handle tab base 353 which has winch handle tab 355 protruding from it. Each handle tab base 353 connects to a support bar 333 that has a gear attached to it, so by inserting slot 373 over tab 355, the user will be able to turn handle 341 to turn the gears of the winch system.

Winch strap edge support 369 is found at the end of boom 367 and is used in connection with winch strap 323. Edge support 369 may be connected by either fasteners 119 or by being welded to boom 367. Winch edge support 369 is separated into three segments, though it may be separated into more or less segments, it has one straight segment which attaches to the sides of boom 367, it has a tilted slight curved section that goes inward beyond the edge of boom 367 then finally has another straight section that goes out and ends with a circular edge. Between the final straight segment of edge support 369 is axle 370 which extends between the gap of the two final segments of support 369. Support 369 and axle 370 are used as a support for winch strap 323 which will extend upward from the winch then go over axle 370 before extending back down. This provides extra support and stability for the system when it is being used to hoist an object and it serves as a handle for retrieval of the boom.

Figure 11A:
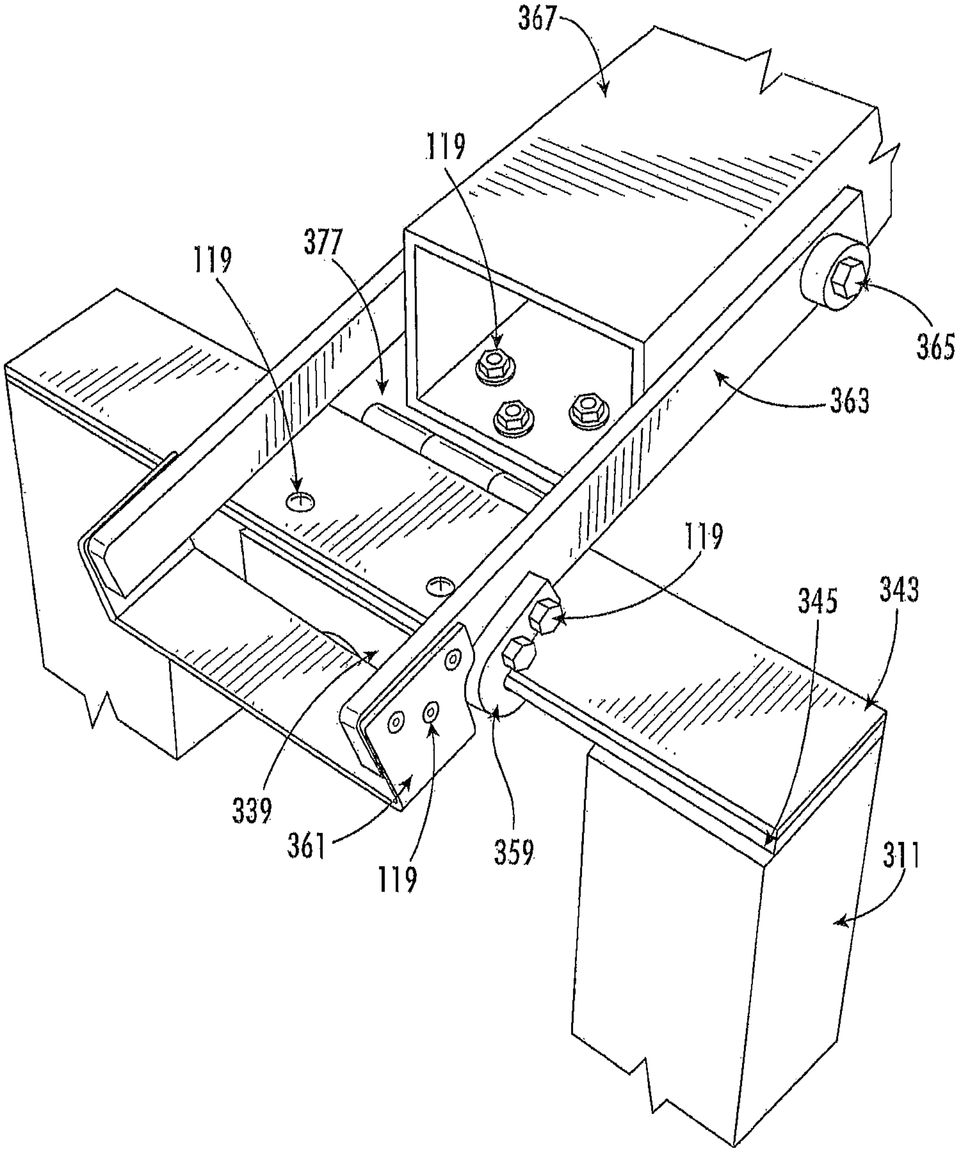
FIG. 11A is a partial perspective view of the winch casing of FIG. 3.

Referring now also to FIG. 11A in the drawings, a close up view of winch casing 300 with the boom stop engaged stopping the boom from falling any further. FIG. 11A shows a close up of the system from FIGS. 8-10 of how boom 367 extends into the upright position which is comprised of rotation stopper 359, support plate 361, boom support bar 363, boom safety stop fastener 365, boom 367, and hinge 377.

Hinge 377 provides the main function that allows for boom 367 to rotate between the up and down positions. Hinge 377 is attached to one side of boom 367 and to the underside of lower top plate 345. Hinge 377 may be attached by fasteners 119 or it may be welded instead. Boom support bar 363 is attached to the sides of boom 367 by fasteners 365 and provides support for boom 367 while in use. On the other end of boom support bar 363, support plate 361 is a C-shaped support that attaches to the sides of bar 363, either by fasteners 119 or by welding. Support bar 363 and support plate 361 are designed to provide extra support for boom 367 when it is in use in order to make sure the object being hoisted make its securely to its location. Also attached to the side of support bar 363 are rotation stoppers 359 which are either attached by fasteners 119 or by the parts being welded together. Stoppers 359 are U-shaped and are designed to catch boom 367 once it has extended to a certain point. The side of stopper 359 that is not fastened to support bar 363 is positioned in order to catch onto lower top plate 345 when it is extended to a certain point which will stop boom 367 from extending any further. This limits the range of motion that boom 367 will be able to rotate which will secure it in place when in use.

Figure 11B:
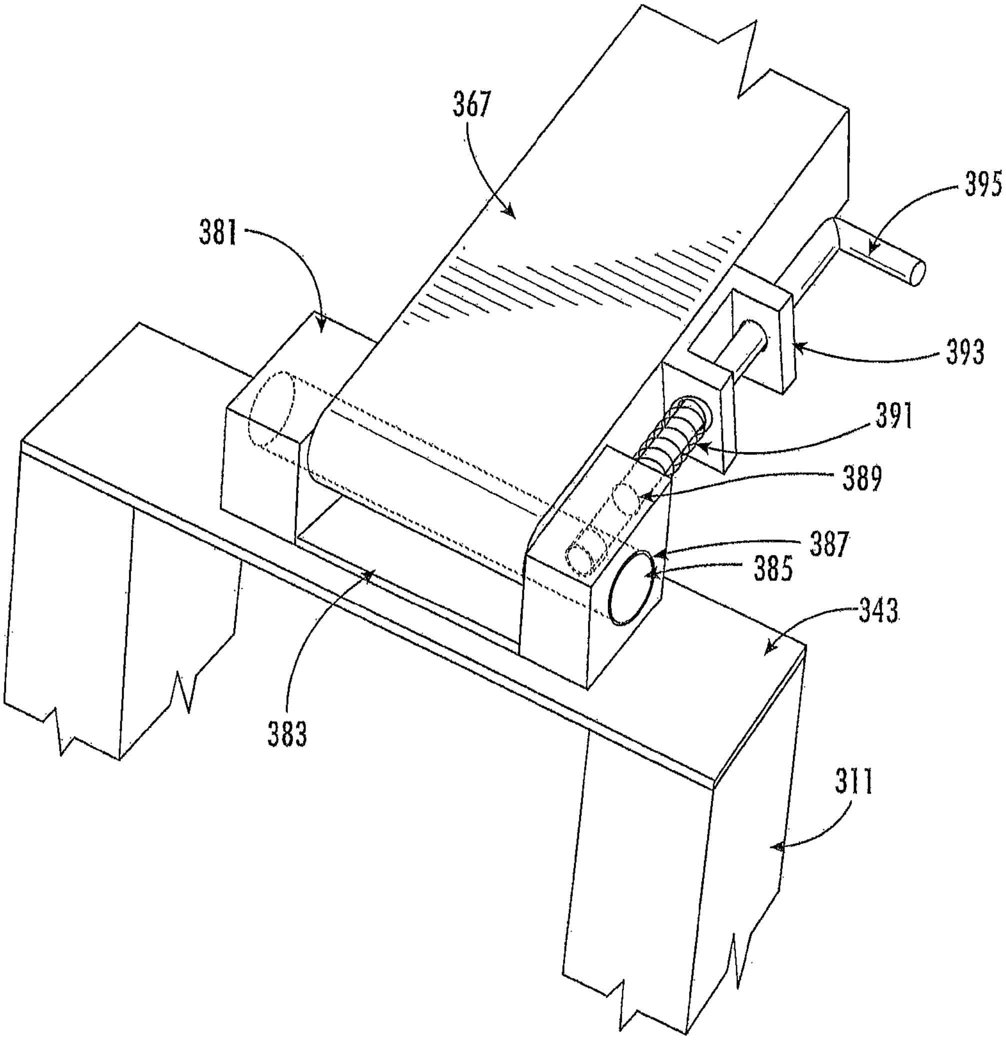
FIG. 11B is a partial perspective view of an alternative embodiment of a winch casing of the building ladder hoist of FIG. 1.

Referring now also to FIG. 11B in the drawings, a close up view of an alternative embodiment of the boom stop and boom axle on winch casing 300 is shown. FIG. 11B shows an alternative embodiment to how the boom extends into position and includes axle support plates 381, axle housing 383, axle 385, axle hole 387, pin hole 389, spring 391, pin release 393, and pull release pin 395.

In this alternative embodiment, instead of using hinge 377 to control how boom 367 is retracted, an inside axle 385 is used. Attached to upper top plate 343 are two axle support plates 381 which are cube shaped. Support plates 381 are on both sides of axle housing 383 which houses and supports axle 385 which directly connects to boom 367. Support plates 381 are used in order to support and secure boom 367 to winch carrier 300. Axle 385 is designed in order to provide boom 367 with a range of movement while also being secured inside of housing 383. Being secured inside of housing 383 will prevent the user from getting snagged by boom 367 when it is in motion as there will not be the crevices between the boom 367 and hinge 377 such as the ones seen in FIG. 11A. Axle 385 is inserted into its housing through axle hole 387, Axle 385 is also long enough to where a portion of it is in support plates 381 which provides extra supports for the system. On the top of the right support plate 381 is pin hole 387 which provides a location for pin 395 to be inserted through support plate 381 to stop axle 385 in its location which will secure boom 367 where it currently is. Pin 395 has spring 391 running along it so when pin 395 is inserted the spring will become compressed, and will secure pin in support plate 381 until pin release 393 is used. Pin release 393 is C-shaped and is used to keep spring 391 condensed when pin 395 is inserted. When the user wishes to remove pin 395 from support plate 381, they will disengage release 393 to release spring 391. Once released, pin 395 will regain its range of movement and can be removed from pin hole 387 allowing the user to modify the angle that boom 367 is set at before locking it in place again.

Figure 12:
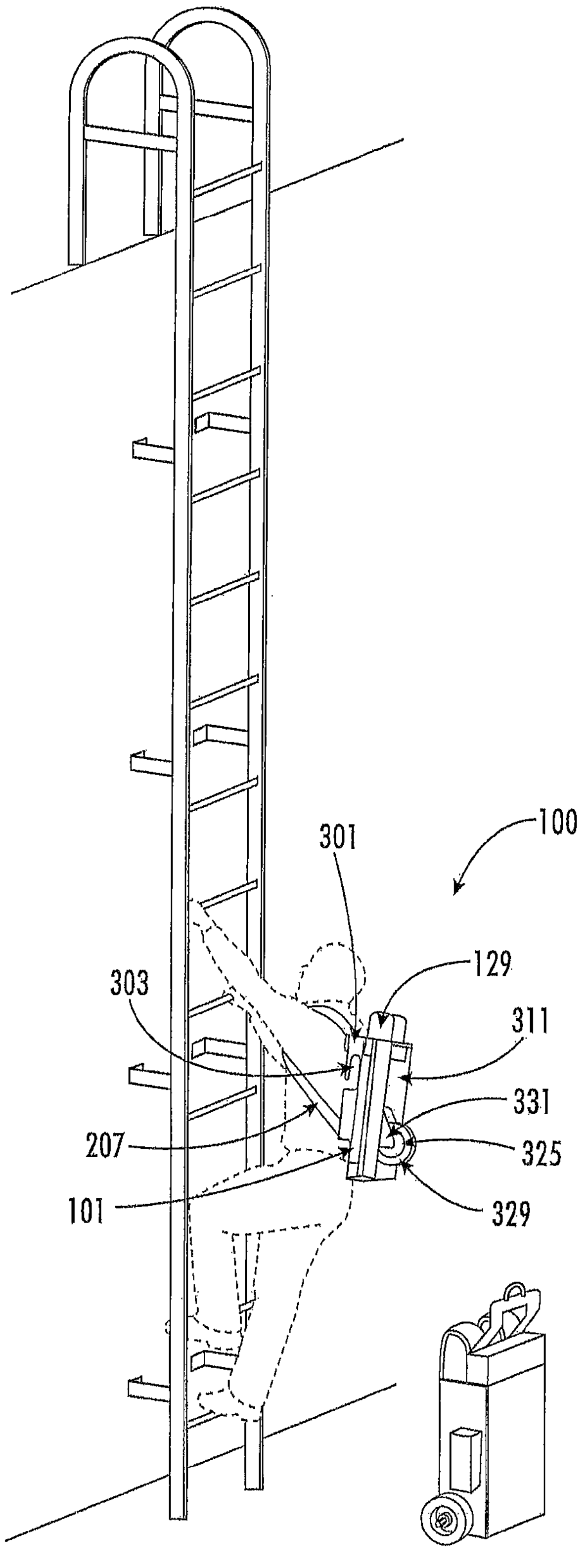
FIG. 12 is a perspective view of the building ladder hoist of FIG. 1 being used.

Referring now also to FIG. 12 in the drawings, an individual climbing a building ladder with building ladder hoist 100 is shown. In this figure, building ladder hoist 100 is attached to the back of an individual using back straps 207. FIG. 12 shows how straps 207 will be used to allow an individual to climb a building ladder hands free while having building ladder hoist 100 attached to their back.

Figure 13:
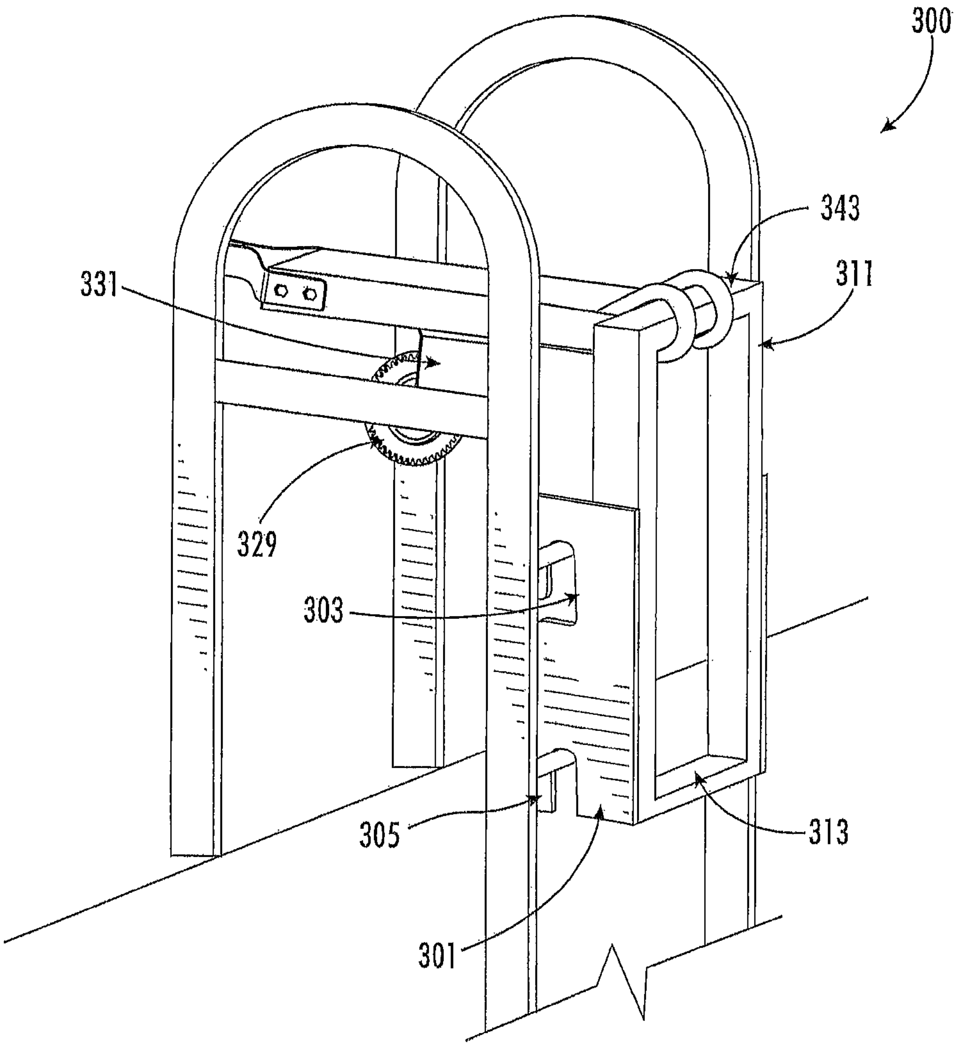
FIG. 13 is a perspective view of the building ladder hoist of FIG. 1 attached to a ladder.
Figure 14:
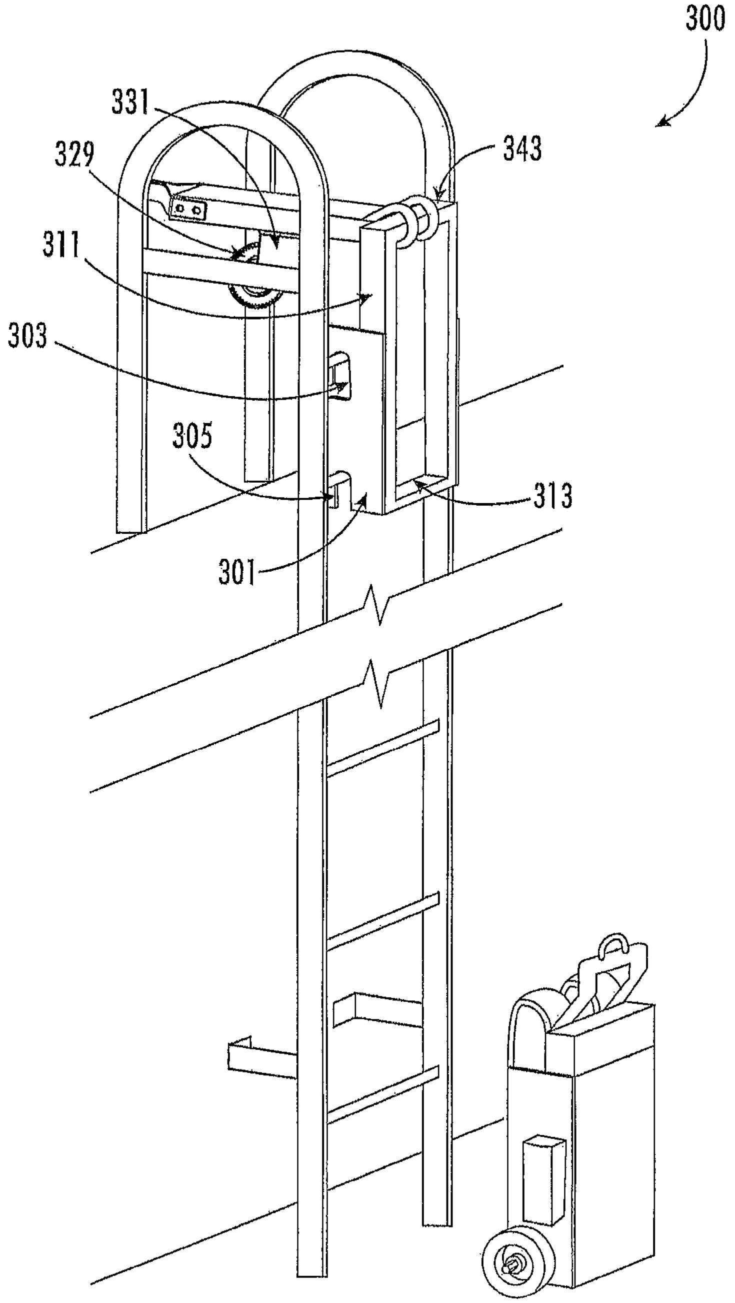
FIG. 14 is a perspective view of the building ladder hoist of FIG. 1 attached to a ladder.
Figure 15:
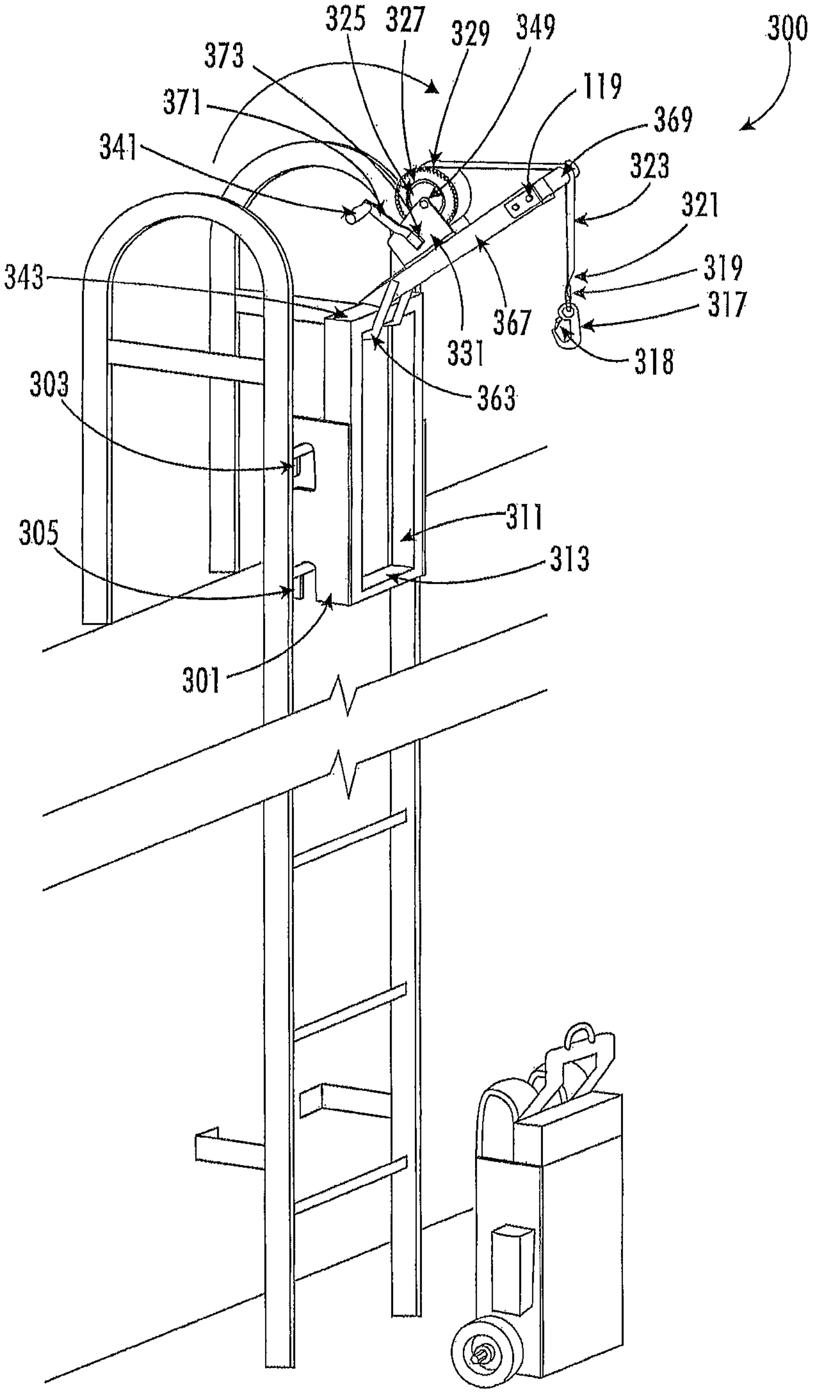
FIG. 15 is a perspective view of the building ladder hoist of FIG. 1 attached to a ladder.
Figure 16:
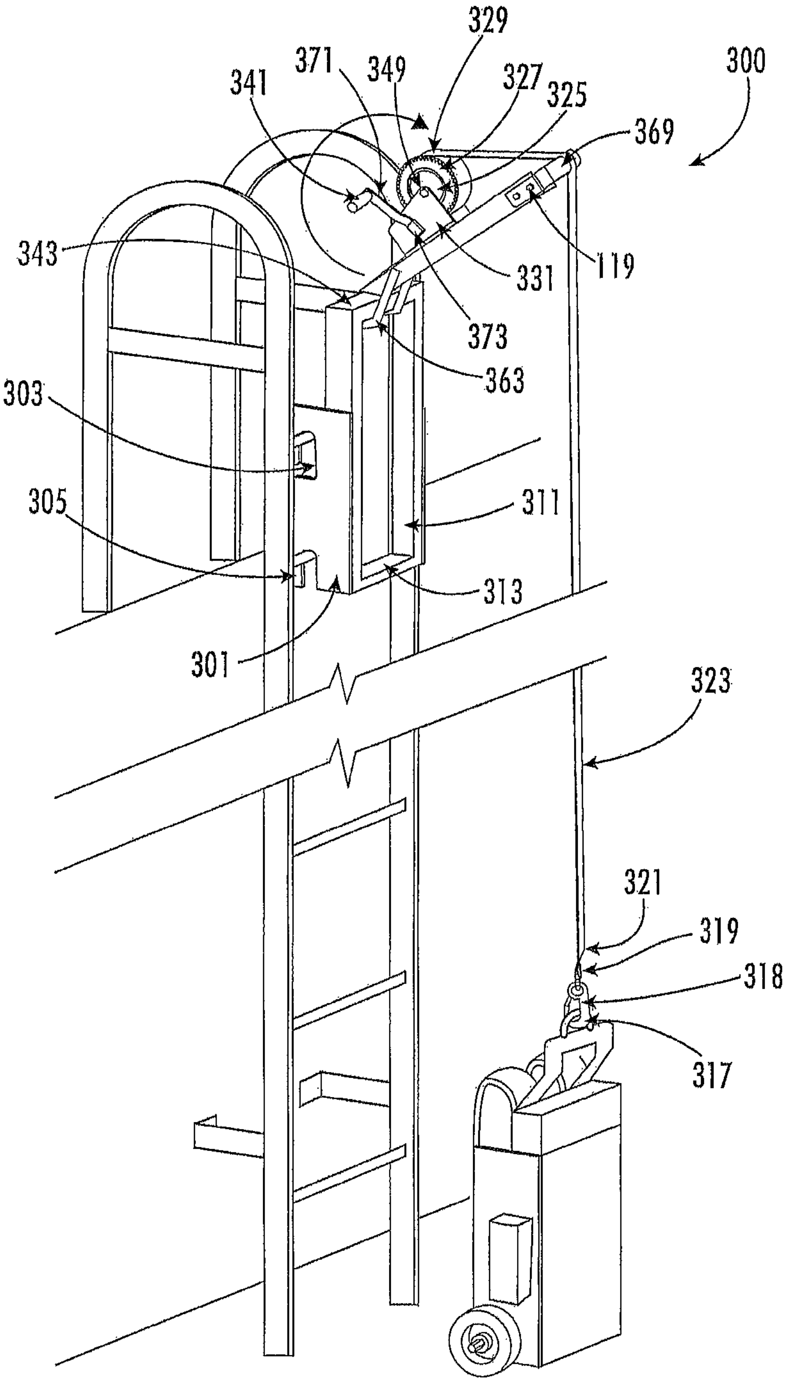
FIG. 16 is a perspective view of the building ladder hoist of FIG. 1 attached to a ladder.
Figure 17:
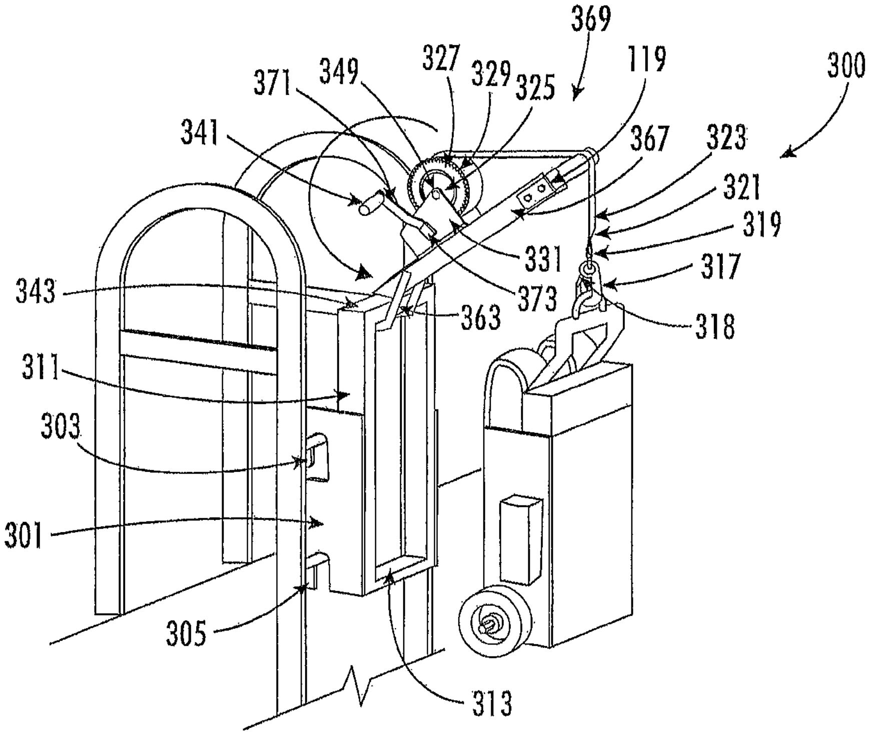
FIG. 17 is a perspective view of the building ladder hoist of FIG. 1 in operation.
Figure 18:
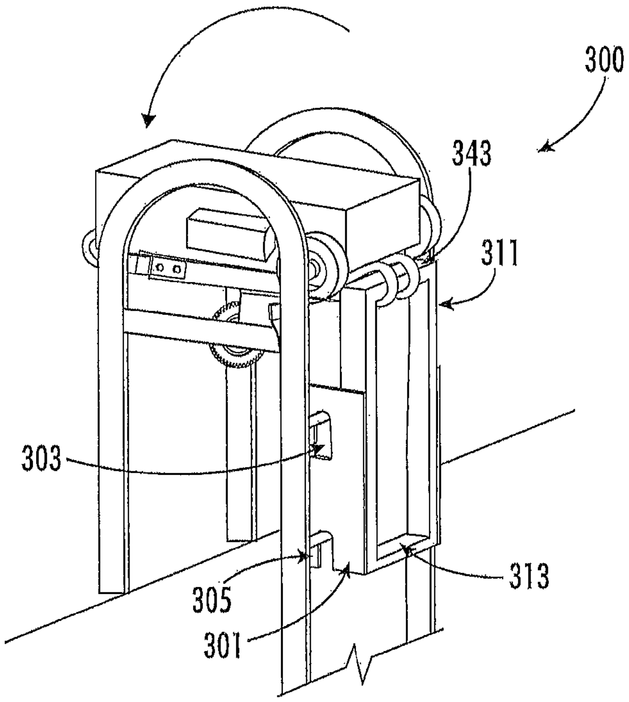
FIG. 18 is a perspective view of the building ladder hoist of FIG. 1 in operation.

Referring now also to FIGS. 13-18 in the drawings, winch carrier 300 is shown attached to a building ladder. One of the important features of winch carrier 300 is being able to securely connect to the rungs of a ladder to allow an individual to hoist up other equipment, tools, or any other object. FIG. 13 shows winch carrier 300 being securely connected to the rungs of a ladder. FIGS. 14-18 then show the step by step process of using the winch system to hoist an object up the ladder and onto the roof. FIG. 15 shows hoist arm 367 being extended out and FIG. 16 shows winch strap 323 extending down to allow hook 317 to connect to the object. FIG. 17 shows the object hoisted up to the top of the roof and FIG. 18 then shows the boom 367 in the retrieved position and locked into place by boom safety stop 365 so the user can safely and easily remove the equipment. The rotation ability of boom 367 is utilized in this way by being able to rotate boom 367 back into the retrieved position while the object is attached as this will allow the user to not have to reach out over the edge to remove the equipment and instead the object that was hoisted will be at an easy location for the user to grab. This is the main function of building ladder hoist 100 and these figures demonstrate the ease of safely bring equipment, tools, or other objects to the roof of the building.

It should be appreciated that the winch system described above may take on alternative embodiments not shown herein, while maintaining the overall structure of the present invention. For example, instead of a manually operated winch, the winch system may be automated such that the use of a push button operates the winch in raising or lowering an object. Additionally, rather than a handle, the winch could be operated by a user via a drill operation, as many intended operators of the system are likely to have a cordless drill in their possession. In such an embodiment, a cordless drill could be connected to the winch system via a socket, where the drill could then be operated to either raise or lower a desired object associated with the winch system.

Figure 19:
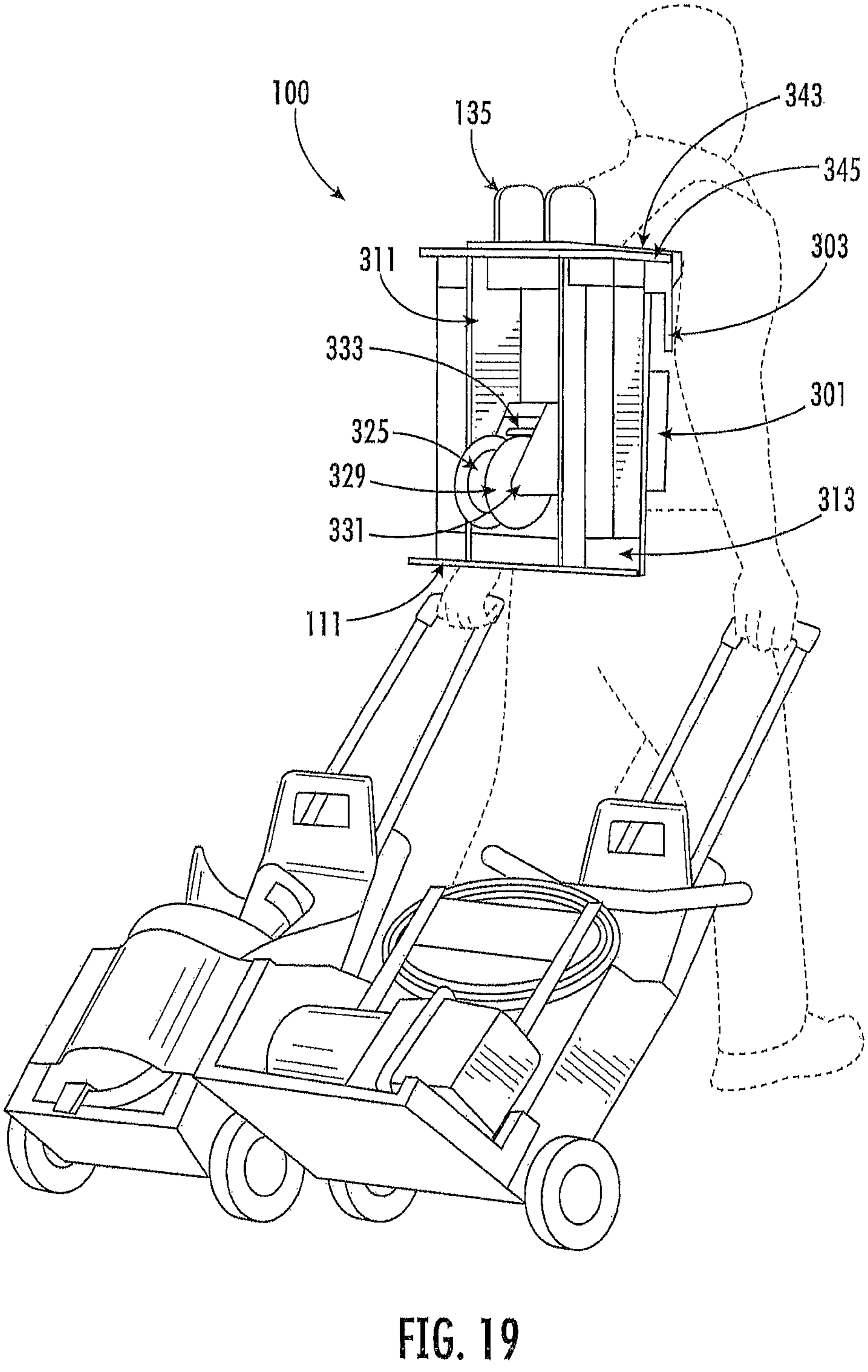
FIG. 19 is a perspective view of the building ladder hoist of FIG. 1 being carried by a person.

Referring now also to FIG. 19 in the drawings, this shows an individual wearing alternative building ladder hoist 400 while walking. Alternative building ladder hoist 400 is securely attached to the back of the user using back straps 207 in this figure. By securing alternative building ladder hoist 400 to the back of the user, the user will have both hands free during transit which will allow them to tow other objects with them. This will cut down on the number of trips the user will need to take and lessen the strain on the individual.

Figure 20:
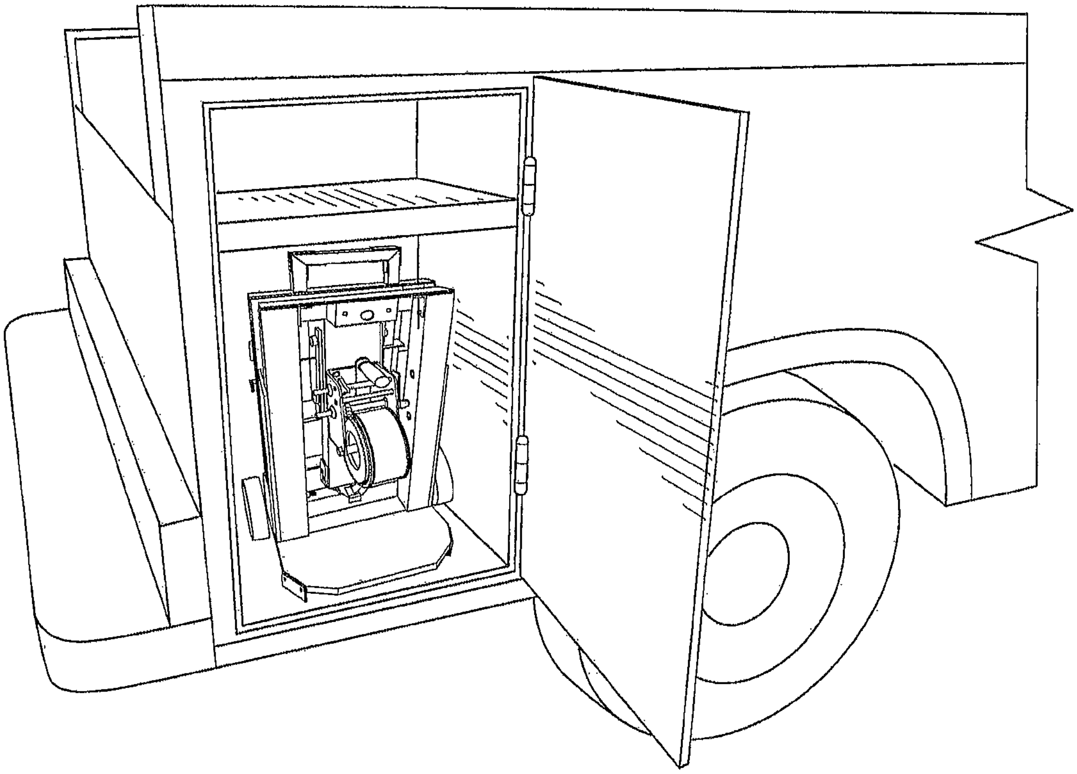
FIG. 20 is a perspective view of the building ladder hoist of FIG. 1 being stored in a vehicle.

Referring now also to FIG. 20 in the drawings, a perspective front view of building ladder hoist 100 being stored in a truck is depicted. It is important that building ladder hoist 100 be small and compact so that way it does not take up too much space wherever it is stored. FIG. 20 depicts this by showing building ladder hoist 100 being compact and stored in a standard storage compartment that could be found on the side of work trucks.

Figure 21:
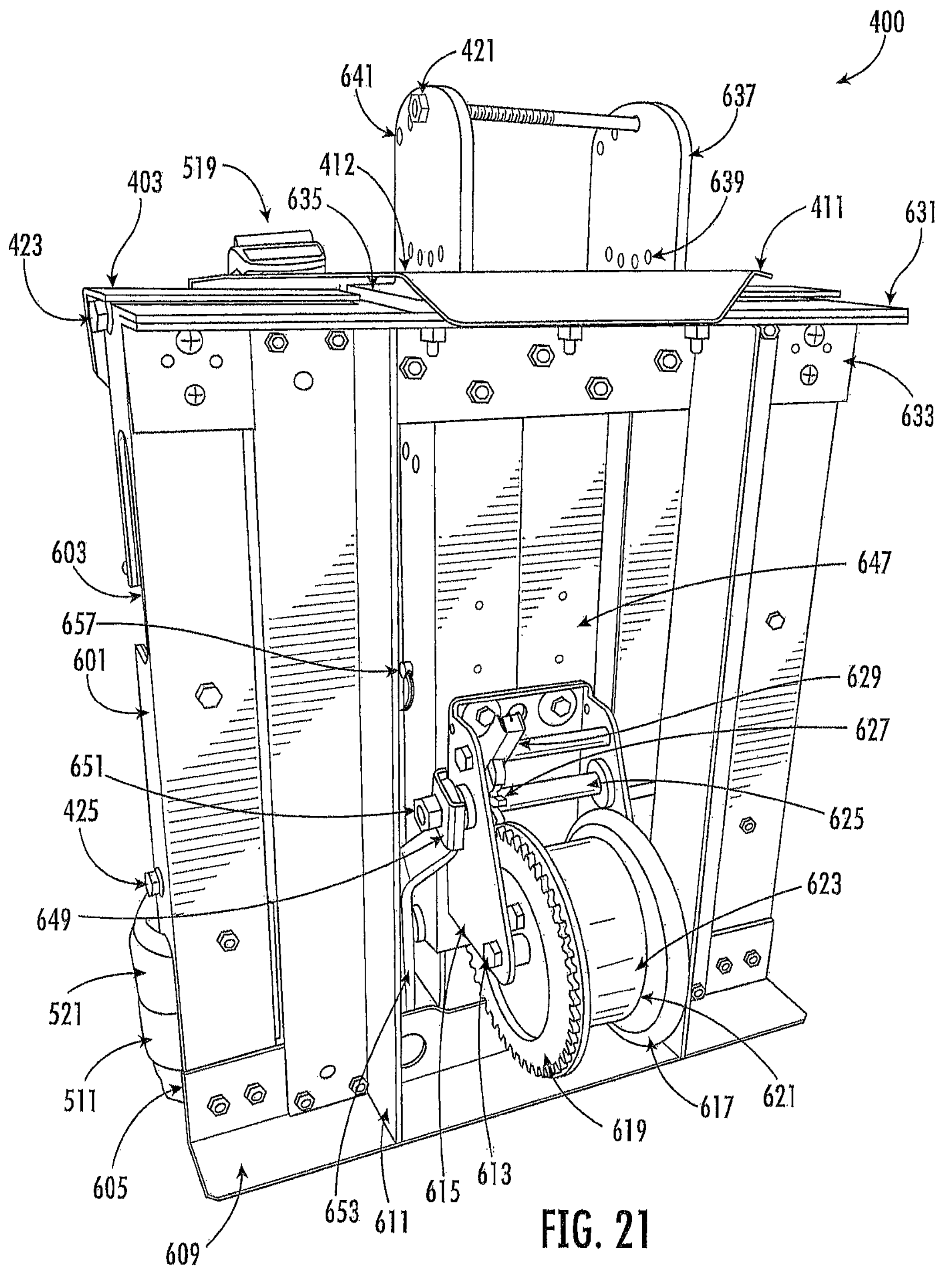
FIG. 21 is a perspective view of an alternative embodiment of a building ladder hoist.

Referring now also to FIG. 21 in the drawings, a perspective view of an alternative embodiment of a building ladder hoist is depicted. Alternative building ladder hoist 400 is split between removable carrier casing 500 and winch casing 600. FIG. 21 shows how removable carrier casing 500 and winch casing 600 will be enjoined together in a way that will be easy for an individual to tow ladder hoist 400 in its entirety. Handle insert 421, upper insert 423, and lower insert 425 are used together to secure the two casings together. It is important that an individual will be able to swiftly and efficiently set up this equipment which is why winch casing 600 is designed to be easily disengaged from removable carrier casing 500. This allows the user to slide winch casing 600 off of carrier casing 500 so the user can then install alternative building ladder hoist 400 on a building ladder and removable carrier casing 500 and straps are out of the way.

Figure 22:
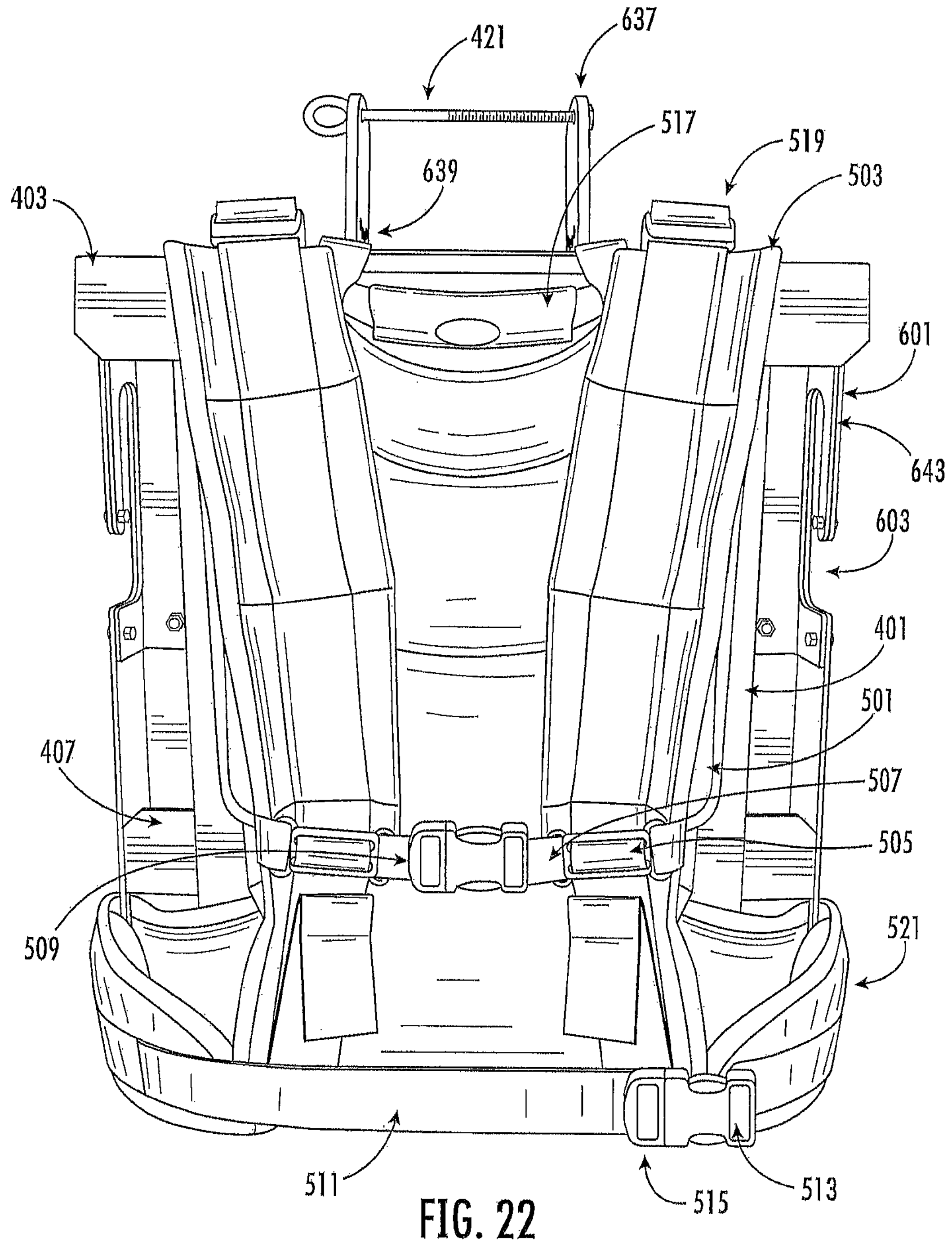
FIG. 22 is a rear view of the building ladder hoist of FIG. 21.

Referring now also to FIG. 22 in the drawings, the back of ladder hoist 400 is illustrated. As shown in FIG. 22, ladder hoist 400 further comprises padded back 501, padded replaceable straps 503, lower adjustment tabs 505, strap buckle housing 507, strap buckle insert 509, security strap 511, security strap buckle housing 513, strap buckle insert 515, padded handle 517, upper adjustment tabs 519, and security strap pads 521. FIG. 22 also provides a back view of back wall 401, top plate 403, bottom plate 407, handle insert 421, side plate 601, upper groove 603, handle plates 637, lower adjustment holes 639, and side support plate 601.

Padded back 501 is attached directly to back wall 401. Padded back 501 supports the user while they are wearing the carrier and makes it easier for them to carry it around for longer periods of time. Padded back 501 is secured to back wall 501 by back cushion fasteners 413 which can be seen in FIGS. 26 and 27. Connected to the top of padded back 501 are two padded replaceable straps 503 which are attached to the upper left and right side of padded back 501. Padded straps 503 allow the user to carry ladder hoist 400 on their shoulders which will let users carry it for longer periods and experience less fatigue. Also, straps 503 being replaceable will allow the user to change them out if they become worn down or if the user desires straps that have more cushion. Padded replaceable straps 503 can also be tightened to fit the body of the user by using lower adjustment tab 505 and upper adjustment tab 519. The adjustment tabs use the extra lengths of the straps to either make straps 503 tighter or looser on the user which will allow the user to set it to where it fits best on them so it's secured and comfortable. Found at the top of padded back 501 is padded handle 517 which allows the user to carry ladder hoist 501 in the hand instead of having it strapped to their back.

Strap buckle housing 507 is found on the right padded strap 503 when looking at the back of building ladder hoist 100 and strap buckle insert 509 is on the left padded strap 503. Buckle insert 509 will be inserted into buckle housing 507 to secure the two padded straps 503 together. When secured in this fashion, the straps will not be able to slide off the user during movement. Security strap 511 provides a strap which holds the wide padded backpack straps up in place and keeps them high and tight and out of the way so they don't drag the ground or get damaged when not in use, storing, or towing ladder hoist 400. Security strap 511 is attached to back walls 501 by security strap fasteners 415 which can be seen in FIGS. 26 and 27. Strap 511 buckles over padded straps 503 when securing the straps to the carrier using security strap buckle housing 513 and security strap buckle insert 515. Attached at both sides at the bottom of padded support 501 are security strap pads 521 which extend out from the sides of padded support 501 and provide padding where security strap 511 would run so that way the user will not feel the strap directly against them.

Figure 23:
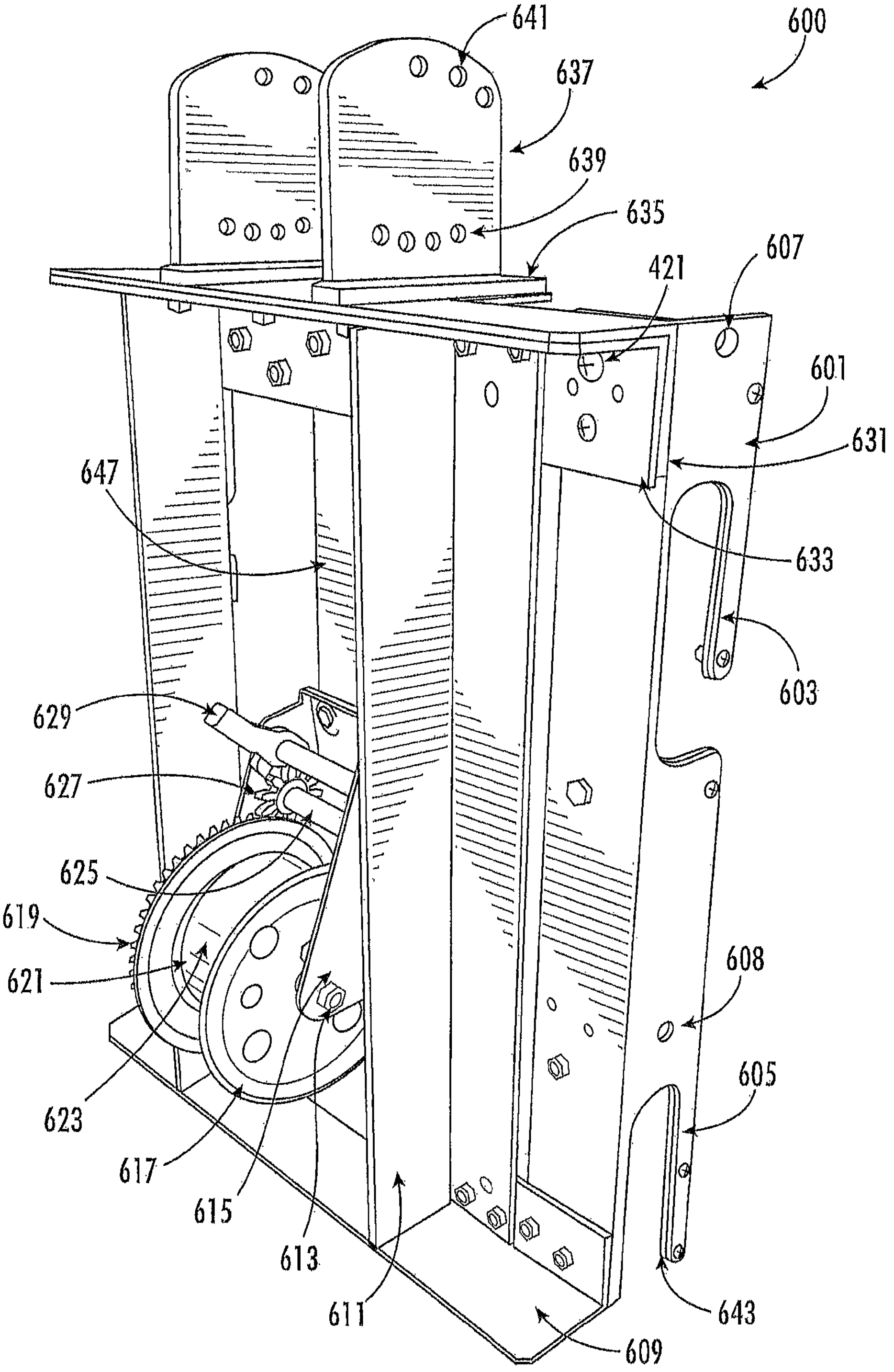
FIG. 23 is a perspective view of a winch casing of the building ladder hoist of FIG. 21.
Figure 24:
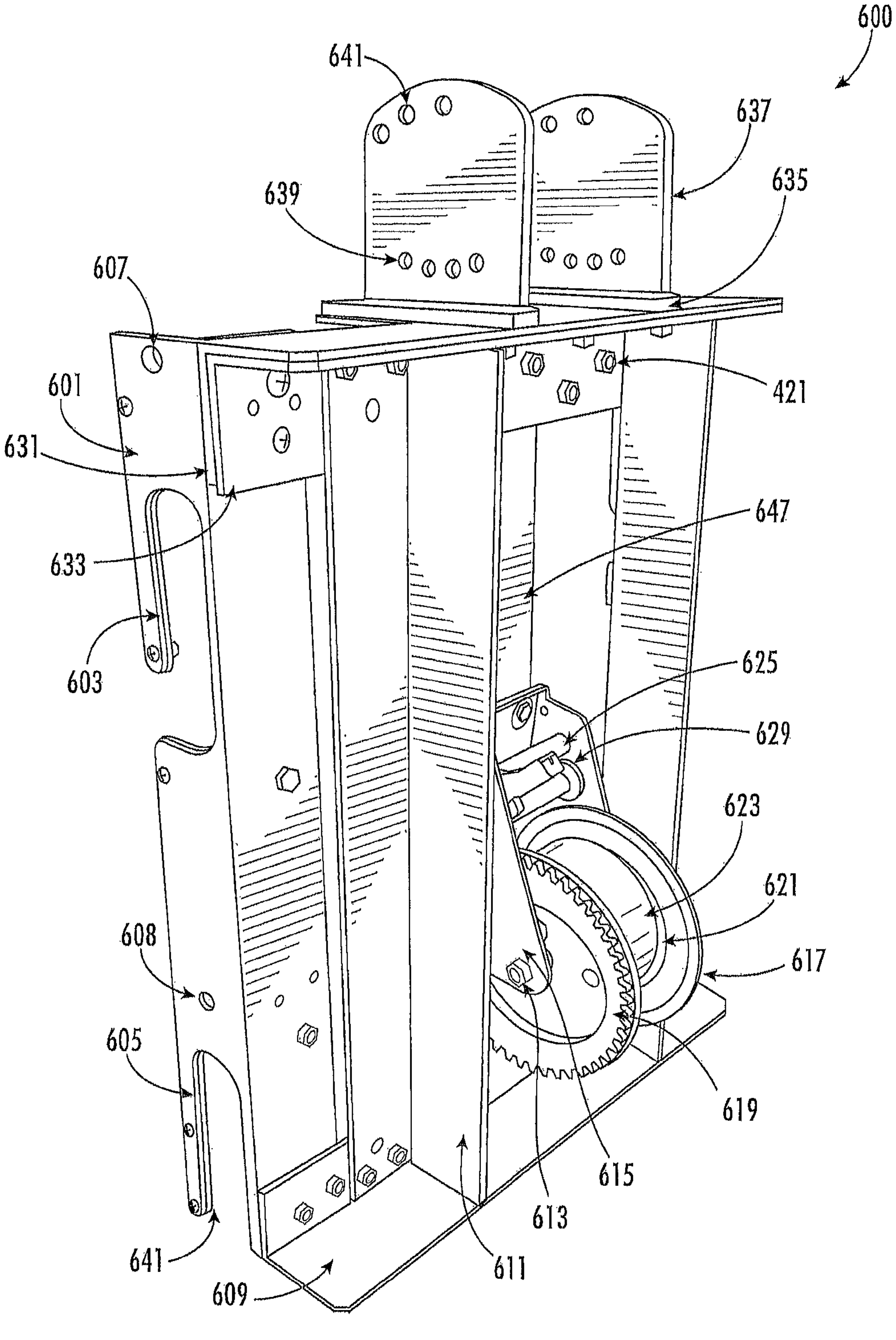
FIG. 24 is a perspective view of the winch casing of FIG. 23.

Referring now also to FIGS. 23 and 24 in the drawings, the sides of winch casing 600 with the telescopic winch boom 647 in the retracted position are depicted. These side views show that winch casing 600 comprises fasteners 421, side plate 601, upper groove 603, lower groove 605, upper insert hole 607, lower insert hole 608, bottom plate 609, side walls 611, winch axle fastener 613, winch base 615, winch outer plate 617, winch main gear 619, winch axle 621, winch strap 623, winch support bar 625, inner winch gear 627, rotational security bar 629, upper top plate 631, lower top plate 633, handle plate supports 635, handle plates 637, lower adjustment holes 639, upper adjustment holes 641, and side support plate 643.

Winch casing 600 is rectangular in shape and is formed by side plates 601, base plate 609, side walls 611, upper top plate 631 and lower top plate 633. The walls and plates of winch casing 600 may be made out of metal, wood, plastic, or any other light weight sturdy material. Being light weight, in combination with being hollow, allows winch casing 600 to be as light as possible to make it easy for individuals to carry ladder hoist 400 with them. Side plate 601 is L-shaped with one end protruding out from the back of ladder hoist 400. Base plate 609 is also L-shaped and connects to the front of the bottom of side plate 601 and connects to the back of the bottom of side wall 611. Upper top plate 631 is L-shaped and connects to the top front of side plate 601 and lower top plate 633 is also L-shaped and connects to the front of upper top plate 631 so that the top plates are stacked on top of each other to add extra support and stability for winch casing 600 when the winch is in use. Side wall 611 is L-shaped and is next to side plate 601 and extends up from bottom plate 609 up to lower top plate 633. All of these plates and walls may be connected to each other either through general fasteners 421, or by being welded together.

The section of side plate 601 which protrudes out from the back of winch casing 600 has two grooves, upper groove 603 and lower groove 605. Upper groove 603 is nonlinear in shape and extends inward from the side of side plate 601 before extending upward. Lower groove 605 starts at the bottom of side plate 301 and extends upward before ending. These grooves are used to allow the user to have and quick and easy way to secure winch casing 600 to a ladder. The reason that upper groove 603 has its nonlinear shape is that it the notches will catch onto the ladder which will prevent winch casing 600 from coming undone during the process. At the groove locations on side plate 601, there is also side support plate 643 which has the same shape as the grooves on it and is connected to side plate 601 to provide extra support for the casing when in use. Found above upper groove 603 there is upper insert hole 607 and above lower groove there is lower insert hole 608. Also, when winch casing 600 and removable carrier casing 500 are together, upper insert 423 will be inserted through insert hole 607 and lower insert 625 will be inserted through insert hole 608 in order to secure these two casings together.

FIGS. 23 and 24 also provide a look at the winch system when it is not in use on winch casing 600. Connecting to the inside walls of side walls 611 is winch base 615. Between the two sides of winch base 615 are support bars 625 which provide extra support for the whole system in order to keep it in place. Winch base 615 is C-shaped with the bottom edge extending further out then the upper edge. Rotational security bar 629 is connected to right side of winch base 615. Rotational security bar 629 is mostly flat with a tab protruding out from the end of it which the user will pull on to us it. Security bar 629 is designed so that a user will be able to pull on the bar in order to stop the gears inside the winch from turning in case the user wants to keep the item they are hoisting in place or if they lose control of the winch and need to stop it. Security bar 629 is connected to a support bar between winch base 615 and has a small protrusion sticking out it and pointing in towards the gears of the winch. By pulling on rotational security bar 629, the protrusion will catch on inner winch gear which 627 which will prevent it from turning. By pulling on security bar 629, the hoist will operate down, and when pushed the hoist will operate up.

The winch system is between winch base 615 and connecting both sides of this base is winch axle 621 which is connected to the base by axle fastener 613. Attached to the ends of winch axle 621 but in-between the two sides of winch base 515 are two winch outer plates 617. Axle fastener 613 extends through both outer plates 617 and through axle 621 to secure the winch system to winch base 615. On the outer side of the left out plate 617 there is winch main gear 619 which is the main gear that moves winch strap 623. Winch strap 623 is stored by being wrapped around winch axle 621 when not in use and then winch main gear 619 is turned in order release and lower winch strap 623. Connected to the top of upper top plate 631 are two handle plate supports 635 which extend upward into handle plates 637. Handle plates 637 are rectangular in shape and end with a curved portion. At the top of handle plates 637 there are three upper adjustment holes 641 and at the bottom there are four lower adjustment holes 639. Pin 671, which can be seen in FIG. 28, can be inserted into one of these holes to adjust the angle that boom 647 will sit at when in use while also keeping it locked in place there.

Figure 25:
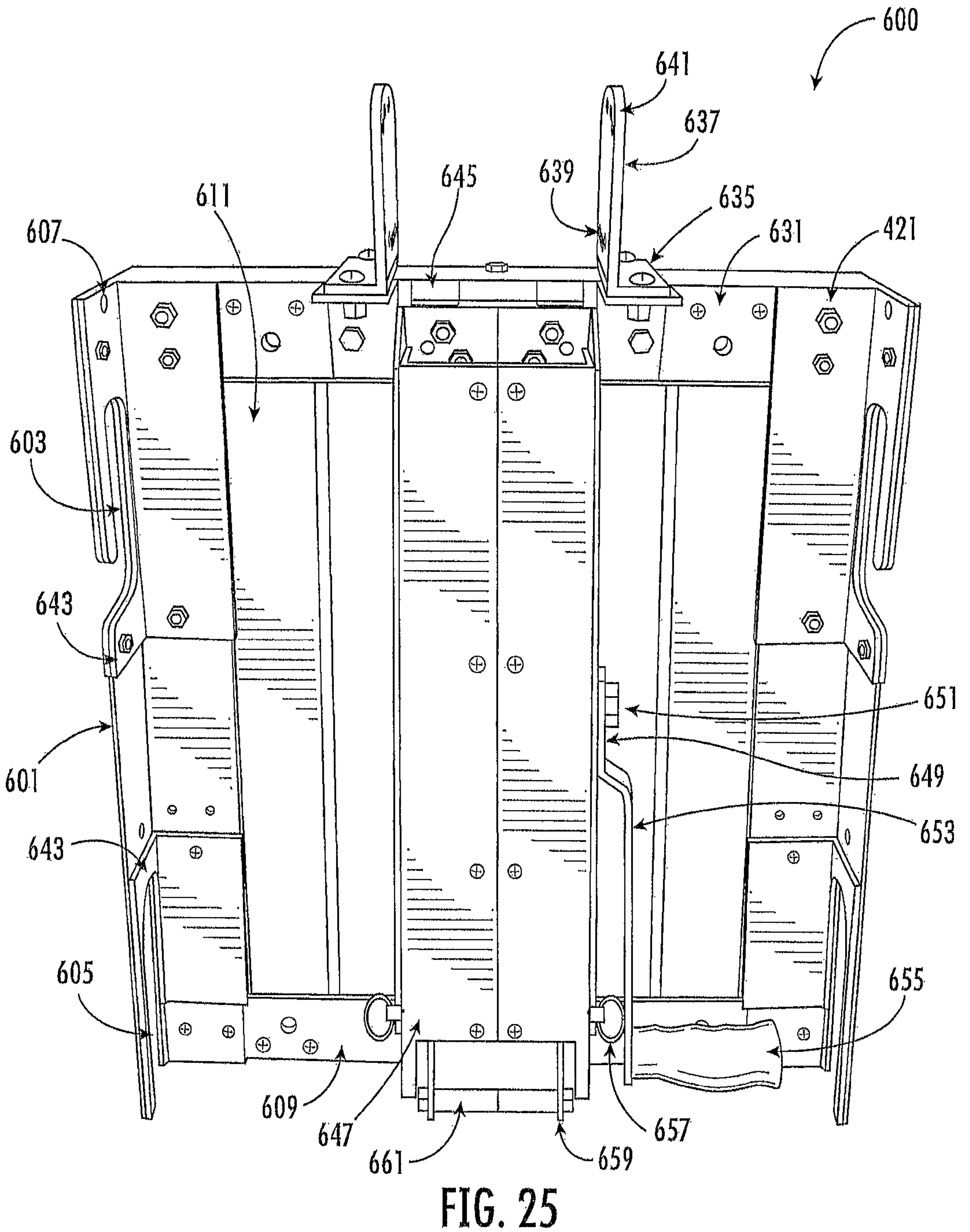
FIG. 25 is a rear view of the winch casing of FIG. 23.

Referring now also to FIG. 25 in the drawings, the back of winch casing 600 is depicted. Along with what was shown in FIGS. 23 and 24, FIG. 25 shows that winch casing further comprises a hinge 645, an adjustable boom 647, a winch handle base 649, a winch handle fastener 651, a winch handle bar 653, a winch handle grip 655, fastener pins 657, a winch strap edge support 659, and a winch strap edge axle 661. Hinge 645 is connected to the back of upper top plate 631 and allows for adjustable boom 647 to be pulled up into position. Adjustable boom 647 is a rectangular hollow telescoping structure that is used with the wench to hoist items up. Adjustable boom 647 has extra length stored inside of it and the user can extend the length of boom 647 by removing pins 657 from the side of boom 647 then inserting them back in once a desired length has been met. Winch base 615 is attached to the top of boom 647 and FIG. 25 shows that on one side of winch base 615 there is the handle system used to turn the gears and work the wench. This handle system is comprised of the winch handle base 649 which is square in shape and is fastened to the side of winch base 615 by fastener 651. Handle base 649 then curves up at an angle before straightening out again to form winch handle bar 653 which extends out before ending in a curved edge. Winch handle grip 655 is attached perpendicular to the end of handle bar 653 and provides a location for the user to crank the handle system to work the winch. At the very end of boom 647 there is winch strap edge support 659 which is two prongs that extend out from the end of boom 647 and winch strap edge axle 661 spans the gap between these two prongs. Edge support 659 and axle 661 are used as a pulley system with winch strap 623 to make it easier for the winch system to hoist items so that way the user does not have use as much effort to lift heavy objects.

Figure 26:
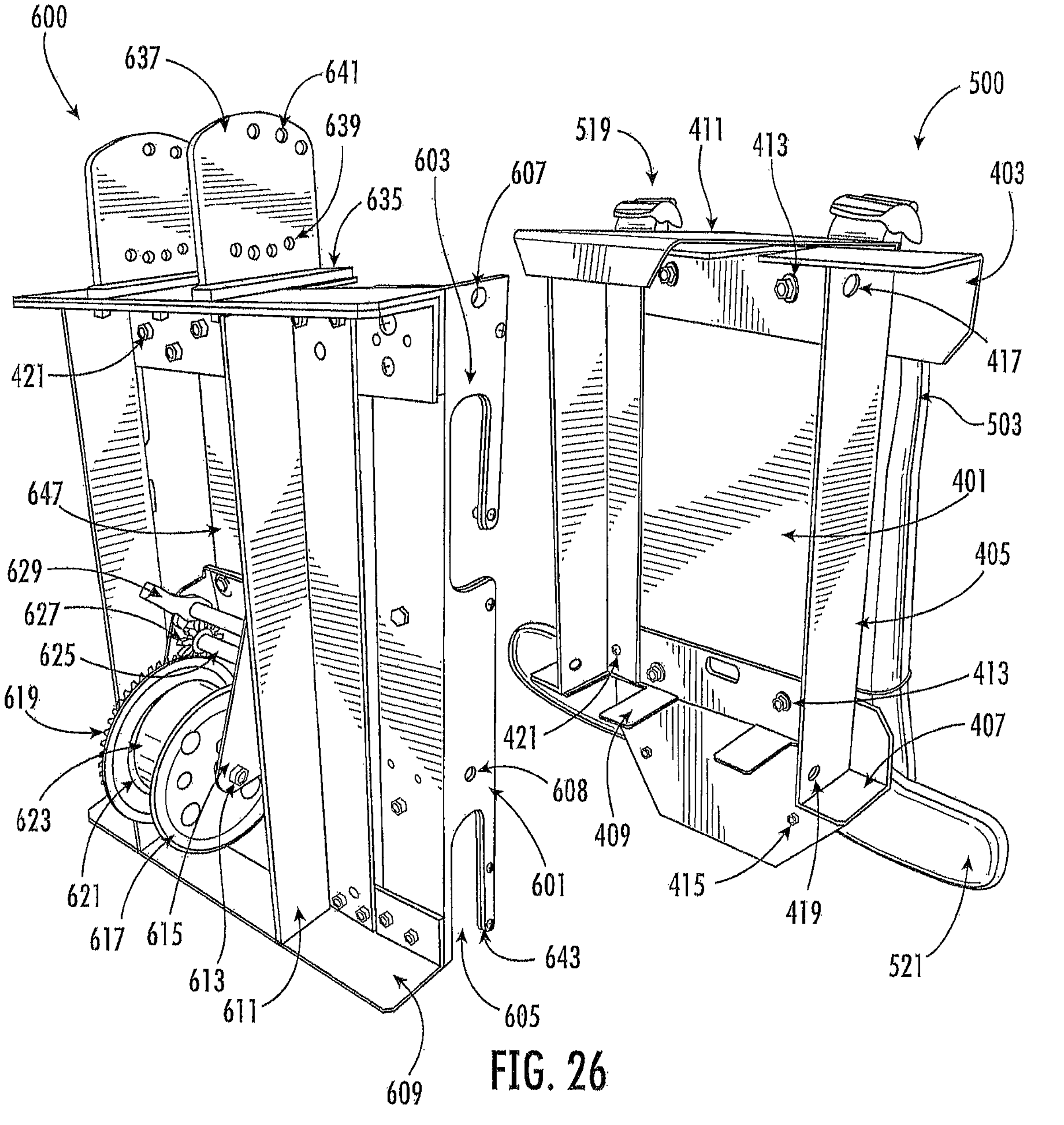
FIG. 26 is a perspective view of the winch casing of FIG. 23, separated from the remainder of the building ladder hoist of FIG. 21.

Referring now also to FIG. 26 in the drawings, a perspective view of the carrier casing 500 and winch casing 600 when not connected is depicted. FIG. 26 shows the general orientation of these two casings in relation to each other. One of the main functions of these two casings is to be easily removed from each other for quick work and FIG. 26 shows the orientation between them normally.

Figure 27:
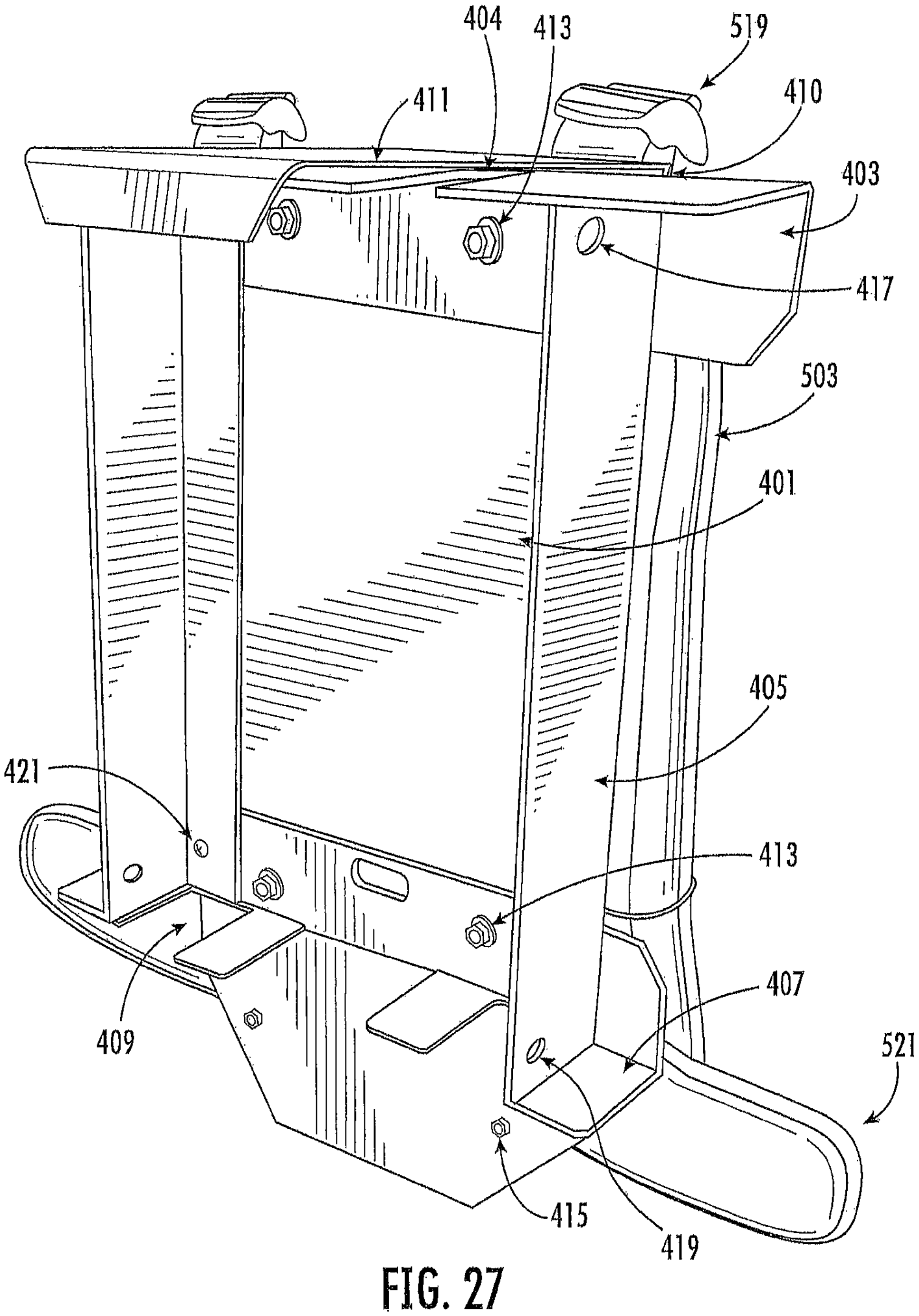
FIG. 27 is a perspective view of a removable carrier/casing of the building ladder hoist of FIG. 21.

Referring now also to FIG. 27 in the drawings, a perspective view of carrier casing 500 is depicted. Carrier casing 500 is shown to be comprised of a back wall 401, top portion 403, top grooves 404, a pair of side walls 405, a bottom portion 407, bottom grooves 409, top plate hinge 410, top plate 411, top plate grooves 412, back cushion fashioners 413, security strap fasteners 415, upper insert hole 417, lower insert hole 419, and general fasteners 421. The walls and plates of carrier casing 500 may be made out of metal, wood, plastic, or any other light weight sturdy material. Being light weight, in combination with being hollow, allows winch casing 500 to be as light as possible to make it easy for individuals to carry ladder hoist 400 with them. All of these plates and walls may be connected to each other either through general fasteners 421, or by being welded together.

Back wall 401 forms the main structure of carrier casing 500 and is rectangular in shape but has a segmented bottom that is comprised of three straight portions. Attached to the front and top of back wall 401 is top portion 403 which is L-shaped. Top portion 403 extends the entire width of back wall 401 along with extending out from the sides of back wall 401. Part of top portion 403 protrudes out from the front of back wall 401 and that protruding portion contains two grooves 404 which allow handle plates 637 to fit into top portion 403. Attached to the front and the bottom of back wall 401 is bottom portion 407 which is also L-shaped. Bottom portion 407 also extends the width of back wall 401 as well as extending out from the sides of back wall 401. The section of bottom portion 407 which protrudes out from back wall 401 has three bottom grooves 409 instead of the two in top portion and these grooves align with boom 647 and the side walls 611. The grooves located at the top and bottom section of carrier casing 500 help secure the components of winch casing 600 in place so that way during movement there will be a less likely chance of the parts becoming damaged. Extending between top portion 403 and bottom portion 407 are side walls 405 which is a rectangular plate which extends the full length between them to help with support.

Attached to the top of top portion 403 is top plate 411. Top plate 411 is connected to top portion 403 by hinge 410 which allows for top plate 411 to be moved up and down at will. The reason for this is that top plate 411 has two grooves 412 in it that are aligned with handle plates 637. So handle plates 637 will be inserted into place before handle insert 421 is place into one of adjustment holes in it and it will work as another way of securing wench casing 600 to carrier casing 500. Side wall 405 further has upper insert hole 417 and lower insert hole 419 which, when connected with winch casing 600, coincide with the insert holes found there and once the inserts are placed in these two casings will be securely connected.

Figure 28:
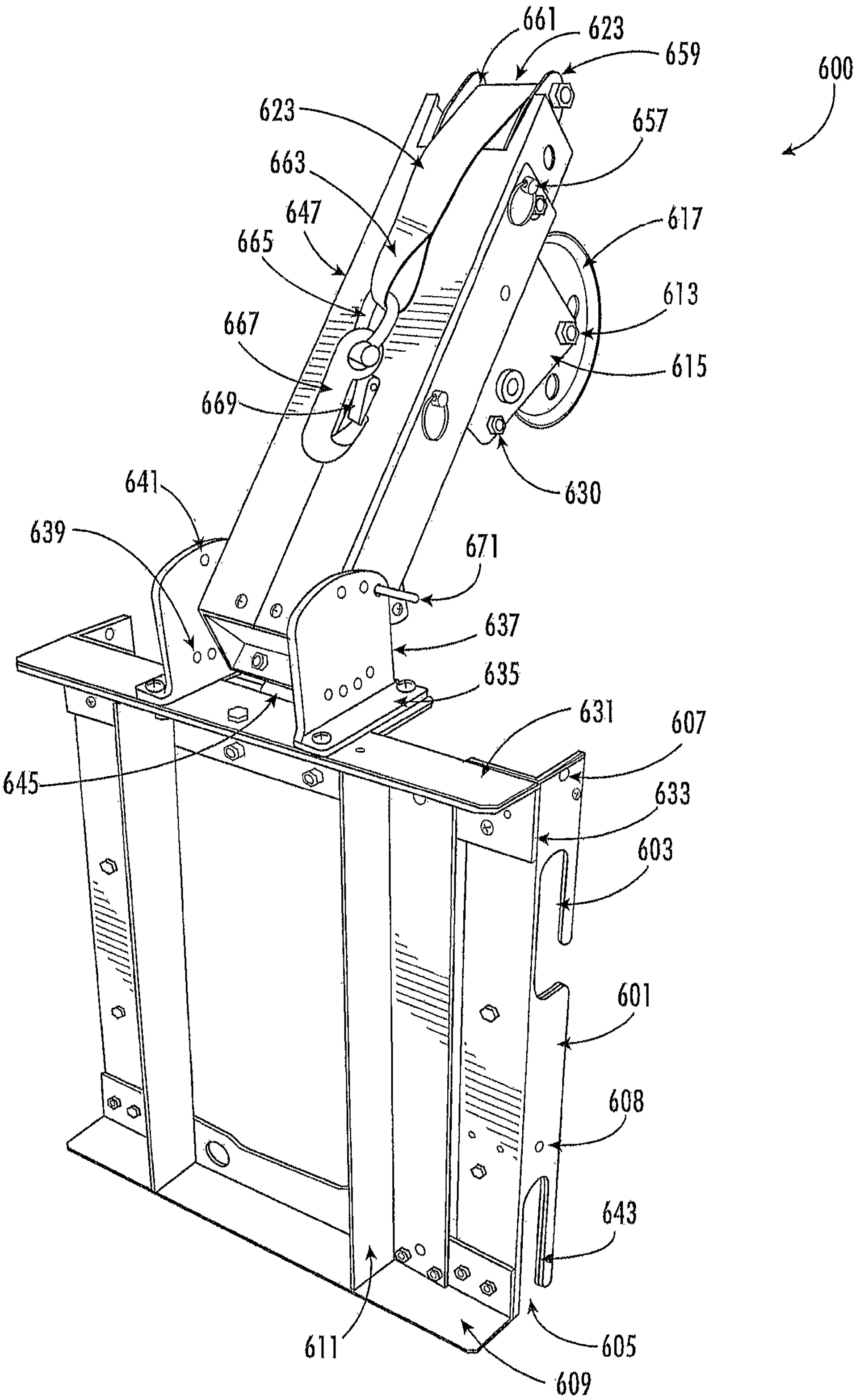
FIG. 28 is a perspective view of the winch casing of FIG. 23.
Figure 29:
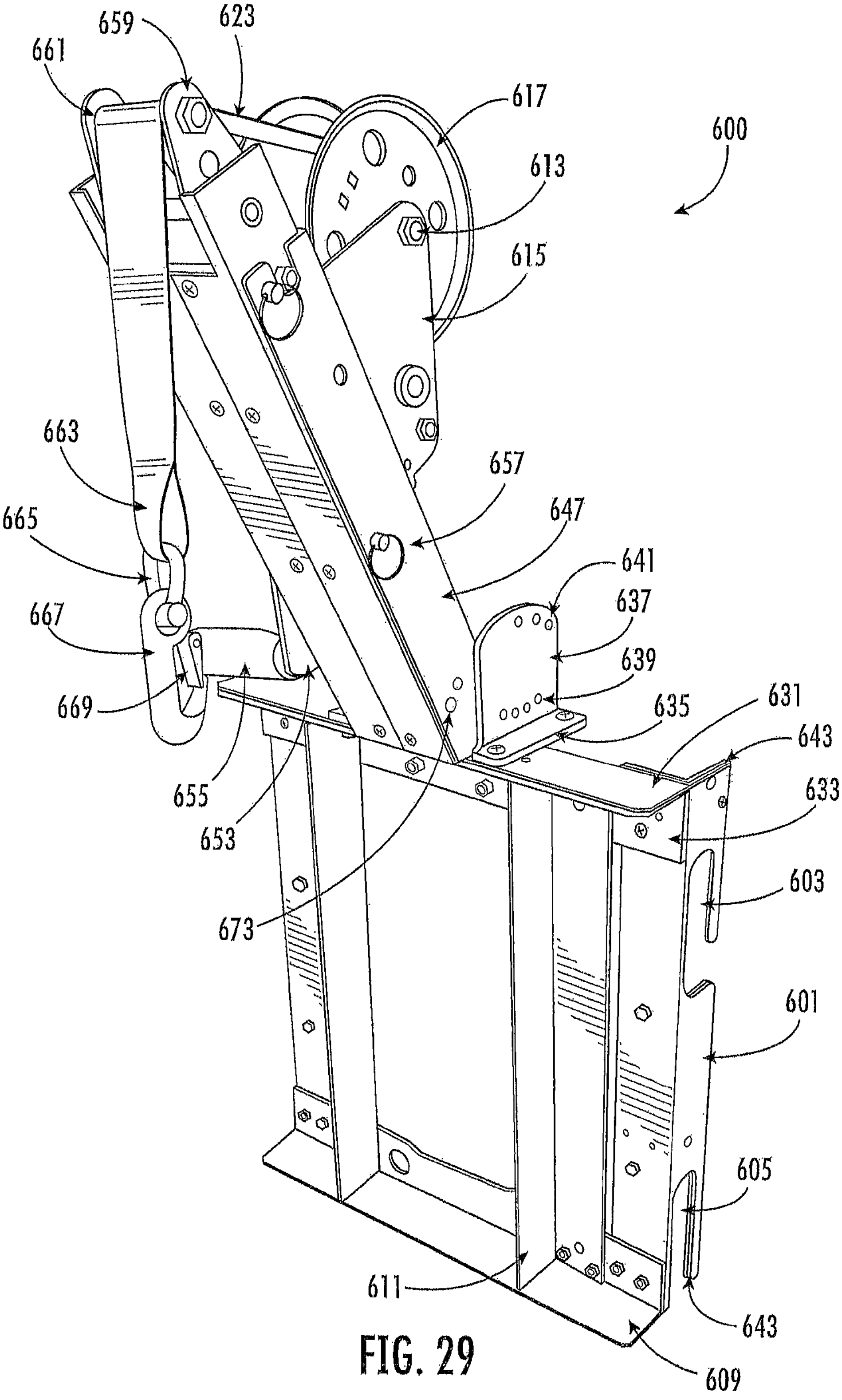
FIG. 29 is a perspective view of the winch casing of FIG. 23.

Referring now also to FIGS. 28 and 29 in the drawings, a perspective view of winch casing 600 with boom 647 deployed is shown. Along with what was shown in previous figures, winch casing 600 is shown to comprise winch strap loop 663, connecting hook 665, hoist hook 667, latch 669, pin 671, and boom holes 673. The hook system seen here works in the same way as the hook system in the previous embodiment. Pin 671 is just a straight piece of metal which is used in the system by being inserted through handle plates 637 to either have boom 647 rest on it or being inserted through holes 673 found there on the boom to secure it in place.

Figure 30:
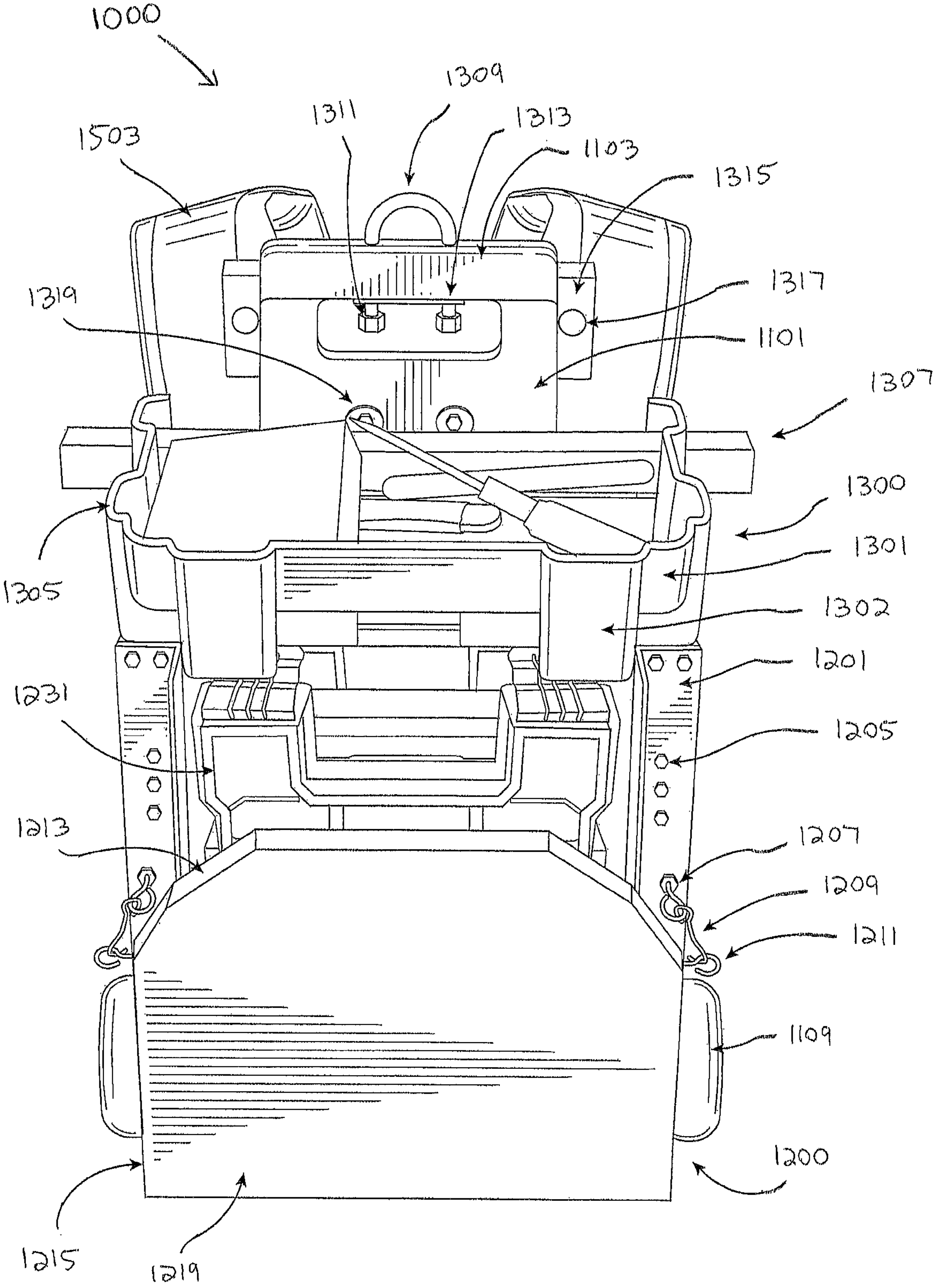
FIG. 30 is a front view of a tool carrier according to a preferred embodiment of the present invention.

Referring now also to FIG. 30 in the drawings, a tool cart 1000 with backpack straps and dolly is illustrated. FIG. 30 shows that tool cart 1000 comprises a hollow arched base 1101, a top handle portion 1103, wheels 1109, retractable tow cradle 1200, L-shaped base 1201, base fasteners 1205, base fastener 1207, fastening tab 1209, dolly fastener 1211, segmented arched dolly wall 1213, dolly side walls 1215, dolly base 1219, tool kits 1231, carry-on tray 1300, carry-on tray walls 1301, carry-on tray lip 1305, cross bar handle 1307, retractable hoist ring 1309, hoist ring stoppers 1311, hoist ring guard 1313, strap attachment base 1315, strap attachment fasteners 1317, padded back fasteners 1319, and replaceable padded straps 1503. Tool cart 1000 is used in order to store tool kits 1231, or other equipment, in the cart that will allow the user to cart their tools and equipment around without subjecting the individual to undue strain.

Although the present invention has been described with respect to hand tools, power tools, and equipment used by workers, such as heating and air conditioning workers, it will be appreciated that tool cart 1000 may easily be adapted and used by other types of workers, such as health care workers, military personnel, and other types of first responders. For example, emergency medical workers could use tool cart 1000 as a medical rescue pack to store, transport, and use items such as automated external defibrillators, oxygen tanks, medicine, bandages, IV bags, and other such emergency medical equipment.

Base 1101 is preferably hollow in order to ensure that tool cart 1000 will maintain a light enough weight for a user to carry it without issue. Tool cart 1000 may be made out of plastic, metal, wood, or any other lightweight material. Top handle portion 1103 forms the top of tool cart 1000 and is square in shape and solid besides the handle portion at the very top and extends down to connect to back wall 1105 of tool cart 1000 which can be seen in FIG. 32. The bottom sides of handle portion 1103 connect to end walls 1107, also shown in FIG. 32, which in combination forms the storage area that tool kits 1231 will be stored in. It is appreciated that the dimensions and shapes of the end walls may change to accommodate whatever various shapes of tool kits 1231. Wheels 1109 are at the bottom of tool cart 1000 which allow the user to tow tool cart 1000 without having to carry it.

Retractable hoist ring 1309 is a U-shaped ring which is inserted into the top of hollow arched body 1101 at top handle portion 1103. The hoist ring 1309 usually stays in the down position, due to gravity, but can be pulled up to allow the user to attach a rope, hoist, or any other object to hoist ring 309 to hoist it up somewhere so that way they don't have to carry it. Stoppers 1311 prevent ring 1309 from fully going through hollow arched body 1101 when it is being hoisted. Stoppers 1311 are larger than the hole that ring 1309 is inserted through and so once ring 1309 has gone a certain length it will no longer be able to be pulled out further. These stoppers make sure that ring 1309 will not be pulled out of the system while tool cart 1000 is being hoisted up. Hoist ring guard 1313 is also found on the underside of top handle portion 1103 which provides another guard for when hoist ring 1309 is used. Hoist ring guard 1313 will prevent stoppers 1311 from damaging handle portion 1103 when hoist 1309 is engaged.

Strap attachment base 1315 protrudes out from the sides of top portion 1103 and is a location to attach replaceable straps 1503 to tool cart 1000. Straps 1503 are secured to attachment base by strap attachment fasteners 1317. Fasteners 1317 keep straps 1503 in place on tool cart 1000 while also allowing the user to undue fasteners 1317 in order to replace straps 1503. Also shown in this area, padded back fasteners 1319 are located in top portion 1103 below the handle. Fasteners 1319 connect the padding found on the back of tool cart 1000 to hollow arched body 1101.

Figure 31:
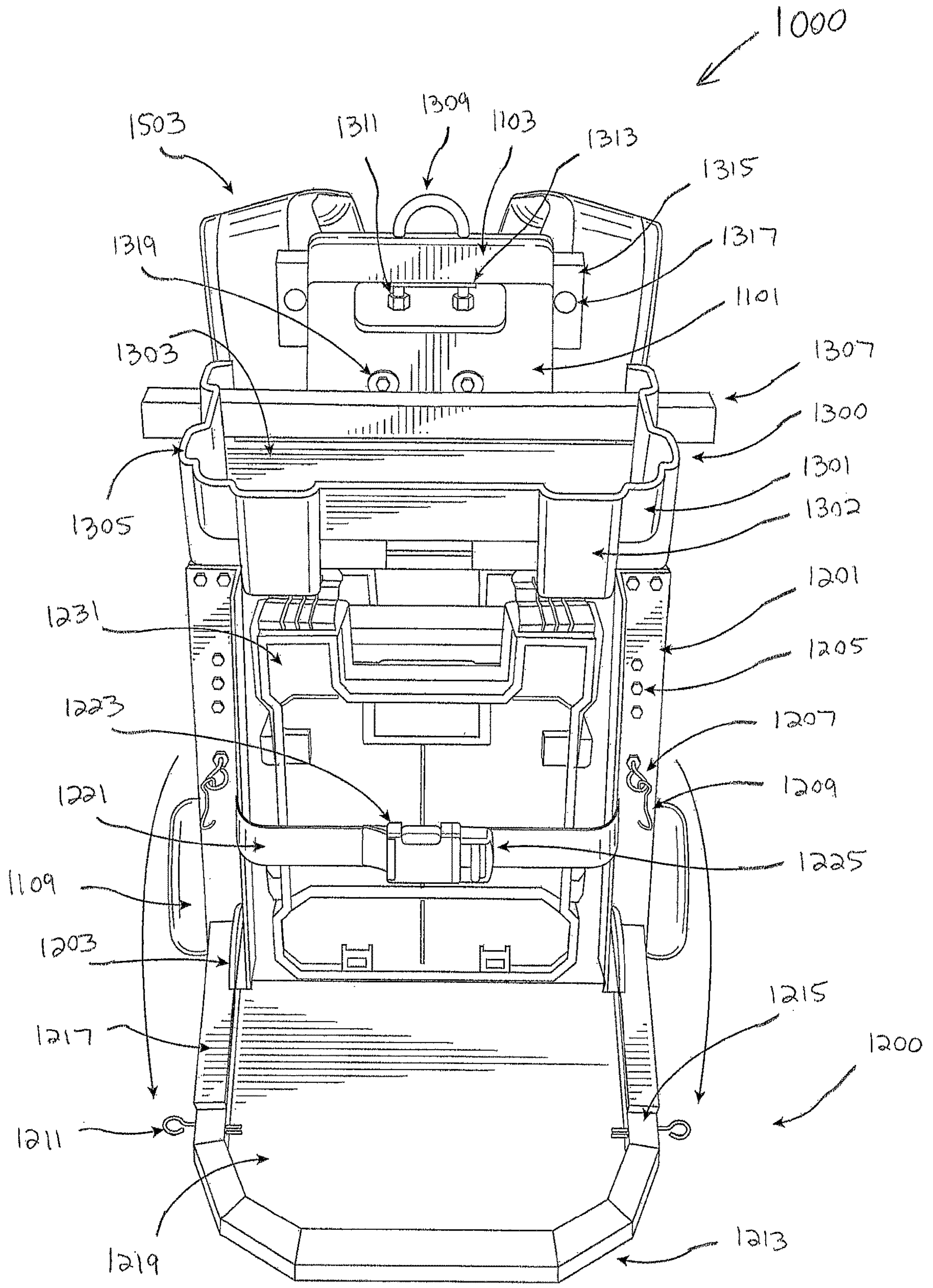
FIG. 31 is a front view of the tool carrier of FIG. 30.

Referring now also to FIG. 31 in the drawings, the front of tool cart 1000 is depicted with the retractable tow cradle 1200 in the down position. Retractable tow cradle 1200 further comprises L-shaped base 1201, dolly support hinge 1203, base fasteners 1205, base tab 1207, fastening tab 1209, dolly tab 1211, segmented arched dolly wall 1213, dolly side walls 1215, support base 1217, dolly base 1219, security strap 1221, security strap buckle housing 1223, security strap buckle insert 1225, and tool kits 1231. FIG. 31 also depicts carry-on tray 1300, carry-on tray walls 1301, carry-on tray wall protrusions 1302, carry-on tray base 1303, carry-on tray lip 1305, cross bar handle 1307, hoist ring 1309, hoist ring stoppers 1311, hoist ring guard 1313, strap attachment base 1315, strap attachment fasteners 1317, padded back fasteners 1319, and replaceable padded straps 1503.

Retractable tow cradle 1200 is preferably designed to hold another object on tool cart 1000 while it is in tow. This object could be a tank, a vacuum pump, more tools, or any other object that the user wants to tow. This gives the user a place to tow the heavy objects so that way they do not have to physically carry them with their hands while traveling to the job site. This will save trips and also prevent the user from experiencing undue strain on the body. Tow cradle 1200 may be made out of plastic, wood, metal, or any other light weight material.

Retractable tow cradle 1200 is formed by having walls surrounding base 1219. The first wall is the front wall which is segmented arched dolly wall 1213. Wall 1213 is segmented into 5 straight sections, but may be split into any number of sections, that form an arch for a front walls. The final two segments on either side connect to end walls 1215. There is no back wall and these walls form a small barrier used to prevent objects being towed from sliding off of the dolly.

Figure 35:
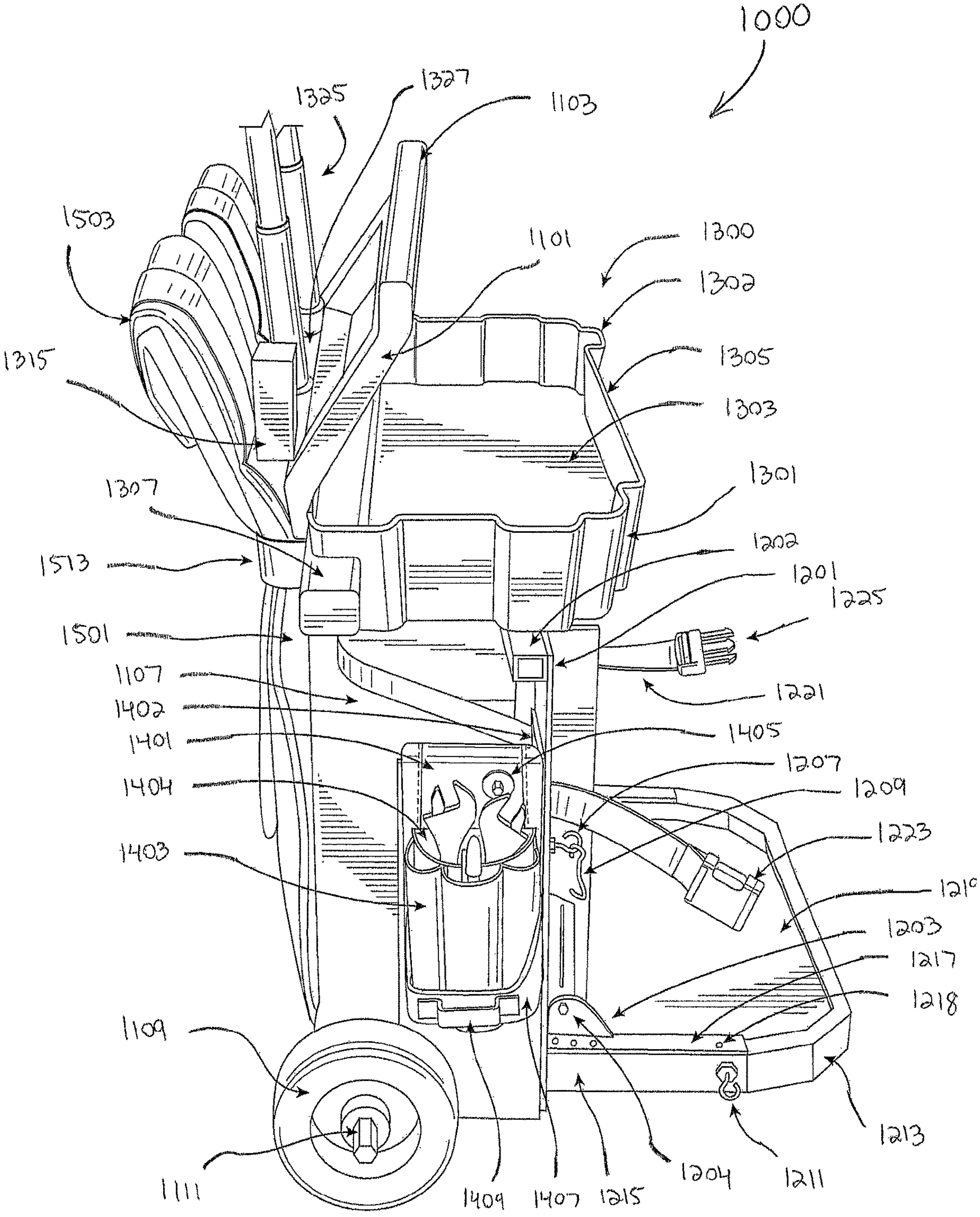
FIG. 35 is a perspective view of the tool carrier of FIG. 30.

Connecting to end walls 1107 is L-shaped base 1201 which has one end extending out from end wall 1107 and another end perpendicular to end wall 1107 which is connected to base support 1202 and tool bag support 1402, which can be seen in FIG. 35, by fasteners 1205. Base support 1202 is a rectangular projection that goes through the top of end walls 1107. Connected at the bottom of base 1201 is dolly support hinge 1203 which is connected to base 1201 by rotatable fastener 1204, which can be seen in FIG. 35. Curved base support further connects to support length 1217 that is fastened to the top of end walls 1215 by fasteners 1218, also seen in FIG. 35, which fully connect the base 1201 to retractable tow cradle 1200. Using rotatable fastener 1204 with support hinge 1203, a user will be able to rotate retractable tow cradle 1200 into the retracted or upright position.

When the retractable tow cradle 1200 is in the upright position, fastening tab 1209 is used to keep it in place. Fastening tab 1209 is hook shaped on both ends of the tab and is used to secure retractable tow cradle 1200 to base 1201. Attached to base 1201 is base tab 1207 which extends out from base 1201 and forms, but is not limited to, a hook shape. Fastening tab 1209 is secured to base tab 1207 by connecting the hook shapes found at the end of each of these tabs, fastening tab 1209 is then hooked to dolly tab 1211 in the same way. Dolly tab 1211 is connected to, and extends through end wall 1215. Dolly tab 1211 is similar in shape to the other tabs in that it has a hook shaped protrusion at the end which fastening tab 1209 connects to. Once fastening tab 1209 is secured to both base tab 1207 and dolly tab 1211, retractable tow cradle 1200 will be firmly secured in the upright position.

FIG. 31 also shows security strap 1221 being used to secure tool kits 1231 in place. The compartment that is formed by back wall 1105 and end walls 1107 is preferably large enough to allow the user to store up to two standard tool kits 1231 in that compartment. It should be appreciated that other equipment may be stored in that compartment besides the tool kits presented. Security strap 1221 is then used to secure tool kits 1231, or any other object, in place during movement. Straps 1221 are connected on both sides to end walls 1107, the left end of strap 1221 has security strap buckle housing 1223 while the right end has security strap buckle insert 1225. Buckle insert 1225 is inserted into buckle housing 1223 when the user wishes to securely confine the contents of the compartment.

Depicted towards the top of tool cart 1000, another container to carry tools, carry-on tray 1300, is shown. Carry-on tray 1300 may be made out of plastic, wood, metal, or any other light weight material. Carry-on tray 1300 is rectangular in shape and is formed by walls 1301 which may also have curved protrusions 1302 along the walls all of which connect down to base 1303. It is appreciated that the shape of carry-on tray 1300 may differ and is not restricted to being rectangular. Protrusions 1302 extend out from the sides of walls 1301 in a rectangular shape, going from the top of the wall to the bottom connecting to the base, but it is appreciated that these protrusions may take on any shape. At the top of walls 1301 there is carry-on tray lip 1305 which extends slightly outward from walls 1301. Cross bar handle 1307 also goes through carry-on tray 1300 which can be used as extra support for the tray. Cross bar handle 1307 is rectangular in shape and protrudes out from both sides of tool cart 1000 and may be used by the user as a means of lifting up tool cart 1000.

Figure 32:
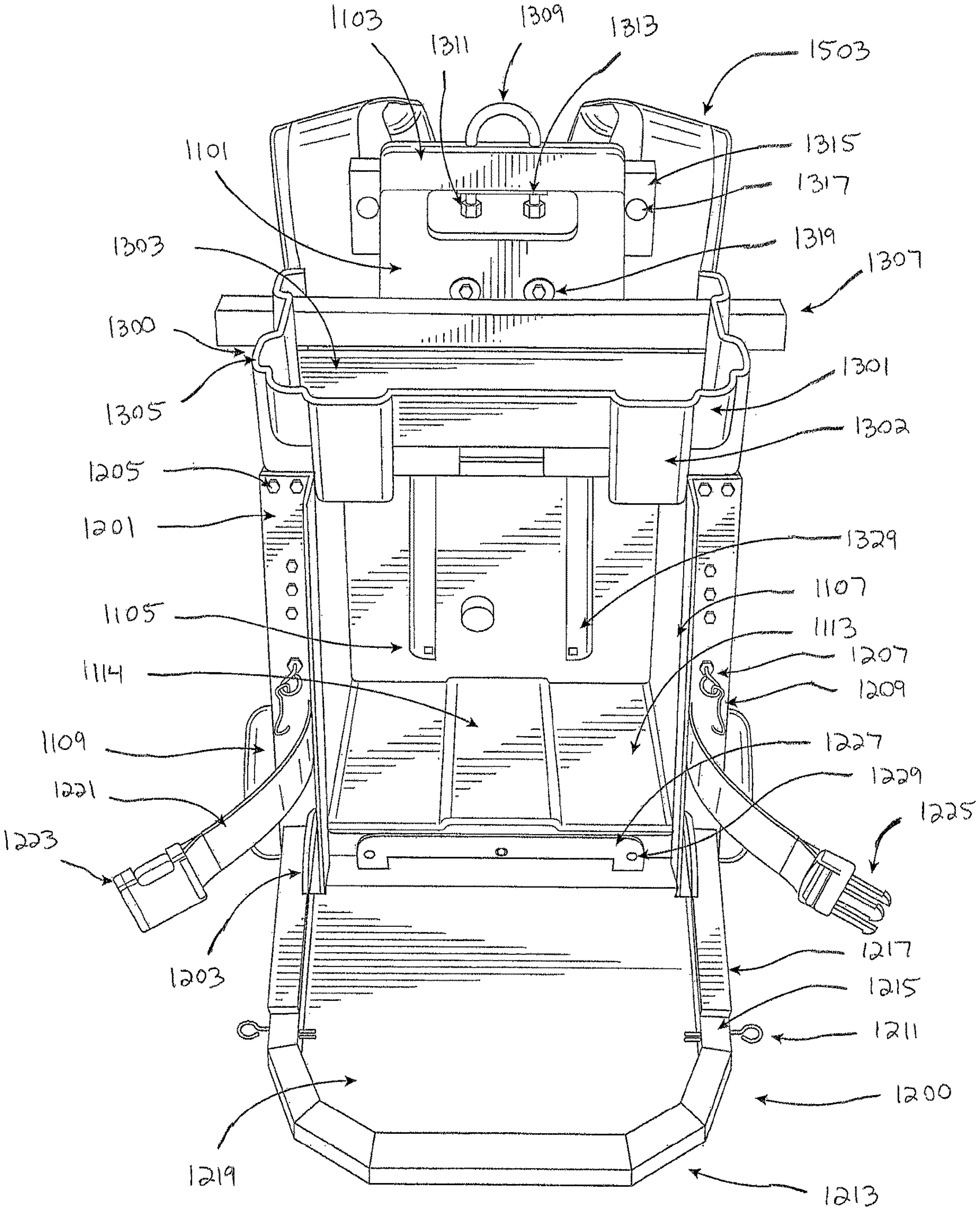
FIG. 32 is a front view of the tool carrier of FIG. 30.
Figure 33:
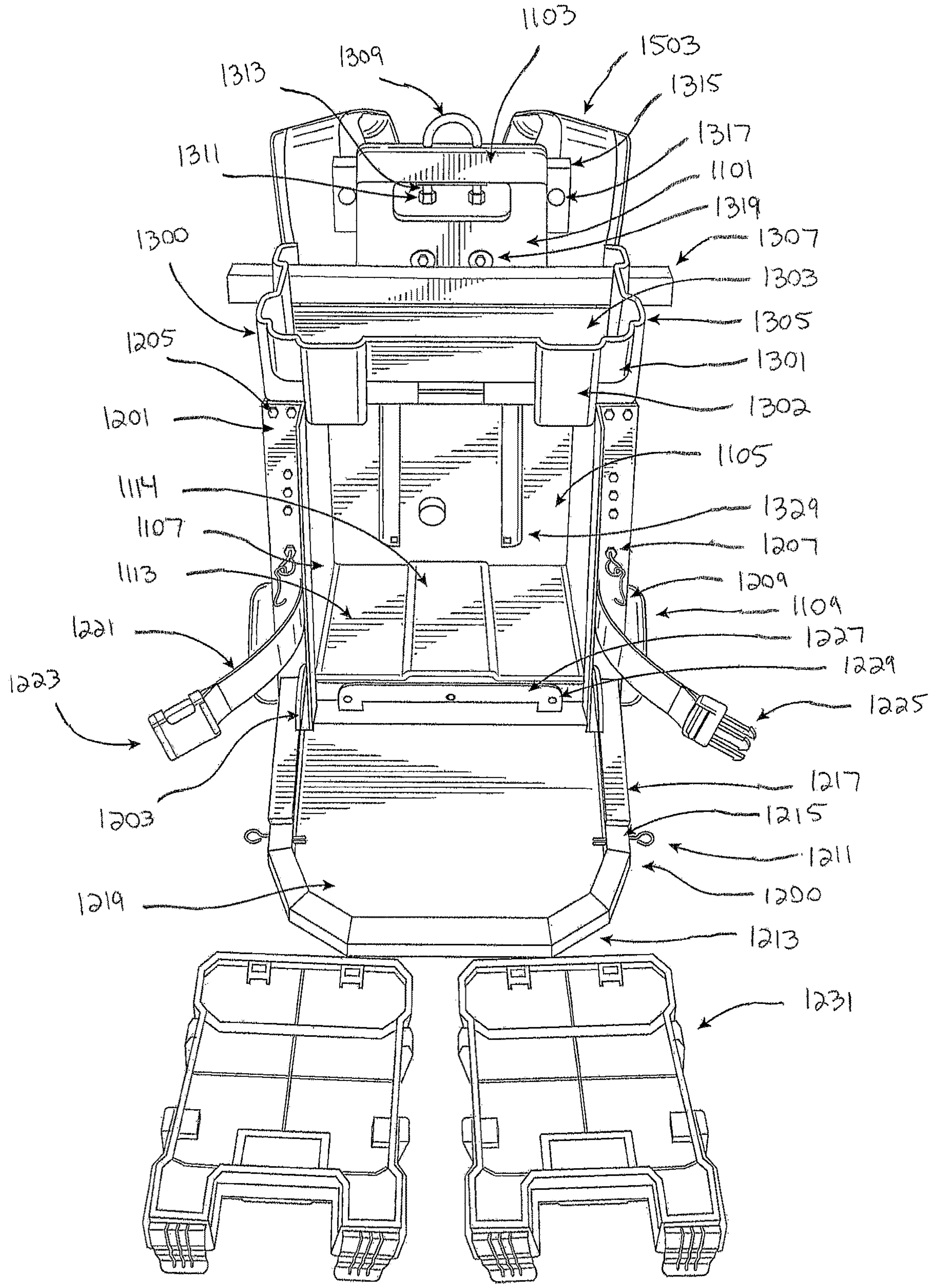
FIG. 33 is a front view of the tool carrier of FIG. 30.

Referring now also to FIGS. 32 and 33 in the drawings, a front view of tool cart is shown without tool kits 1231 inserted in it. These figures provide a clear look at the compartment that is formed where tool kits 1231 will be stored. Base 1113 is shown as having an upward protrusion 1114 along the center of it which creates two outer grooves which are designed to accommodate tool kits 1231, or other objects, and have them properly secured in the compartment. It is appreciated that the shape of the protrusion 1114 on base 1113 may be subject to change depending on the need. Base 1113 connects to back walls 1105 and end walls 1107 at their bottom as the final portion of the storage compartment. Attached to the front of base 1113 are support legs 1227 which are fastened to the front of base 1113 by fasteners 1229. Support legs 1227 are used to support tool cart 1000 in place when not in movement as they will prevent the cart from tipping over forward.

Figure 34:
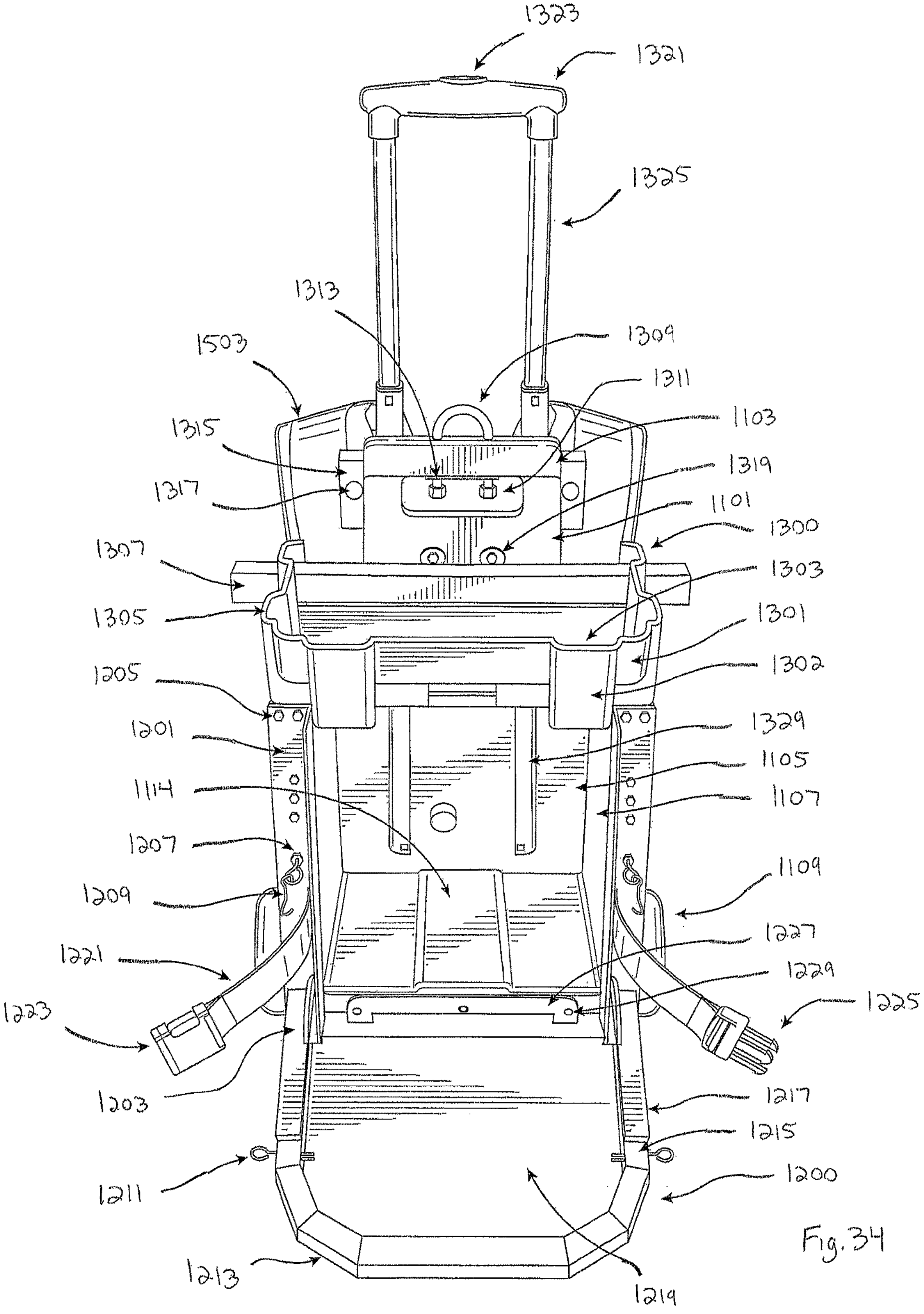
FIG. 34 is a front view of the tool carrier of FIG. 30.

Referring now also to FIG. 34 in the drawings, a front view of tool cart is shown with the tow system displayed. Tow system is formed by tow handle 1321, handle release 1323, telescoping bars 1325, tow handle base 1327, and bar storage 1329. Tow handle 1321 is found towards the top of tool cart 1000 and is used in combination with wheels 1109 to allow a user to tow tool cart 1000 behind them. At the top of tow handle 1321 is tow handle release 1323 which, when pressed down, releases tow handle 1321 to be pulled away from arched body 1101. When pressed down, tow handle release 1323 releases telescoping bars 1325 to allow them to be pulled out of tow handle base 1327, which can be seen in FIG. 35. When not in use, telescoping bars 1325 are stored in bar storage 1329 which is attached to back wall 1105.

Figure 36:
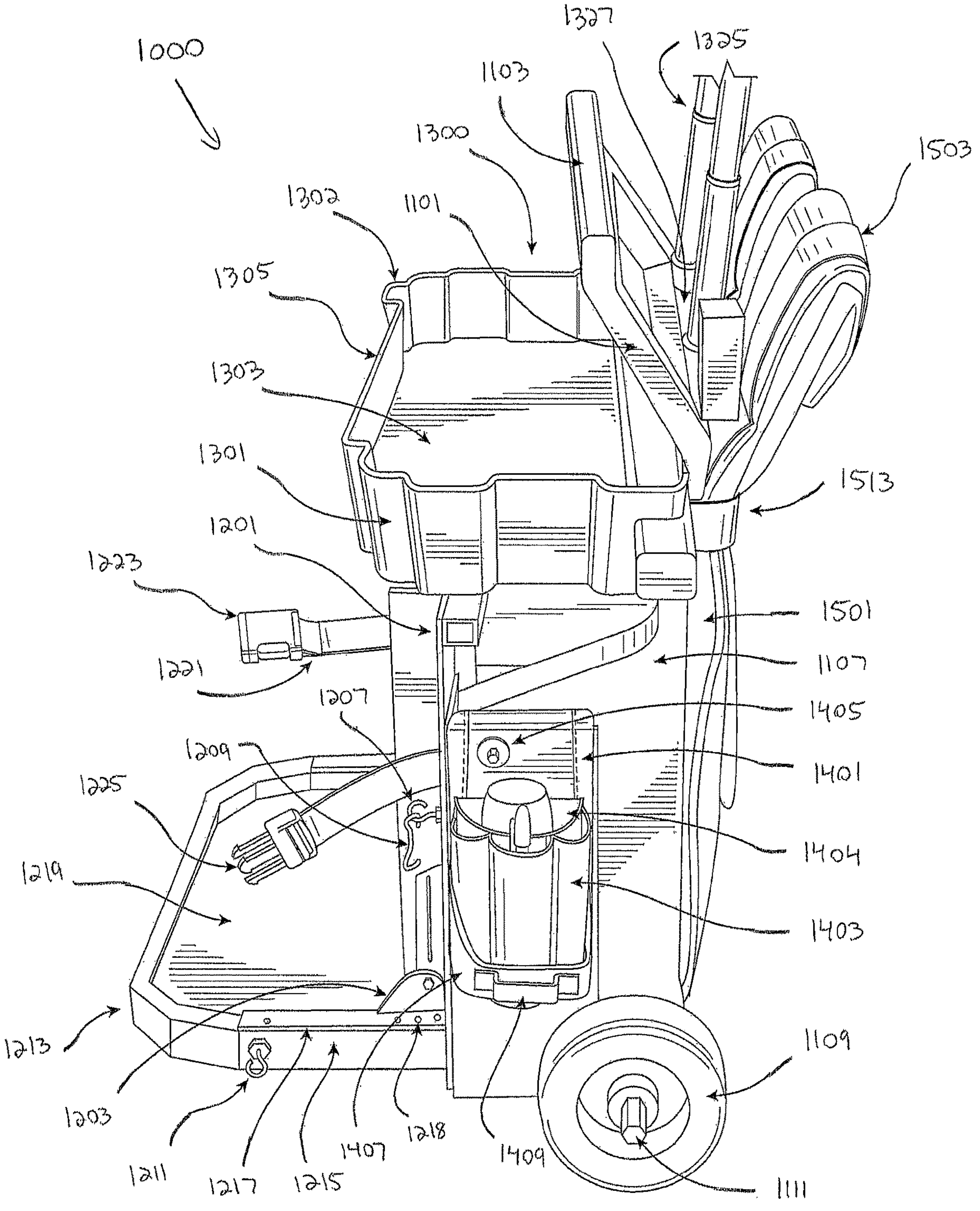
FIG. 36 is a perspective view of the tool carrier of FIG. 30.

Referring now also to FIGS. 35 and 36 in the drawings, a side view of tool cart 1000 is depicted. These figures show that the sides of tool cart 1000 comprise tool carriers 1401, tool carrier support base 1402, tool carrier pouches 1403, larger tool carrier pouch 1404, tool carrier fasteners 1405, tool carrier support strap 1407, and tool carrier support bar 1409. FIGS. 35 and 36 also provide a look at axle 1111 which connects wheels 1109 while running through the bottom of tool cart 1000. These figures also provide another look at dolly supports 1203, rotatable fasteners 1204, support length 1217, support length fasteners 1218, back cushion 1501, back straps 1503, and security strap 1513.

Tool carriers 1401 are designed in order to allow for the user to store tools, or other equipment, on the side of tool cart 1000 which gives them more storage space during transit. Tool carrier 1401 is connected to support base 1402 which connects it to base 1201. Tool carrier 1401 consists of three smaller carrier pouches 1403 and one larger carrier pouch 1404, however, the amount of pouches may vary. These pouches are big enough to store standard tools and are deep enough to prevent tools or other equipment from falling out during transit. Tool carriers 1401 are attached to end walls 1107 by fastener 1405 in the upper right of tool carrier 1401. Tool carrier support strap 1407 is found at the bottom of tool carrier 1401 and is another source of support for tool carrier when the pouches are full as this strap will help maintain the stability during movement. Tool carrier support bar 1409 is found on support strap 1407 and provides another anchor point when the user is wishing to hoist tool cart 1000.

Figure 37:
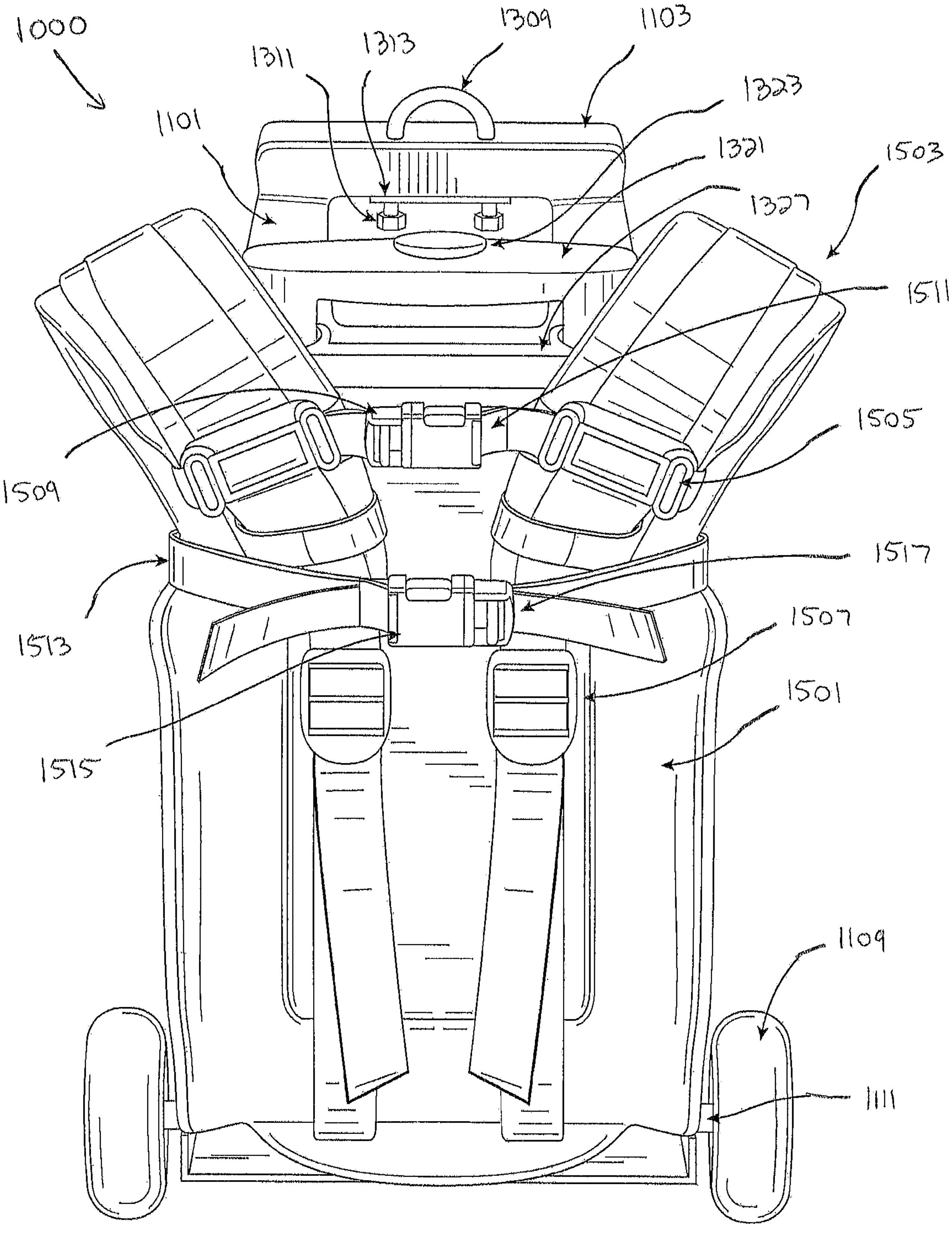
FIG. 37 is a rear view of the tool carrier of FIG. 30.

Referring now also to FIG. 37 in the drawings, the back of the tool cart 1000 is depicted. In this figure, the wheels 1109 of tool cart 1000 are seen as being connected by axle 1111 which goes through the bottom of the hollow arched body 1101 of tool cart 1000. Further, FIG. 37 also shows that the back of the cart comprises hollow arched body 1101, top handle portion 1103, hoist ring 1309, hoist ring stoppers 1311, hoist ring guard 1313, tow handle 1321, handle release 1323, tow handle base 1327, back cushion 1501, padded replaceable straps 1503, upper tightening grip 1505, lower tightening grip 1507, strap buckle housing 1509, strap buckle insert 1511, security strap 1513, security strap buckle housing 1515, and security strap buckle insert 1517.

Back cushion 1501 is attached directly to the back of hollowed arched body 1101. Back cushion 1501 supports the user while they are wearing the cart and makes it easier for them to carry it around for longer periods of time. Connected to the top of back cushion 1501 are two padded replaceable straps 1503 which are attached to the upper left and right side of cushion 1501. Padded straps 1503 allow the user to carry tool cart 1000 on their shoulders which let users carry it for longer periods and experience less fatigue when having to go up stairs, building ladders, or extension ladders. Also, straps 1503 being replaceable will allow the user to change them out if they become worn down or if the user desires straps that have more cushion. Padded replaceable straps 1503 can also be tightened to fit the body of the user by using upper tightening grip 1505 or lower tightening grip 1507 to achieve this. These tightening grips will use the extra lengths of the straps to either make it tighter or looser on the user which will allow the user to set it to where it fits best on them so it's secured and comfortable.

Strap buckle housing 1509 is found on the left padded strap 1503 when looking at the back of tool cart 1000 and strap buckle insert 1511 is on the right padded strap 1503. Buckle insert 1511 will be inserted into buckle housing 1509 to secure the two padded straps 1503 together. When secured in this fashion, the straps will not be able to slide off the user during movement. Security strap 1513 provides a strap which holds the wide padded backpack straps up in place and keeps them high and tight and out of the way so that don't drag the ground or get damaged when not in use, storing, or towing tool cart 1000. Security strap 1513 is attached to the sides of tool cart 1000 and strap 1513 buckles over padded straps 1503 when securing the carrier to the user. On the left end of security strap 1513 is buckle housing 1515 while on the right end is buckle insert 1517. Buckle insert 1517 will be inserted into housing 1515 to firmly secure the straps in place.

Figure 38:
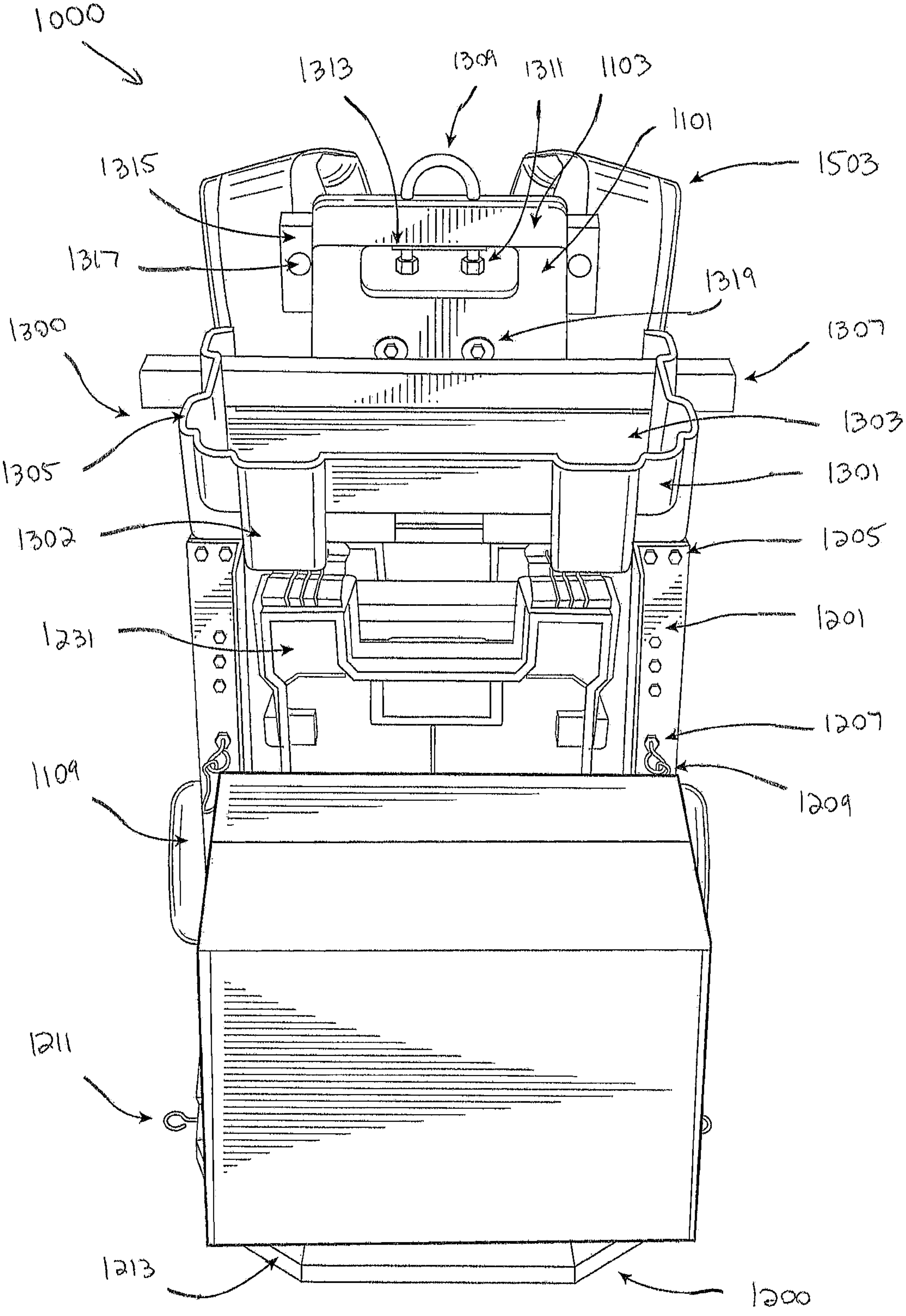
FIG. 38 is a front view of the tool carrier of FIG. 30.

Referring now also to FIG. 38 in the drawings, a front view of tool cart 1000 is depicted. FIG. 38 shows the tool cart while retractable tow cradle 1200 is in the down position and has a box on the cradle. This figure demonstrates how a user would use tow cradle 1200 to tow equipment, tools, or other objects with them to a job site.

Figure 39:
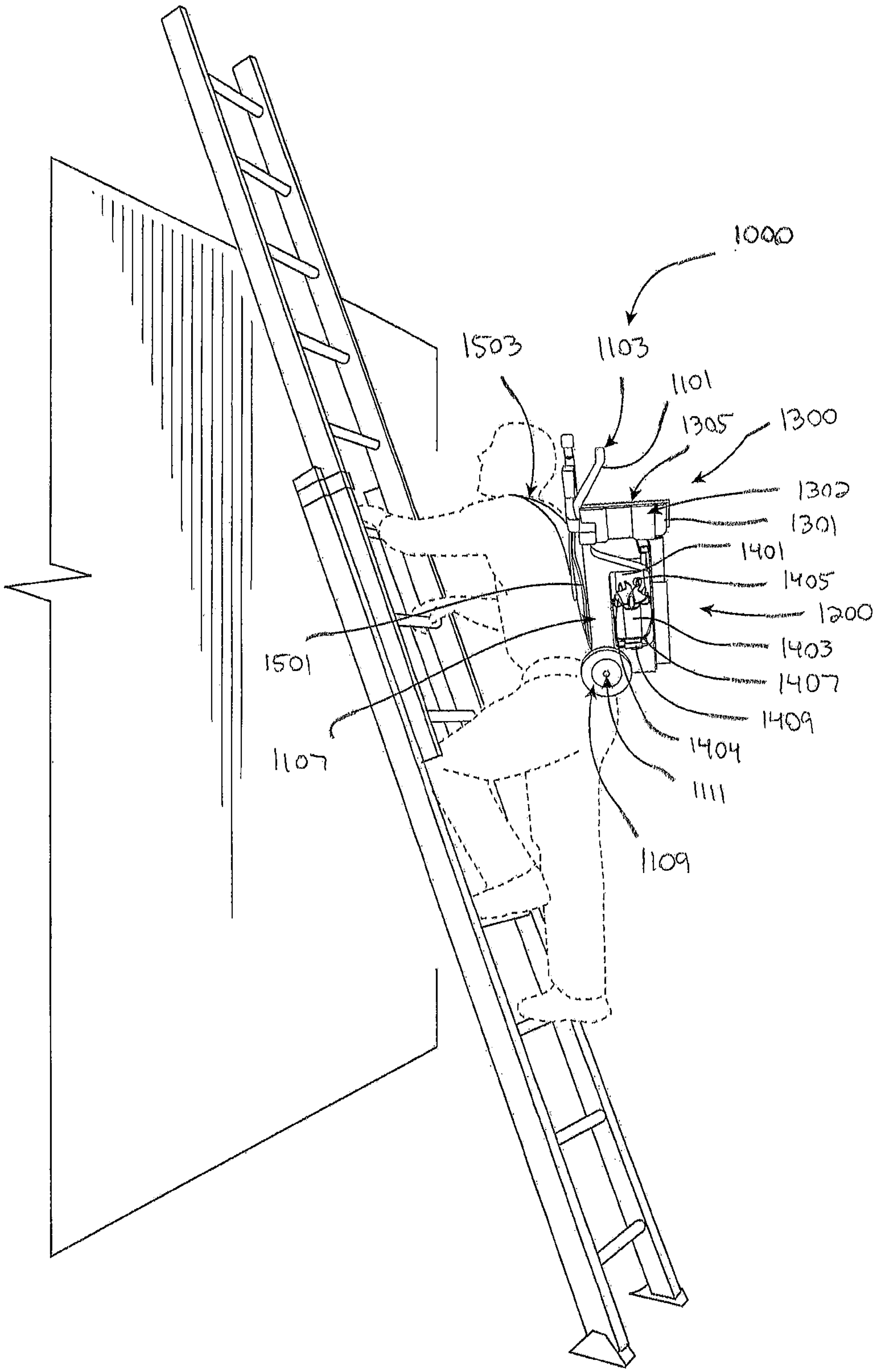
FIG. 39 is a perspective view of the tool carrier of FIG. 30 being carrier by a person.

Referring now also to FIG. 39 in the drawings, a side view of tool cart 1000 is depicted. In this figure, an individual is depicted going up an extension ladder while having tool cart 1000 secured to their back. FIG. 39 illustrates the ease of which an individual can carry tools and other equipment safely up an extension ladder without having to take either of their hands off the ladder.

Figure 40:
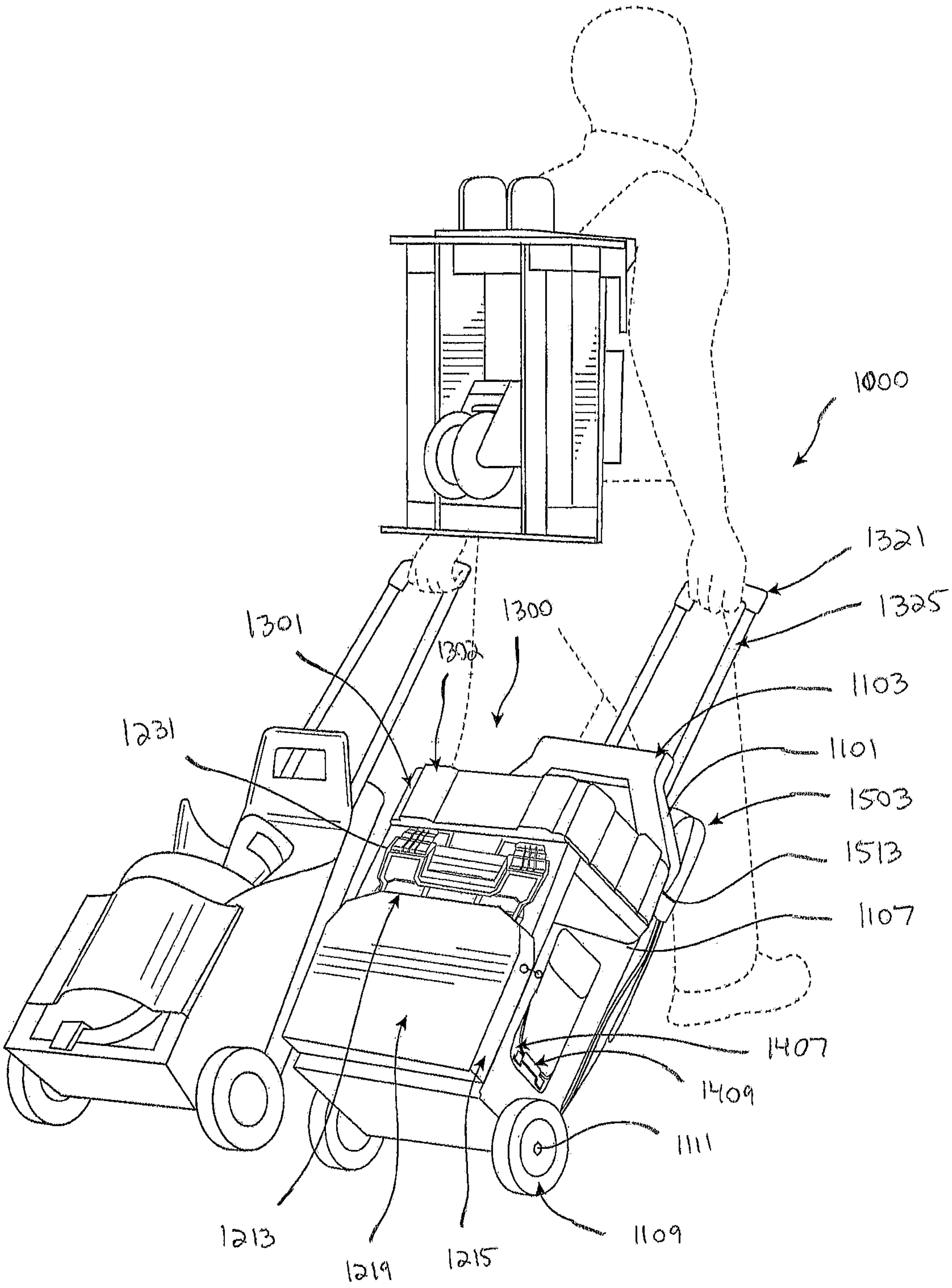
FIG. 40 is a perspective view of the tool carrier of FIG. 30 being pulled by a person.

Referring now also to FIG. 40 in the drawings, a perspective side view of tool cart 1000 is depicted. FIG. 40 shows an individual using tow handle 1321 to tow tool cart 1000 behind them without having to carry it. This frees up the user's hands as they only need one hand to do this so they can tow another cart behind them or have that hand free to do other tasks during transit.

Figure 41:
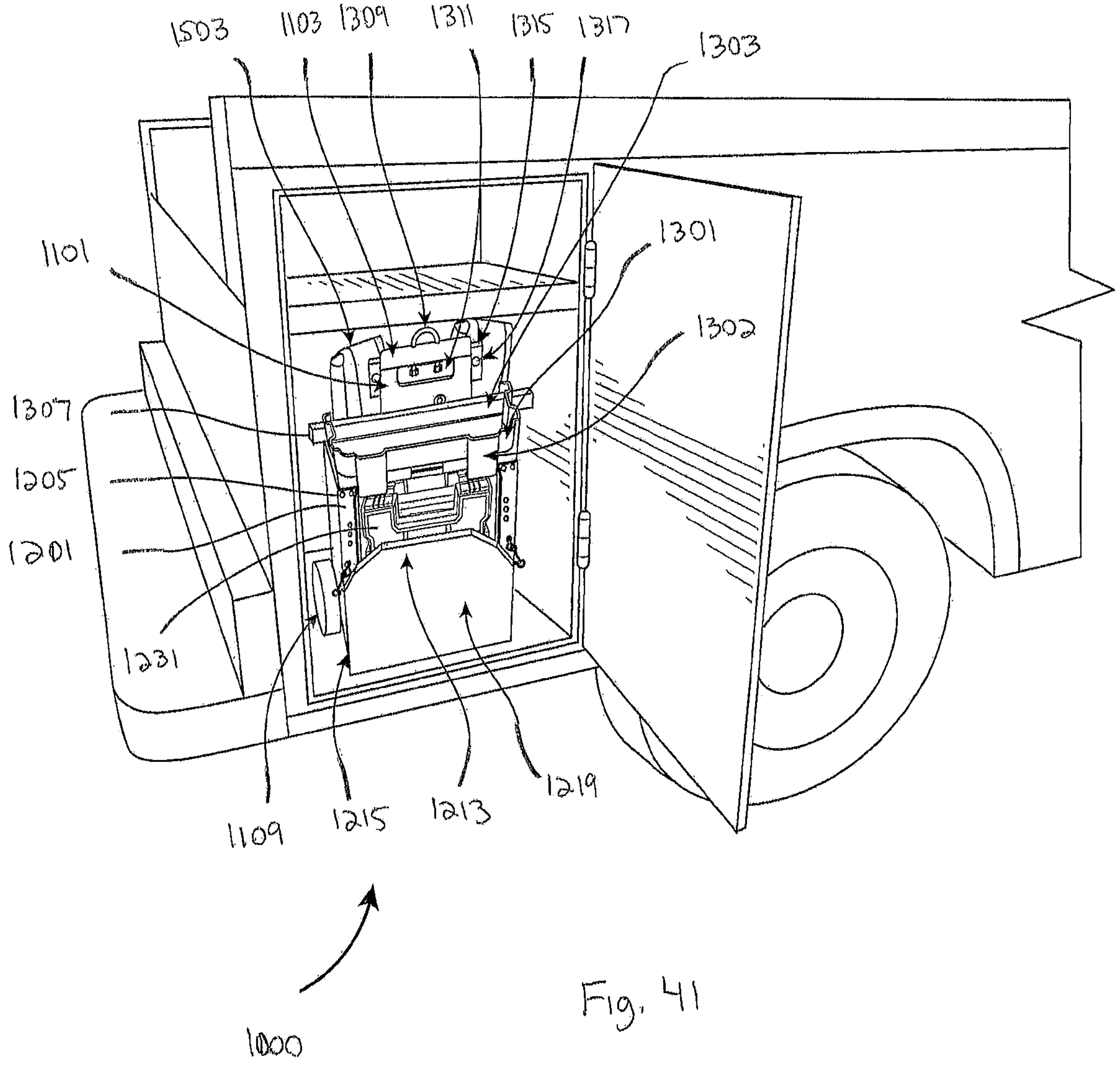
FIG. 41 is a perspective view of the tool carrier of FIG. 30 being stored in a vehicle.

Referring now also to FIG. 41 in the drawings, a perspective front view of tool cart 1000 is depicted. FIG. 41 shows how tool cart 1000 is compact enough to fit inside a standard storage compartment that can be found on work trucks. It is important that tool cart 1000 be small and compact and that it does not take up too much space when it is stored.

Figure 42:
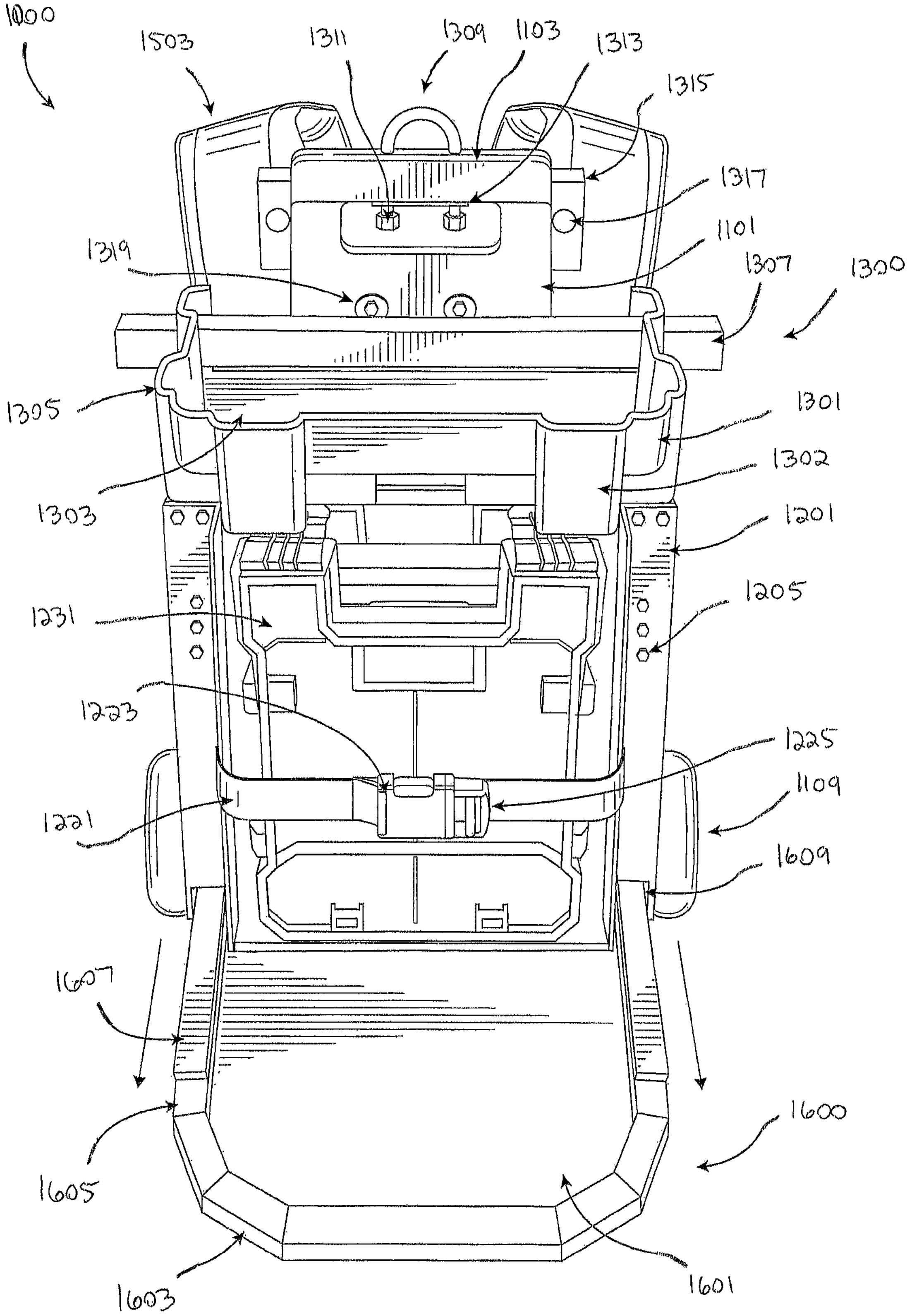
FIG. 42 is a front view of a tool carrier according to an alternative embodiment of the present invention.

Referring now also to FIG. 42 in the drawings, a front view of tool cart 1000 with an alternative embodiment of a retractable tow cradle is depicted. FIG. 42 shows an alternative embodiment of retractable tow cradle where instead it is a slide out tow cradle 1600. Slide out tow cradle 1600 is comprised of base 1601, segmented front wall 1603, end walls 1605, support base 1607, and slide out compartment 1609. Slide out tow cradle 1600 has a similar structure to retractable tow cradle 1200 but instead of using tabs and hooks to secure it in the upright position, slide out tow cradle is slid into compartment 1609 when it is not in use.

Figure 43A:
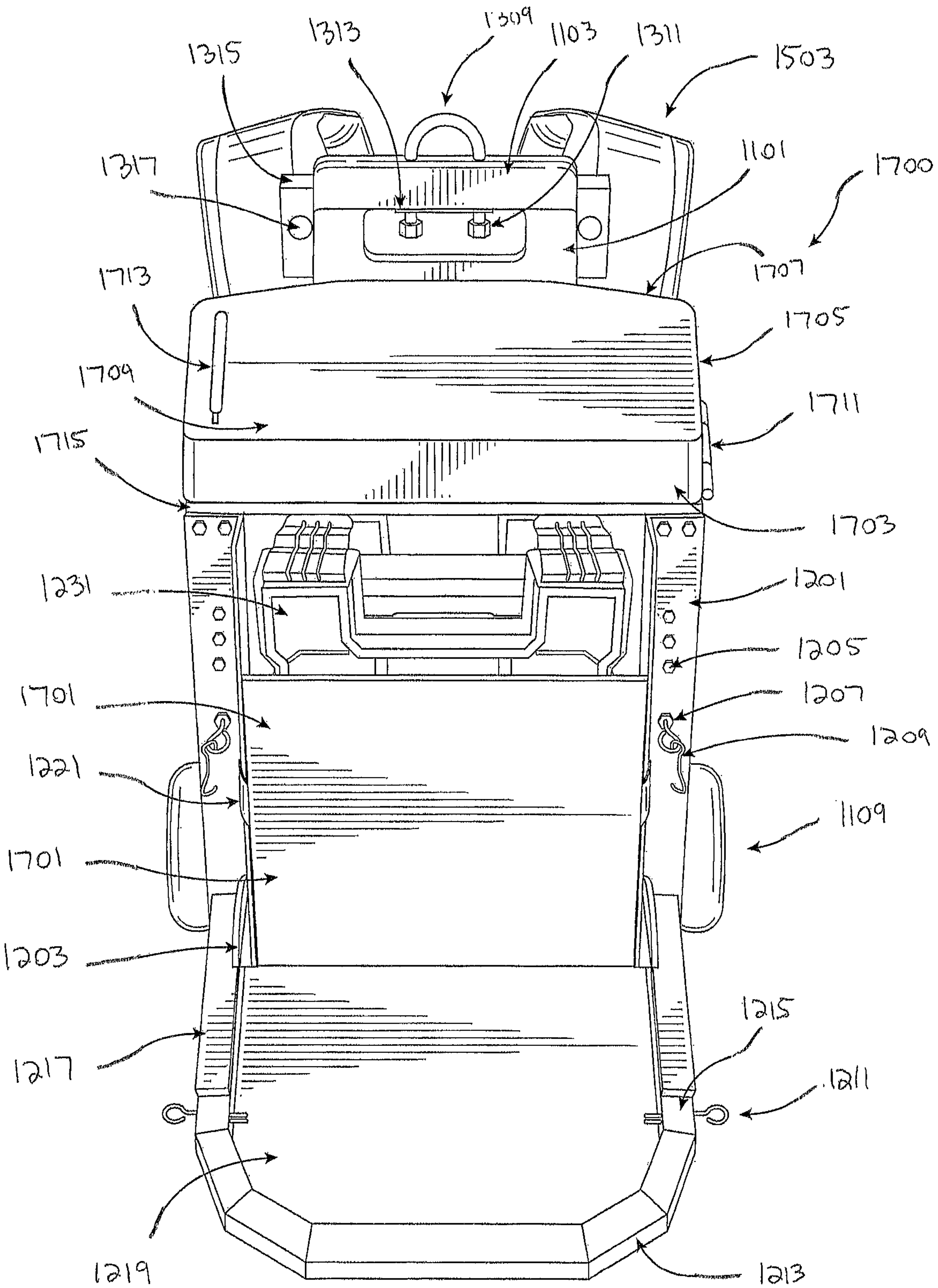
FIG. 43A is a front view of a tool carrier according to an alternative embodiment of the present invention.
Figure 43B:
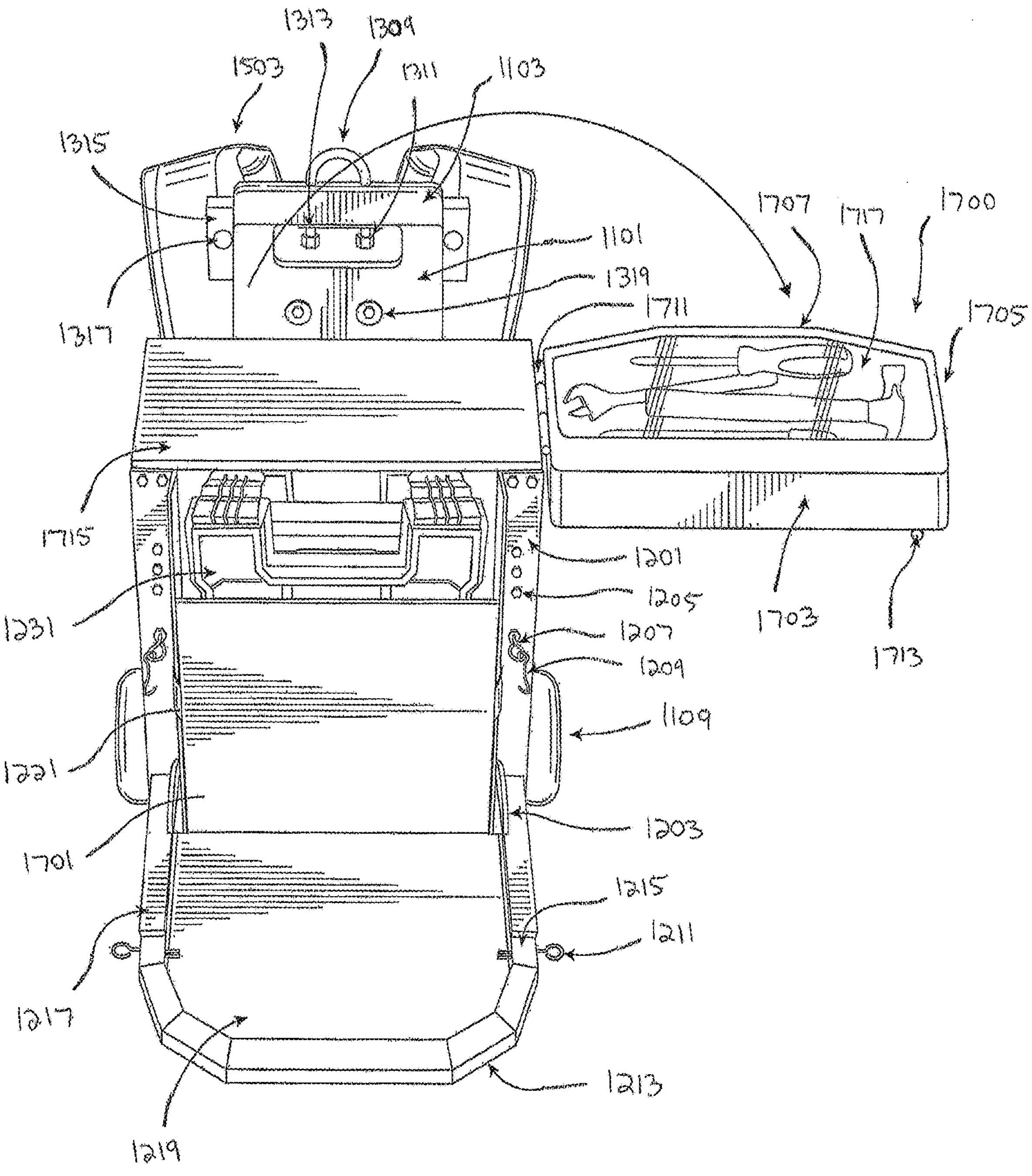
FIG. 43B is a front view of the tool carrier of FIG. 43A.

Referring now also to FIGS. 43A and 43B in the drawings, a front view of tool cart 1000 with an alternative embodiment of carry-on tray is depicted. Instead of having carry-on tray 1300, carry-on drawer 1700 is shown to comprise front wall 1703, end walls 1705, segmented back wall 1707, top portion 1709, hinge 1711, handle 1713, base 1715, and cover 1717. FIG. 43A depicts carry-on drawer 1700 in the closed position and shows that the drawer is formed by the four walls forming together, with front wall 1703 and end walls 1705 being straight and segmented back wall 1707 being segmented into three straight sections, though it is understood that back wall 1707 may be segmented into less or more sections, and the top of all four walls being connected by top portion 1709. Covering over the top of where tool kits 1231 are stored, is base 1715 which is rectangular in shape. Connecting the side of base 1715 with the bottom of one end wall 1705 is hinge 1711 which allows the user to open carry-on drawer 1700 when they pull on handle 1713 attached to top portion 1709. FIG. 43B depicts the carry-on drawer 1700 in the open position which shows compartment 1717 where tools, equipment, or other items may be stored.

Figure 44A:
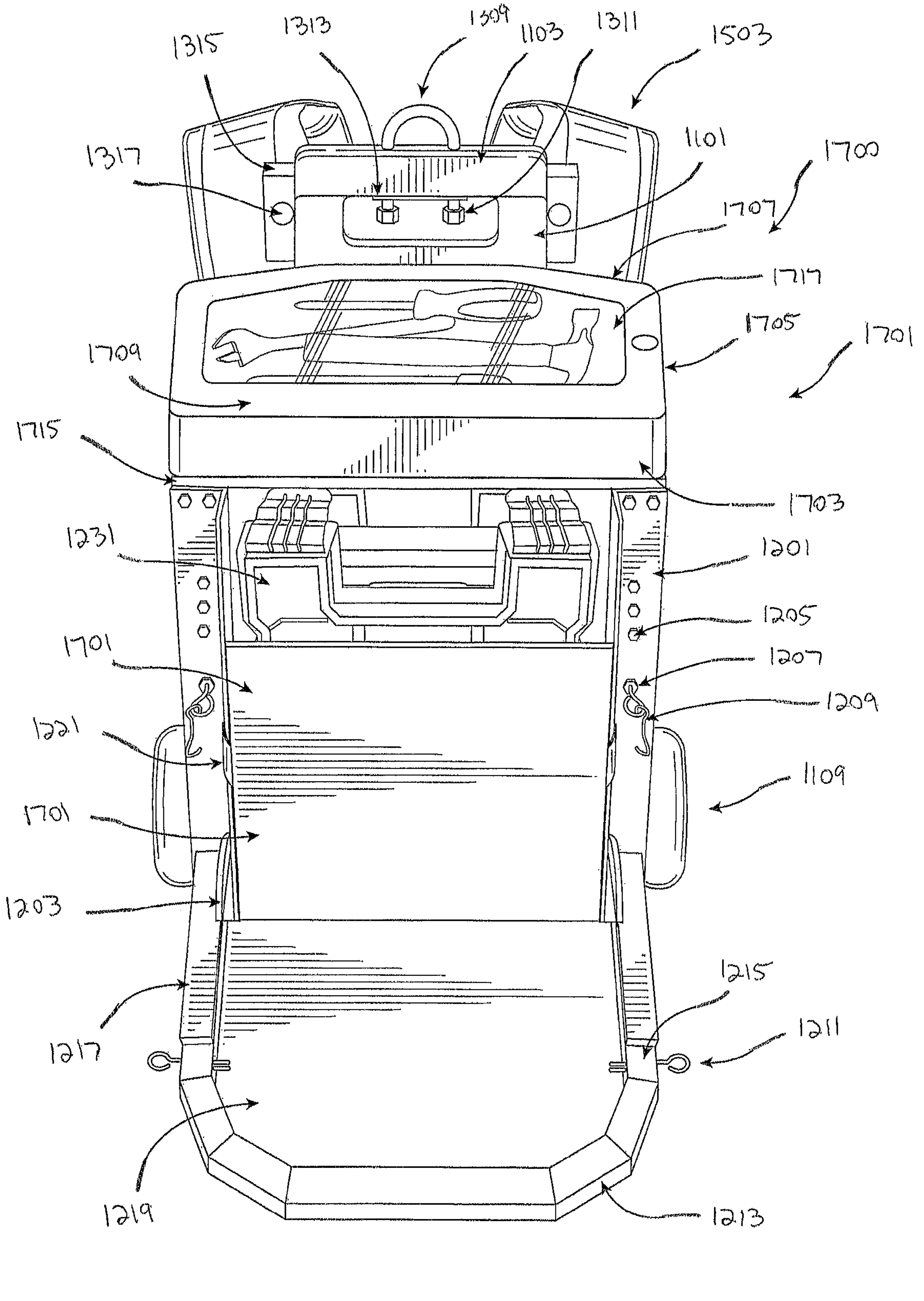
FIG. 44A is a front view of a tool carrier according to an alternative embodiment of the present invention.
Figure 44B:
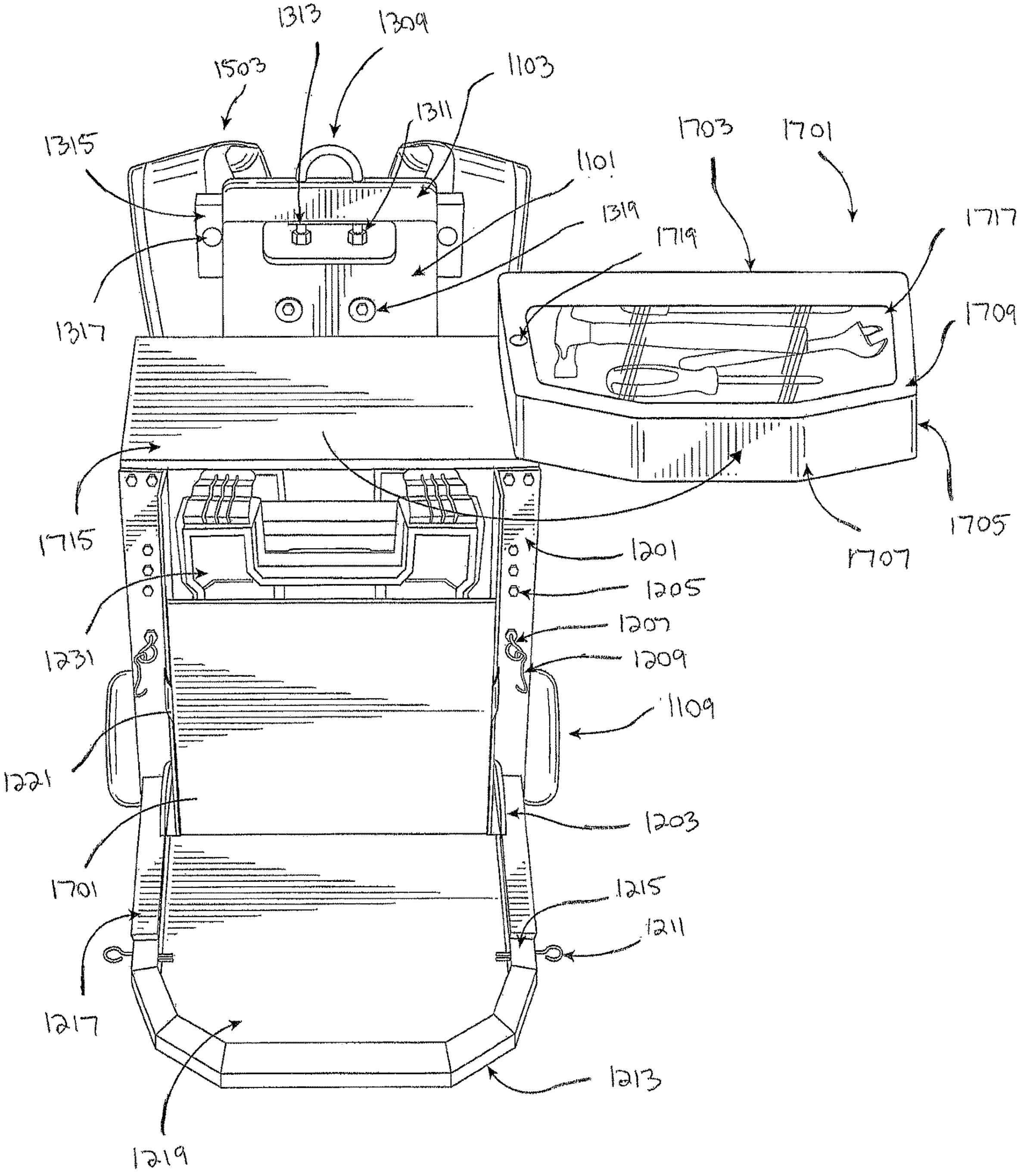
FIG. 44B is a front view of the tool carrier of FIG. 44A.

Referring now also to FIGS. 44A and 44B in the drawings, a front view of tool cart 1000 with another alternative embodiment of a carry-on tray is depicted. This alternative carry-on tray 1701 is structure similar to carry-on drawer 1700 in that it also comprises front wall 1703, end walls 1705, segmented back wall 1707, top portion 1709, base 1715, and cover 1717. Tray 1701 differs to drawer 1700 in that cover 1717 is seen on the top part of tray 1701 instead of on the bottom like in drawer 1700. Tray 1701 also has rotating pin 1719 instead of a hinge system like drawer 1700. Rotating pin 1719 allows the user to rotate the tray in and out of position for ease of access to the materials stored there.

Figure 45:
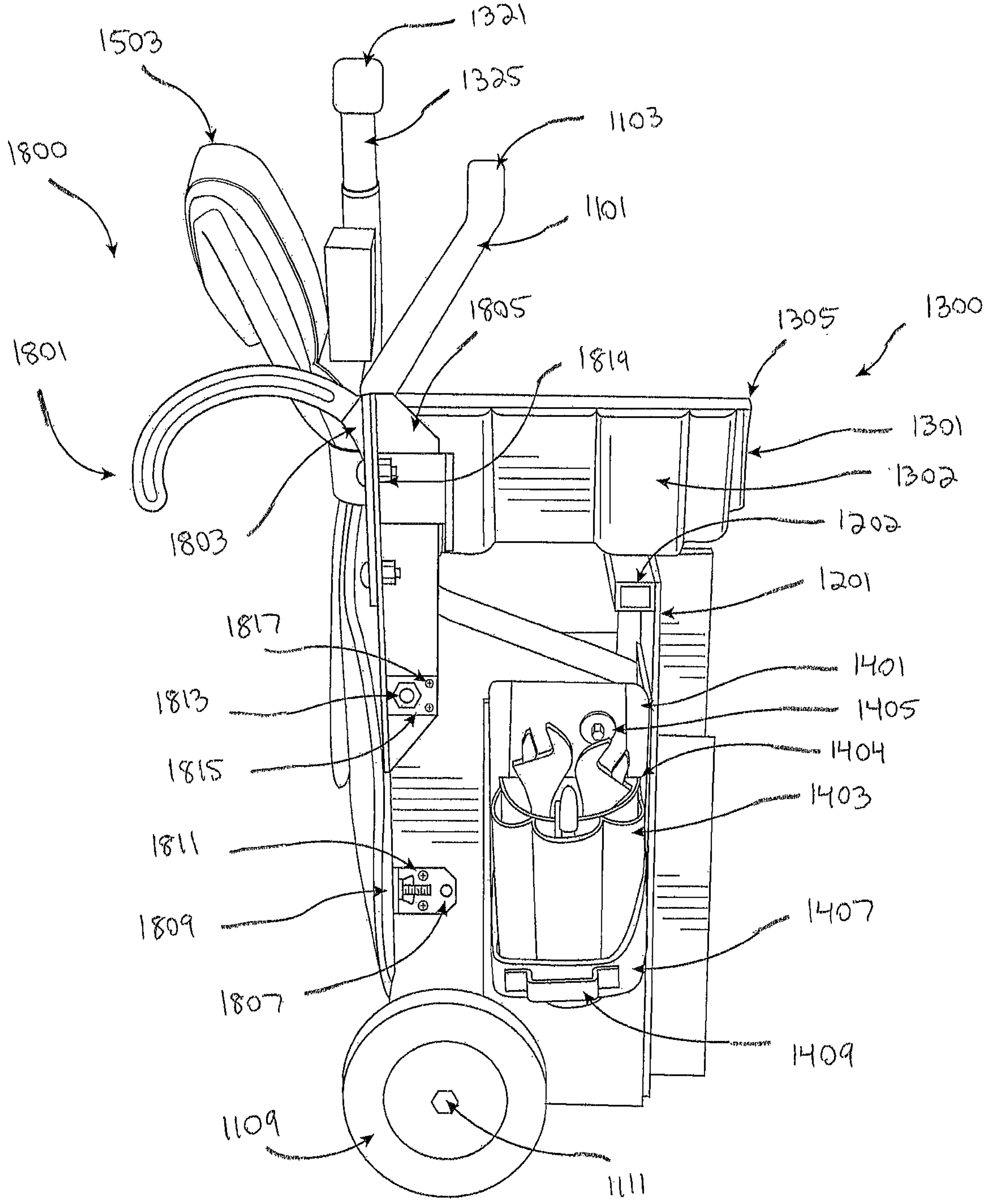
FIG. 45 is a side view of a tool carrier according to an alternative embodiment of the present invention.

Referring now also to FIG. 45 in the drawings, a side view of an alternative embodiment of a tool cart is depicted. FIG. 45 shows that the side of this alternative embodiment of the tool cart has a retractable ladder hook system 1800 which is comprised of retractable ladder hooks 1801, hook fastener 1803, rotatable hook base 1805, lower hook base 1807, lower hook base fastener 1809, lower hook base screws 1811, hook base rotatable fastener 1813, attachment base 1815, attachment base fasteners 1817, and upper hook base 1819.

Ladder hook 1801 is also found on both sides of the tool cart and are used to attach the tool cart to a ladder. Ladder hooks 1801 are arch shaped and, as shown in FIG. 45 in the drawings, extend out towards the back of the tool cart. Ladder hooks 1801 are designed so if the person carrying the tool cart up a ladder, or using a rope to lift it up, were to get tired in the process or if they had a muscle spasm and would need to set the tool cart down, they could do so by using hooks 1801 to rest the tool cart on the ladder. Ladder hooks 1801 will be most likely used when an individual is carrying the tool cart up a ladder themselves as opposed to when they are hoisting it because of the structure of the hooks getting in the way of hoisting, but these hooks may be used in any situation where the tool cart is being taken up a ladder. Retractable ladder hooks 1801 provide this service by being able to be flipped up and attach to the rungs of the ladder when this occurs. They provide hooks which allow the user to rest the tool cart on the ladder itself while the user recovers and once the user recovers, ladder hook 1801 can be disengaged by lifting up the tool cart, as gravity is what secures the tool cart to the ladder using hooks 1801.

The entire ladder hook system is attached to both sides of arched body 1101 by rotatable hook base 1805 and retractable ladder hooks 1801 are connected to hook base 1805 by hook fasteners 1803. When rotatable hook base 1805 is in the down position it is fastened to lower hook base 1807 by lower hook base fastener 1809. Lower hook base 1807 is preferably L-shaped and one side of it is attached to arched body 1101 by lower hook base screws 1811. The side of lower hook base 1807 that is not attached to arched body 1101 is just as long as rotatable hook base 1805 and ends in a T shape. Being this length leads to the rotatable hook base 1805 being snuggly secured when it is in the down position and fastened to lower hook base 1807 which will prevent it from moving while the user is wearing or towing the tank carrier.

Rotatable hook base 1805 may also be rotated into the up position when the user wishes to use ladder hooks 1801 by rotating the base around rotatable hook base fastener 1813. Fastener 1813 will be loosened which will allow the user to rotate base 1805 to another position before tightening fastener 1813 and securing the base in the new position. Fastener 1813 is also attached to attachment base 1815 which is L-shaped and connects to arched body 1101 by attachment base fasteners 1817. The attachment base 1815 is attached to the side and front of arched body 1101 which provides more stability in the system. Once rotatable base 1805 has been rotated into the up position, upper hook base 1819 will be used to secure it to cross bar handles 1307.

Figure 46:
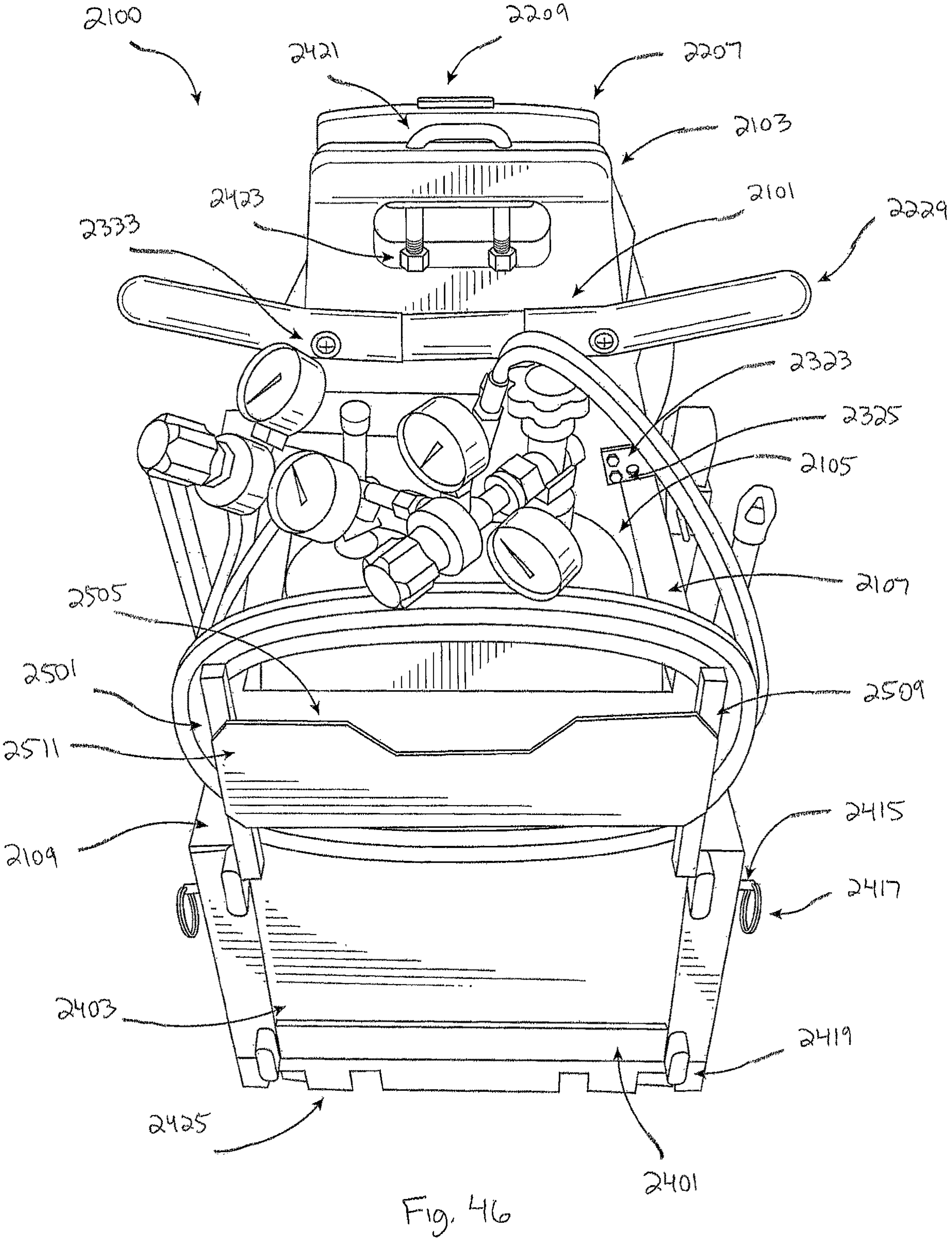
FIG. 46 is a front view of a tank carrier according to a preferred embodiment of the present invention.

Referring now also to FIG. 46 in the drawings, a tank carrier with backpack straps and dolly 2100 is illustrated. The structure of tank carrier 2100 is a hollow arched base 2101 which is comprised of a top handle portion 2103, a tank carrier compartment 2105, slanted end walls 2107, straight end walls 2109, and notched base 2111. FIG. 46 also shows that tank carrier 2100 comprises tow handle 2207, tow handle release 2209, two handed cross bar double handles 2229, attachment base 2323, attachment base fasteners 2325, cross bar fasteners 2333, retractable tow cradle 2401, base 2403, fastener pin 2415, loop handle 2417, support legs 2419, retractable hoist ring 2421, and retractable hoist ring stoppers 2423, retractable cradle hinge 2425, bottle access door 2501, back plate 2505, T-shaped supports 2509, and front plate 2511. Tank carrier 2100 may be used to carry oxygen and acetylene bottles, or other objects of similar structure.

Although this embodiment of the present application has been described with respect to hand tools, power tools, and equipment used by workers, such as heating and air conditioning workers, it will be appreciated that tool carrier 2100 may easily be adapted and used by other types of workers, such as health care workers, military personnel, and other types of first responders. For example, emergency medical workers could use tool carrier 2100 as a medical rescue pack to store, transport, and use items such as automated external defibrillators, oxygen tanks, medicine, bandages, IV bags, and other such emergency medical equipment.

Base 2101 is preferably hollow in order to ensure that tank carrier 2100 is light weight, to enable most users to carry it without issue. Tank carrier 2100 may be made out of plastic, metal, wood, or any other lightweight material. Top handle portion 2103 forms the top of tank carrier 2100 and is square in shape and solid besides the handle portion at the very top and extends down to form the back wall of carrier 2100. The bottom sides of handle portion 2103 connect to slanted end walls 2107 which in turn connect to straight end walls 2109. It is appreciated that the dimensions and shapes of the end walls may change to accommodate whatever tank the manufacture designs it to carry. These three walls form tank carrier compartment 2105 where the tanks are securely stored in order to keep them safe and secure during movement.

Figure 47:
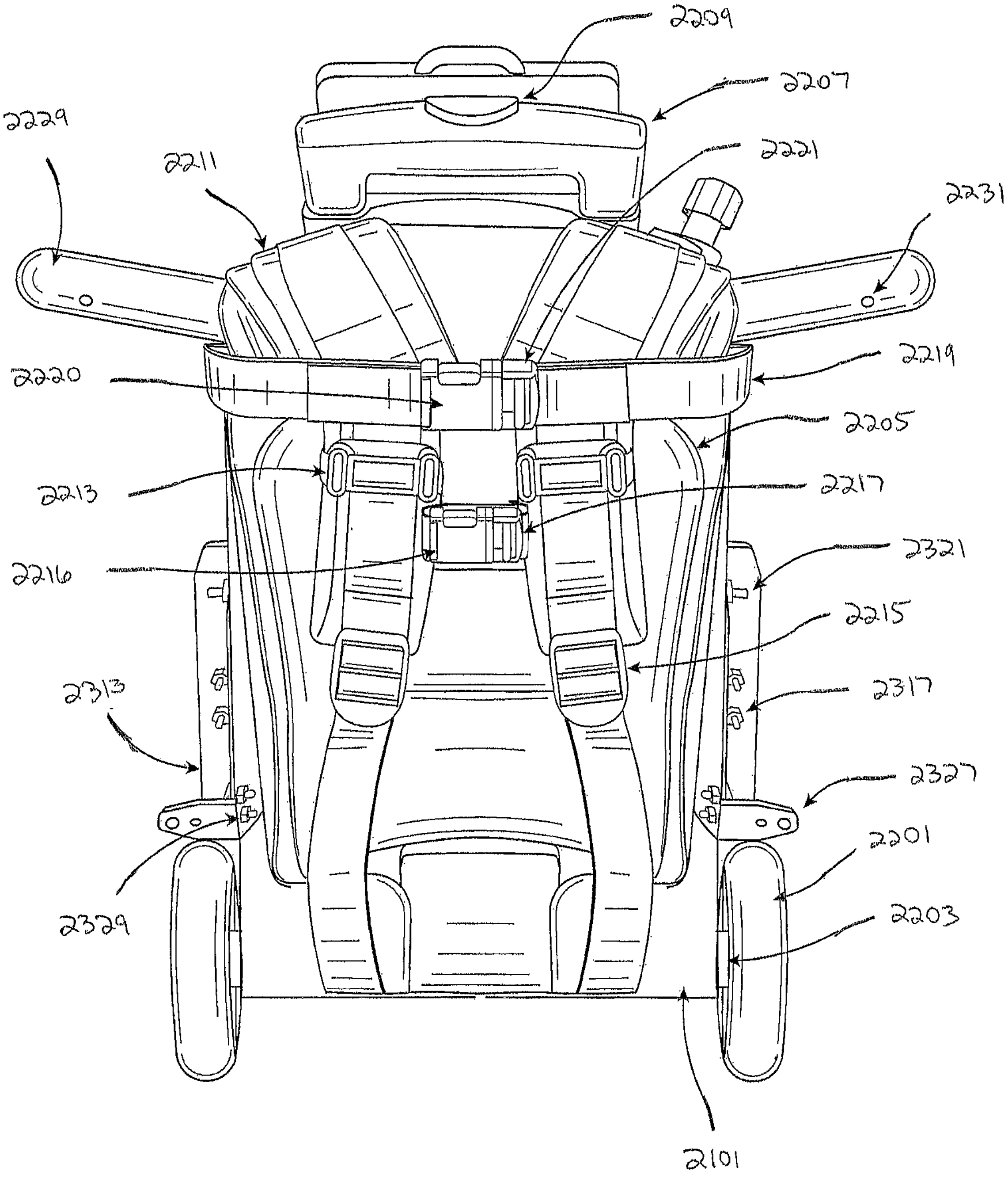
FIG. 47 is a rear view of the tank carrier of FIG. 46.

Referring now also to FIG. 47 in the drawings, the back of the tank carrier 2100 is depicted. In this figure, the wheels 2201 of the tank carrier are shown as being connected by axle 2203 which goes through the bottom of the hollow arched body 2101 of the tank carrier. Further, FIG. 47 also shows that the back of the carrier comprises back cushion 2205, tow handle 2207, tow handle release 2209, padded replaceable straps 2211, upper tightening grip 2213, lower tightening grip 2215, strap buckle housing 2216, strap buckle insert 2217, security strap 2219, security strap buckle housing 2220, security strap buckle insert 2221, two handed crossbar double handles 2229, and upper ladder hook fastener holes 2231.

Back cushion 2205 is attached directly to the back of hollowed arched body 2101. Back cushion 2205 supports the user while they are wearing the carrier and makes it easier for them to carry it around for longer periods of time. Back cushion 2205 is secured to the back of hollow arched body 2101 by back cushion fasteners 2233 which can be seen in FIG. 57. Connected to the top of back cushion 2205 are two padded replaceable straps 2211 which are attached to the upper left and right side of cushion 2205. Padded straps 2211 allow the user to carry tank carrier 2100 on their shoulders which allows users carry it for longer periods and experience less fatigue. Additionally, straps 2211 being replaceable will allow the user to change them out if they become worn down or if the user desires straps that have more cushion. Padded replaceable straps 2211 can also be tightened to fit the body of the user by using upper tightening grip 2213 or lower tightening grip 2215 to achieve this. These tightening grips will use the extra lengths of the straps to either make it tighter or looser on the user which will allow the user to set it to where it fits best on them so it's secured and comfortable.

Strap buckle housing 2216 is found on the left padded strap 2211 when looking at the back of tank carrier 2100 and strap buckle insert 2217 is on the right padded strap 2211. Buckle insert 2217 will be inserted into buckle housing 2216 to secure the two padded straps 2211 together. When secured in this fashion, the straps will not be able to slide off the user during movement. Security strap 2219 provides a strap which holds the wide padded backpack straps up in place and keeps them high and tight and out of the way so they don't drag the ground or get damaged when not in use, storing, or towing tank carrier 2100. Security strap 2219 is attached to the sides of tank carrier 2100 and strap 2219 buckles over padded straps 2211 when securing the straps to the carrier. Security strap 2219 is attached to hollow arched body 2101 by security strap fastener 2235 which can be seen in FIG. 57.

At the top of the hollow arched body 2101 is tow handle 2207. At the top of tow handle 2207 is tow handle release 2209 which, when pressed down, releases tow handle 2207 to be pulled away from arched body 2101. Tow handle 2207, in combination with the wheels at the bottom of arched body 2101, allow the user to pull tank carrier 2100 behind them if they do not wish to carry it. Also at the top of hollow arched body 2101 are two handed crossbar double handles 2229 which protrude out from hollow arched body 2101 on either side. Double handles 2229 also have upper ladder hook fastener holes 2231 going through them which allow ladder hooks 2309 to be fastened in place there. These double handles will provide the user with a secure way to lift tank carrier 2100 up. Since tank carrier 2100 is heavier than most, double handles 2229 gives the user a safer and more secure way to use both hands to lift tank carrier 2100 so that the user is not injured from the strain of lifting the carrier. Double handles 2229 are secured to tank carrier 2100 by cross bar fasteners 2333 which can be seen in FIG. 46.

Figure 48:
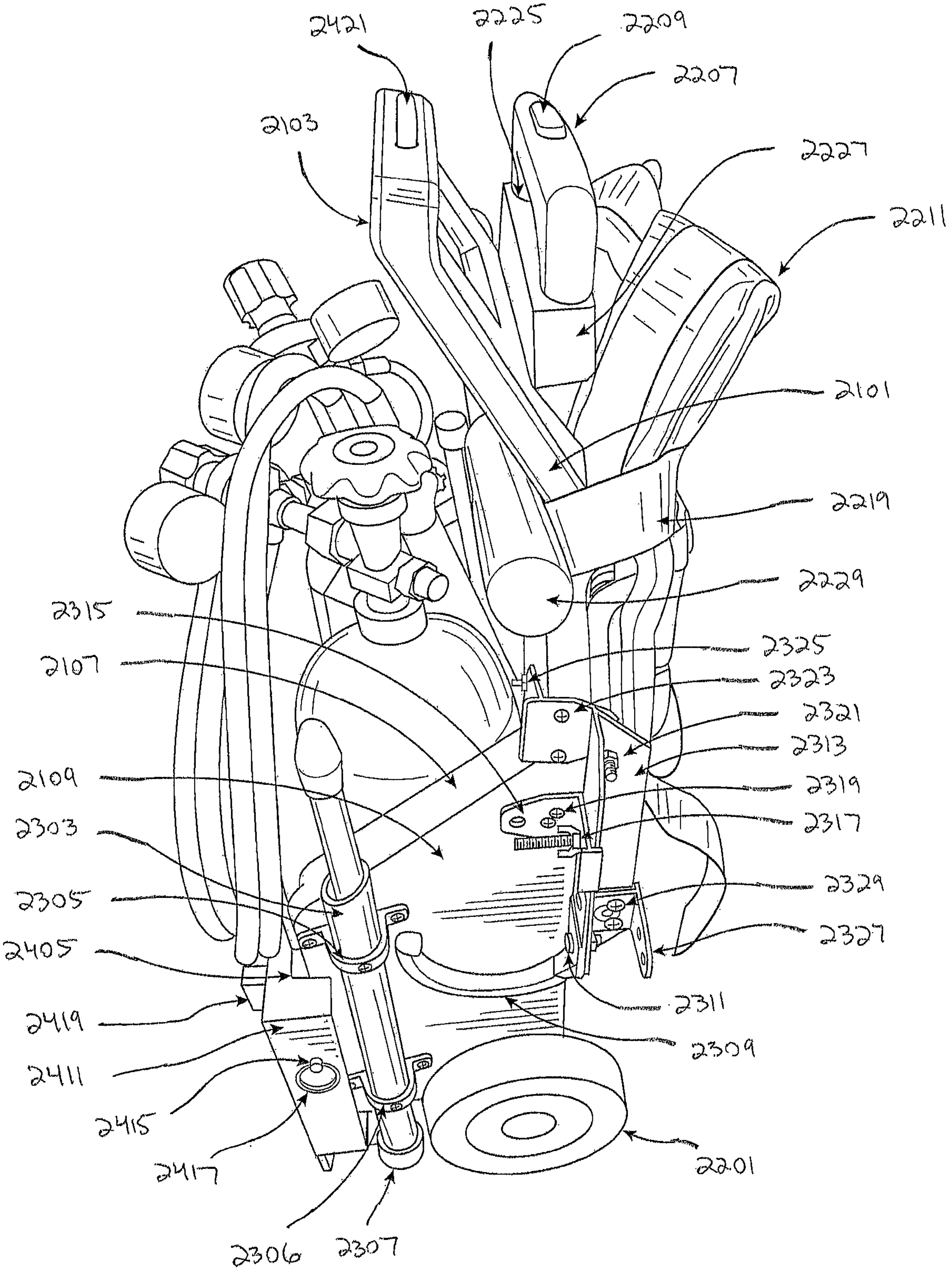
FIG. 48 is a perspective view of the tank carrier of FIG. 46.
Figure 49:
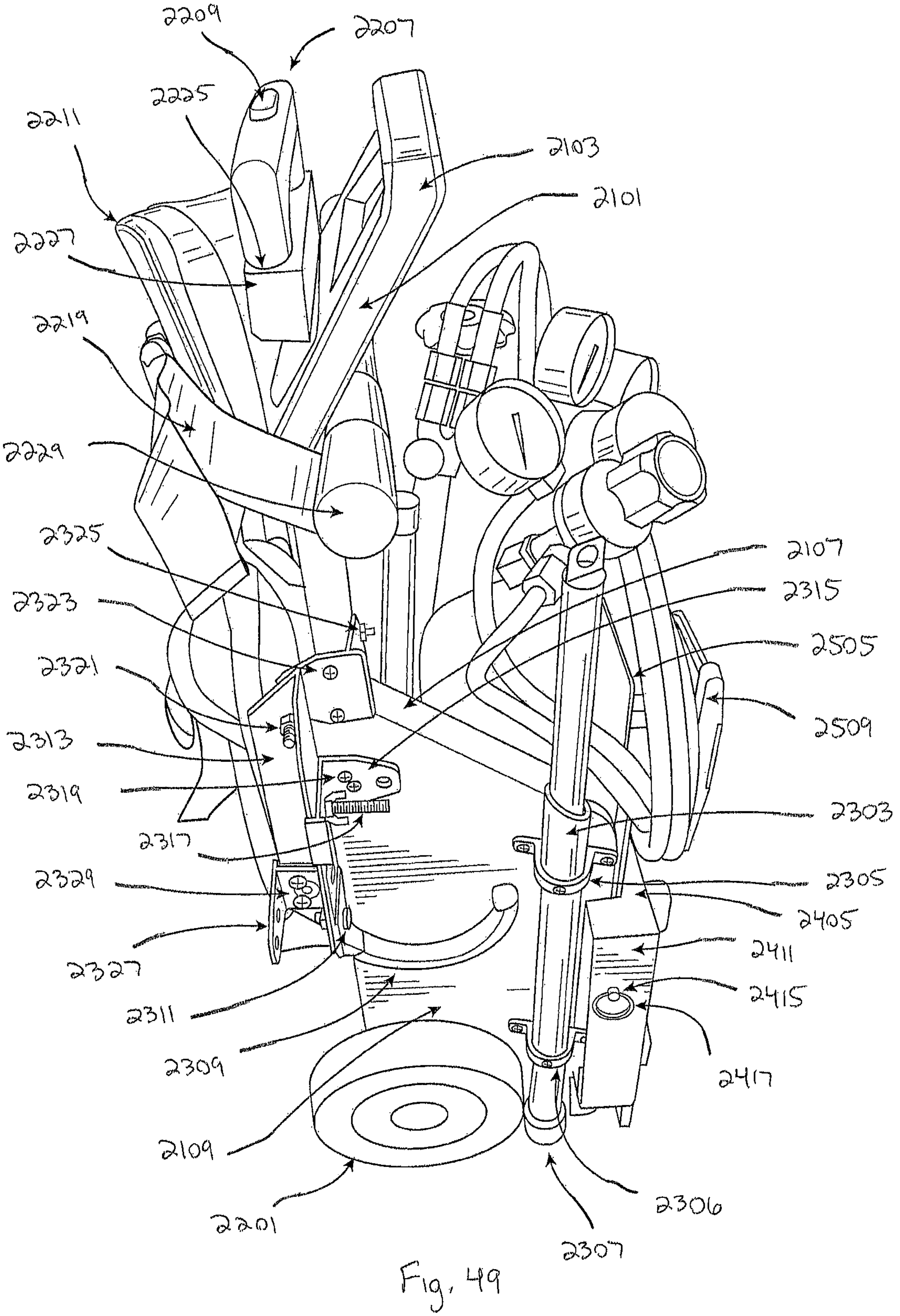
FIG. 49 is a perspective view of the tank carrier of FIG. 46.
Figure 51:
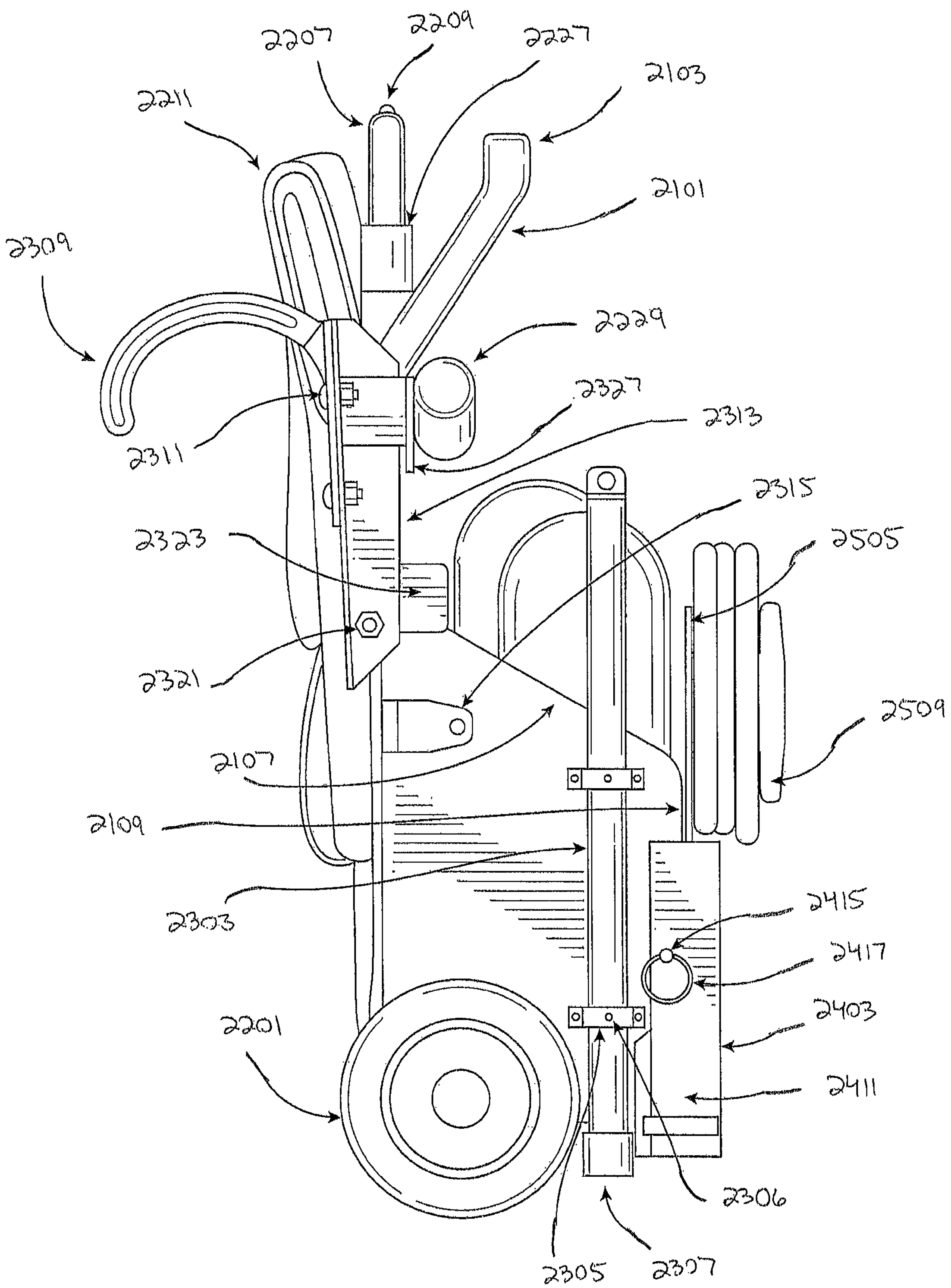
FIG. 51 is a side view of the tank carrier of FIG. 46.

Referring now also to FIGS. 48, 49, and 51 in the drawings, side views of tank carrier 2100 are depicted. FIGS. 48, 49, and 51 show that the sides of tank carrier 2100 comprises rod compartments 2303, C-shaped fasteners 2305, screws 2306, balancing feet 2307, retractable ladder hooks 2309, hook fastener 2311, rotatable hook base 2313, lower hook base 2315, lower hook base fastener 2317, lower hook base screws 2319, hook base rotatable fastener 2321, attachment base 2323, attachment base fasteners 2325, upper hook base 2327, and upper hook base fasteners 2329.

Rod compartments 2303 are found on the left and right sides of tank carrier 2100 and can be used to store rod shaped equipment. This provides another way for the user to store all their equipment on one object when they are climbing a ladder or carting the carrier wherever they need to go which frees the hands of the user, and thus making it safer. Rod compartments 2303 are secured to straight end walls 2109 by two C-shaped fasteners 2305 which attach to the upper and lower ends of rod compartment 2303. C-shaped fasteners 2305 are secured to rod compartment 2303 and arched body 2101 by screws 2306 inserted on each side of rod compartment 2303 and into rod compartment 2303 itself. Rod compartment 2303 also has balancing feet 2307 at the bottom of them which are used to secure tank carrier 2100 in place when it is not moving.

Figure 54:
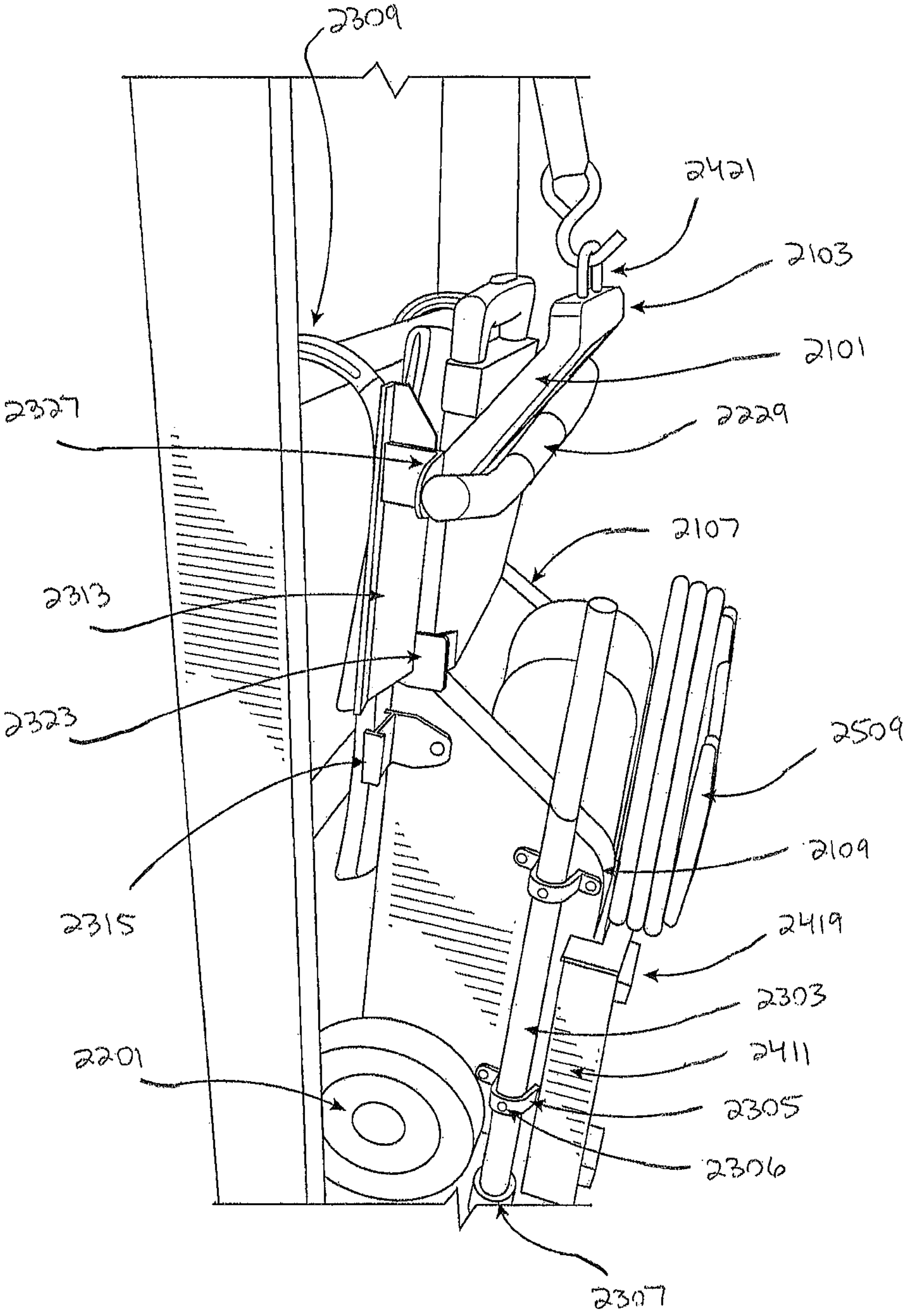
FIG. 54 is a perspective view of the tank carrier of FIG. 46.

Ladder hook 2309 is also found on both sides of tank carrier 2100 and are used to attach tank carrier 2100 to a ladder. Ladder hooks 2309 are arch shaped and, as shown in FIG. 54 in the drawings, extend out toward the back of tank carrier 2100. Ladder hooks 2309 are designed so if the person carrying tank carrier 2100 up a ladder, or using a rope to lift it up, were to get tired in the process or if they had a muscle spasm and would need to set tank carrier 2100 down, they could do so by using hooks 2309 to rest tank carrier 2100 on the ladder. Ladder hooks 2309 will be most likely used when an individual is carrying up tank carrier 2100 up a ladder themselves, as opposed to when they are hoisting it, because of the structure of the hooks getting in the way of hoisting, but these hooks may be used in any situation where tank carrier 2100 is being taken up a ladder. Retractable ladder hooks 2309 provide this service by being able to be flipped up and attach to the rungs of the ladder when this occurs. They provide hooks which allow the user to rest the tank carrier 2100 on the ladder itself while the user recovers and once the user recovers, ladder hook 2309 can be disengaged by lifting up tank carrier 2100, as gravity is what secures tank carrier 2100 to the ladder using hooks 2309.

The entire ladder hook system is attached to both sides of arched body 2101 by rotatable hook base 2313 and retractable ladder hooks 2309 are connected to hook base 2313 by hook fasteners 2311. When rotatable hook base 2313 is in the down position it is fastened to lower hook base 2315 by lower hook base fastener 2317. Lower hook base 2315 is L-shaped and one side of it is attached to arched body 2101 by lower hook base screws 2319. The side of lower hook base 2315 that is not attached to arched body 2101 is just as long as rotatable hook base 2313 and ends in a T shape. Being this length leads to the rotatable hook base 2313 being snuggly secured when it is in the down position and fastened to lower hook base 2315 which will prevent it from moving while the user is wearing or towing tank carrier 2100.

Rotatable hook base 2313 may also be rotated into the up position when the user wishes to use ladder hooks 2309 by rotating the base around rotatable hook base fastener 2321. Fastener 2321 will be loosened which will allow the user to rotate base 2313 to another position before tightening fastener 2321 and securing the base in the new position. Fastener 2321 is also attached to attachment base 2323 which is L-shaped and connects to arched body 2101 by attachment base fasteners 2325. The attachment base 2323 is attached to the side and front of arched body 2101 which provides more stability in the system. Once rotatable base 2313 has been rotated into the up position, upper hook base 2327 will be used to secure it. Upper hook base 2327 is secured to rotatable base 2313, which can be seen in FIG. 50, by upper hook base fasteners 2329 and upper hook base 2327 will attach to upper ladder hook fastener holes 2231 on the double handles 2229. A handle fastener 2331 will go through the double handles 2229 to secure upper hook base 2327 into position.

Figure 50:
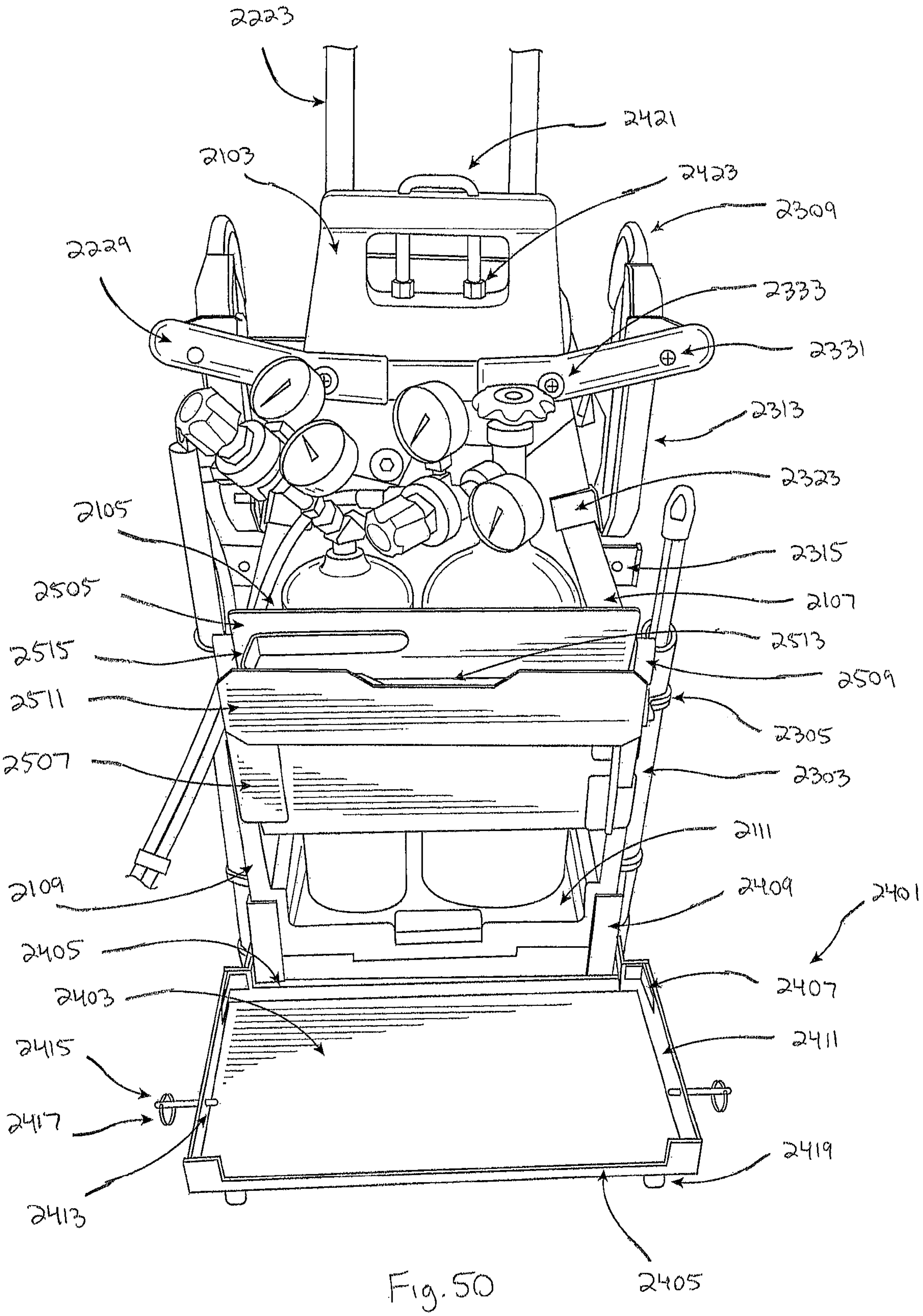
FIG. 50 is a front view of the tank carrier of FIG. 46.

Referring now also to FIG. 50, the front of tank carrier 2100 is depicted with retractable tow cradle 2401 down. Retractable tow cradle 2401 further comprises base 2403, crenellated walls 2405, L support 2407, base fastener 2409, side walls 2411, fastener hole 2413, fastener pin 2415, loop handle 2417, support legs 2419, retractable hoist ring 2421, and retractable hoist ring stoppers 2423. Also shown in FIG. 50 is the ladder hooks 2309 being secured to double handles 2229 by handle fastener 2331. Tank carrier base 2111 is also depicted which is notched in order to secure tanks once they are inserted into tank carrier 2100. The front of bottle access door 2501 is also depicted which comprises back plate 2505, support plate 2507, T-shaped supports 2509, front plate 2511, tool compartment bottom plate 2513, and compartment support 2515.

Retractable tow cradle 2401 is designed to act as a dolly and hold another object on tank carrier 2100 while it is in tow. This object could be another tank, a vacuum pump, tools, or any other object that a user wants to tow. This gives the user a place to tow the heavy objects so that way they do not have to physically carry them with their hands while traveling to the job site. This will save trips and also reduce the physical strain put on the user.

Retractable tow cradle 2401 is formed with four walls surrounding base 2403. The front and back walls are crenellated walls 2405 as there is a notch in them that covers most of the wall. The other walls that form retractable tow cradle 2401 are side walls 2411. Also, on side walls 2411 there is L support 2407 which connects to base fastener 2409 which is used to connect retractable tow cradle 2401 to tank carrier 2100. Underneath base 2403, there are four support legs 2419 which are used to help support tank carrier 2100 when it is set in place with the retractable tow cradle 2401 is in the down position.

Side walls 2411 have a fastener hole 2413 in the middle of each of them which fastener pin 2415 is inserted into. When fastener pin 2415 is fully inserted through fastener hole 2413, the pin will catch on bottle access door 2501 which will secure retractable tow cradle 2401 in the upright position. But, when a user pulls on loop handle 2417 attached to the end of fastener pin 2415, the pin will pull out of fastener hole 2413 and so retractable tow cradle 2401 will be released to go into the down position.

Also in FIG. 50 is another view of retractable hoist ring 2421. Retractable hoist ring 2421 is preferably a U-shaped ring which is inserted into the top of hollow arched body 2101. The hoist ring 2421 usually stays in the down position, due to gravity, but can be pulled up to allow the user to attach a rope, rope clip, hoist connector, or any other connection device to hoist ring 2421 to hoist it up somewhere if they don't want to use or can't use the back straps. Stoppers 2423 prevent ring 2421 from fully going through hollow arched body 2101 when it is being hoisted. Stoppers 2423 are larger than the hole that ring 2421 is inserted through and so once ring 2421 has gone a certain length it will no longer be able to be pulled out further. These stoppers make sure that ring 2421 will not be pulled out of the system while tank carrier 2100 is being hoisted up.

Figure 52:
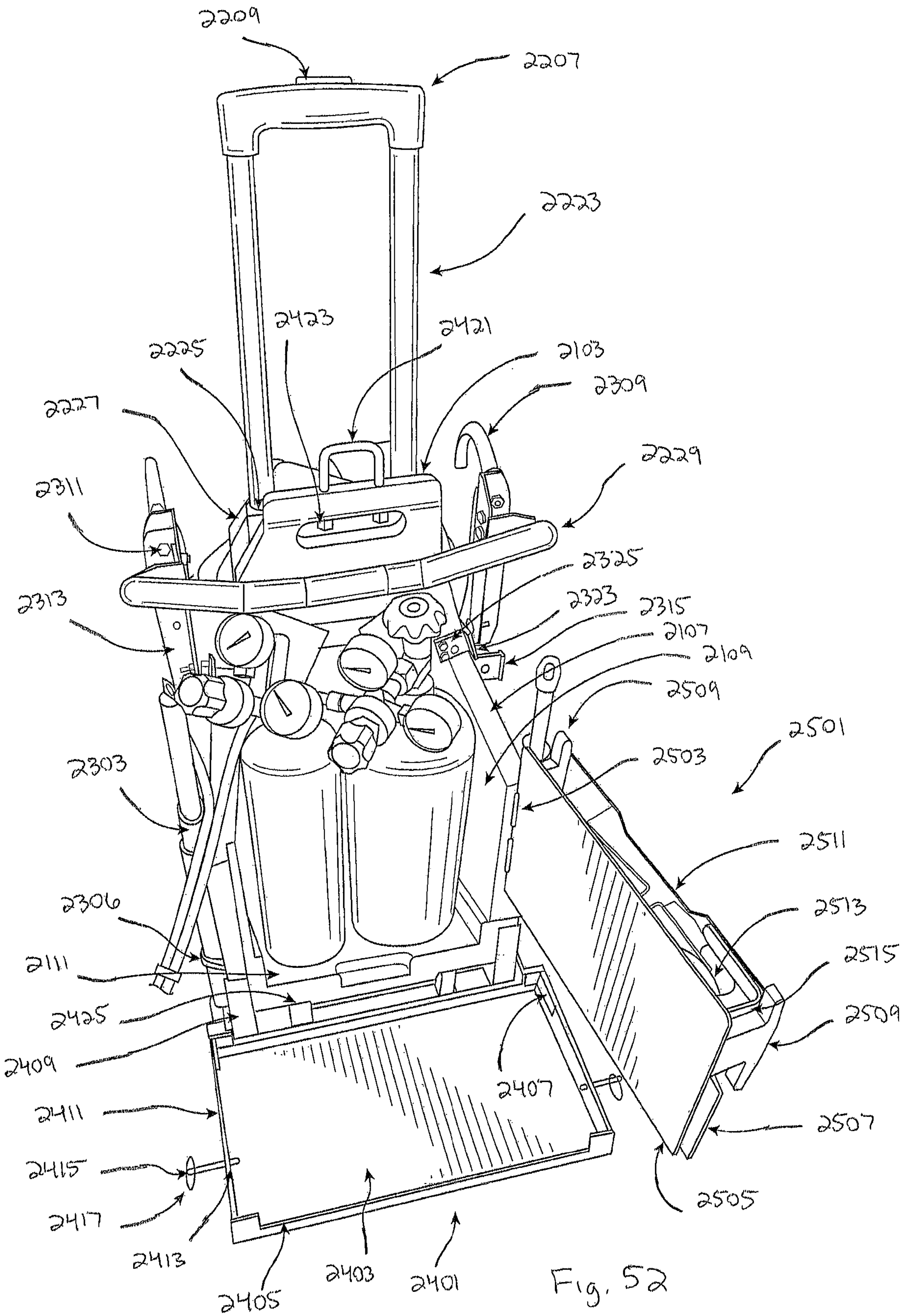
FIG. 52 is a perspective view of the tank carrier of FIG. 46.
Figure 53:
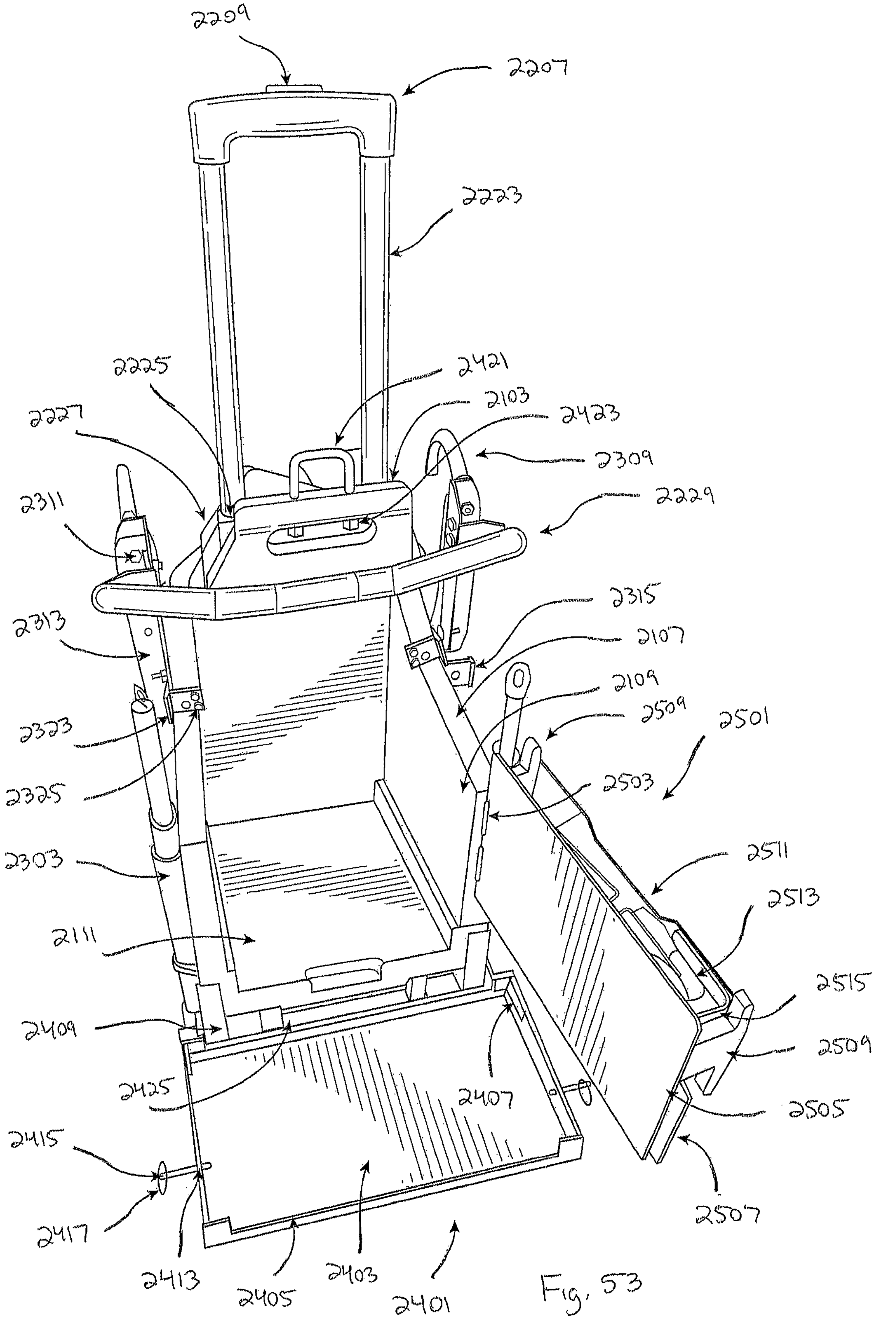
FIG. 53 is a perspective view of the tank carrier of FIG. 46.

Referring now to FIGS. 52 and 53 in the drawings, the perspective front view of tank carrier 2100 is depicted with bottle access door 2501 in the open position. Access door 2501 further comprises hinge 2503, back plate 2505, support plate 2507, T-shaped supports 2509, front plate 2511, tool compartment bottom plate 2513, and tool compartment support 2515. FIG. 52 also shows retractable cradle hinge 2425 which is used to move the retractable tow cradle into the upright and down position. Also, FIG. 52 further depicts tow handle 2207 in the pulled out position giving a view of support bars 2223 being used to provide extra length to the user towing it. Support bars 2223 are usually stored in hollow arched body 2101 and are inserted into tow bar holes 2225 which are at the top of tow bar base 2227 found at the top of tank carrier 2100. FIG. 53 illustrates how tank carrier 2100 would look with access door 2501 in the open position along with tank carrier 2100 not housing any tanks.

Access door 2501 is used to secure tanks that the user is currently carrying in tank carrier 2100 while also allowing the user to access them easily. It is important that the tanks are secured during movement by the user so access door 2501 is used to sandwich the tanks between the door and arched body 2101 to secure them in place when access door 2501 is closed. Also, since access door 2501 can be opened, the user is able to easily change out the tanks that they are carting around without significant delay, or hurt their shoulders or injure themselves from having to pull the bottles straight up and out of a tight carrier.

Back plate 2505 directly comes into contact with tanks when they are secured in tank carrier 2100. Back plate 2505 is connected to arched hollow body 2101 by hinge 2503 which allows the user to open and close it. Connected to the front lower portion of back plate 2505 is support plate 2507 which is used to secure bottle access door to tank carrier 2100. Above support plate 2507, and connected to the front upper portion of back plate 2505, are two T-shaped supports 2509 on both sides of back plate 2505. These supports are used to allow the user to wrap hoses, or other lengths of material, from the tanks or other equipment, around them in order to keep them organized and secured in place.

Attached to the front of the two T-shaped supports 2509 is front plate 2511. Front plate 2511 spans the entire distance between the two supports 2509 but does not span the entire vertical length of these supports. Connected to the bottom of front plate 2511 and the sides of the T-shaped supports 2509 is tool compartment bottom plate 2513. With bottom plate 2513 in this position, combined with front plate 2511 and T-shaped supports 2509, a compartment is formed on the access door which allows a user to place items in it. This is useful if the user is wanting to carry tools or other items with them to the job site and does not have any other room to store them. The user will be able to store them in this cubby formed by these plates which will free up their hands and increase the user's safety while they head to their location. Tool compartment support 2515 spans the sides of the compartment formed and provides support for all the walls forming together.

Referring now also to FIG. 54 in the drawings, a side view of tank carrier 2100 being hoisted up a building ladder via retractable ladder hooks 2309 is illustrated. FIG. 54 depicts how ladder hooks 2309 will be utilized if an individual were to take a break while hoisting tank carrier 2100 up a building ladder. This shows how hooks 2309 engage with the building ladder along with how retractable hoist ring 2421 is used to hoist up tank carrier 2100.

Figure 55:
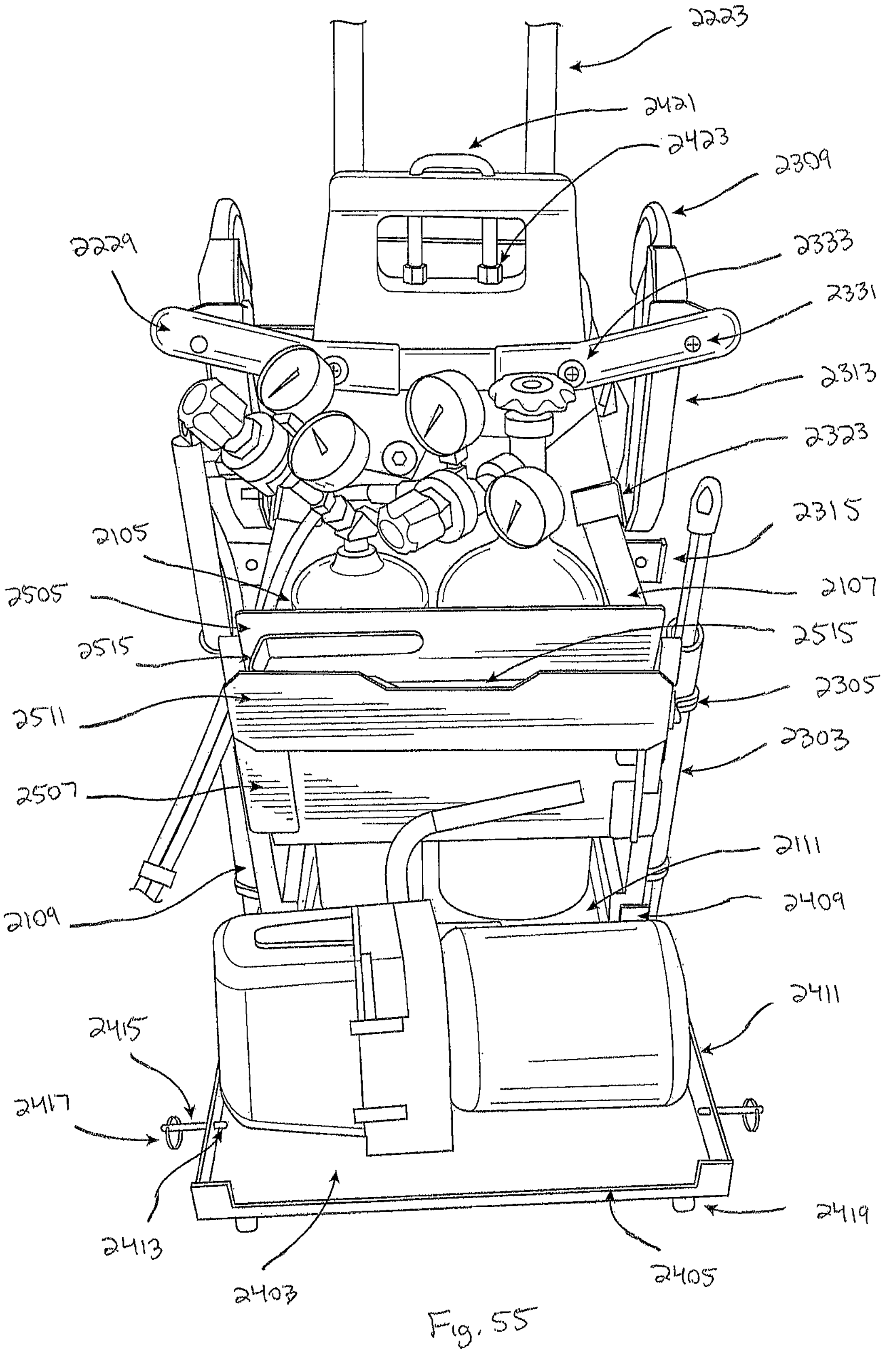
FIG. 55 is a front view of the tank carrier of FIG. 46.

Referring now also to FIG. 55 in the drawings, a front view of tank carrier 2100 is depicted with retractable tow cradle 2401 deployed carrying another object. When deployed, tow cradle 2401 will act as a dolly which will allow the user to cart more objects around with them than they would have before. This figure shows how this would look and how a user would go about doing this.

Figure 56:
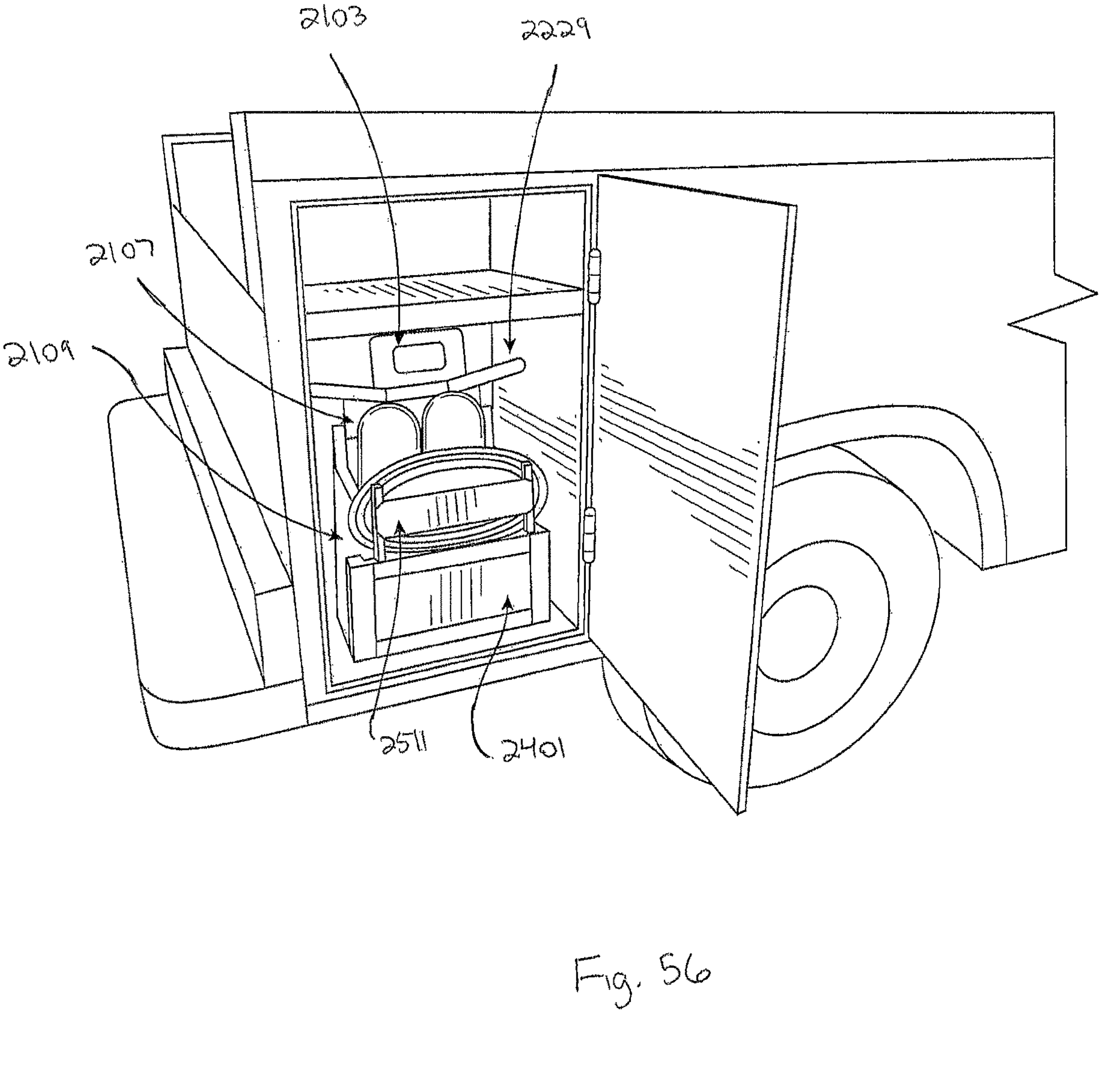
FIG. 56 is a perspective view of the tank carrier of FIG. 46 being stored in a vehicle.

Referring now also to FIG. 56 in the drawings, a perspective front view of tank carrier 2100 being stored in a truck is depicted. It is important that tank carrier 2100 be small and compact so that way it does not take up too much space wherever it is stored. FIG. 56 depicts this by showing tank carrier 2100 being compact and stored in a standard storage compartment that could be found on the side of work trucks.

Figure 57:
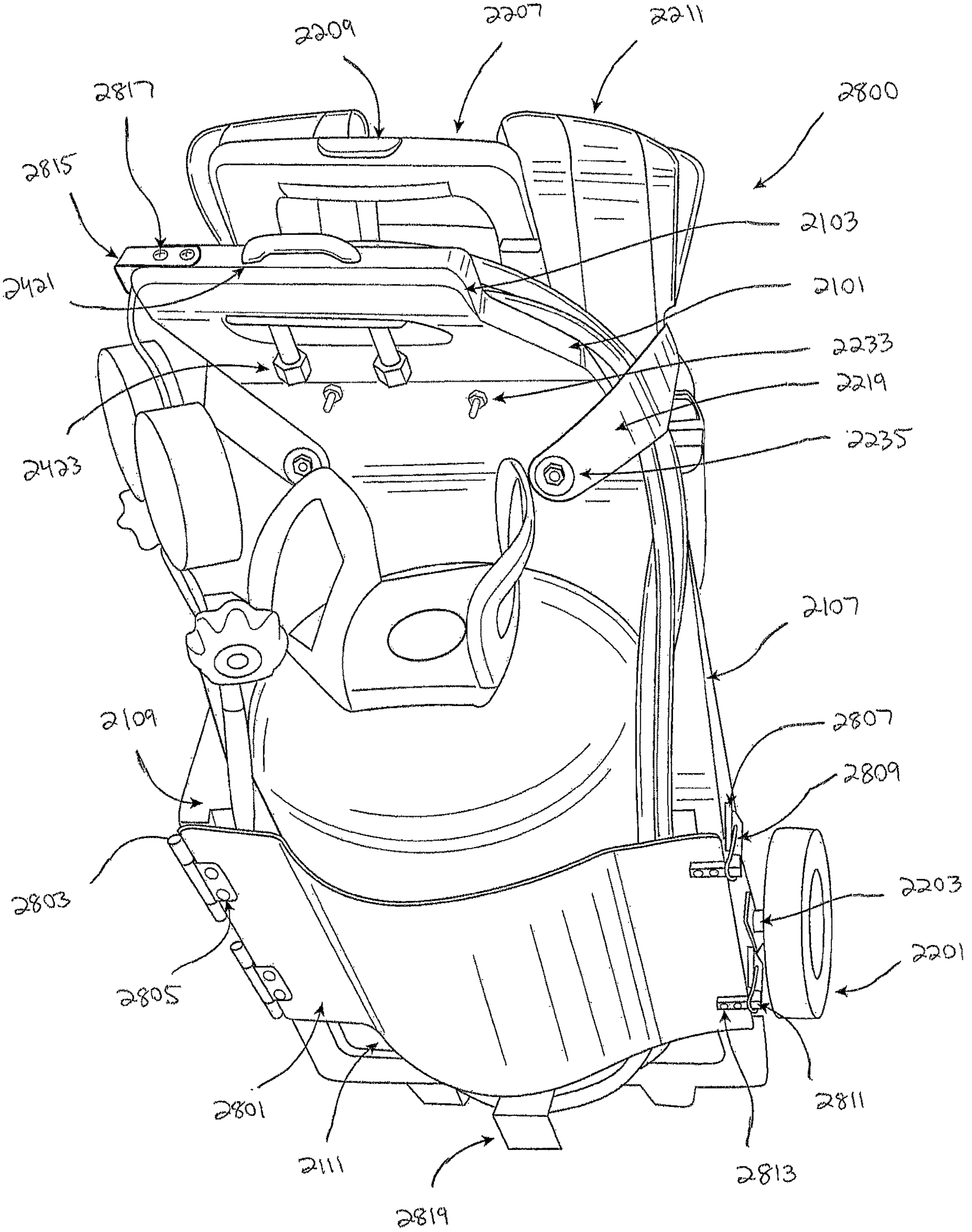
FIG. 57 is a perspective view of a tank carrier, according to an alternative embodiment of the present invention.
Figure 58:
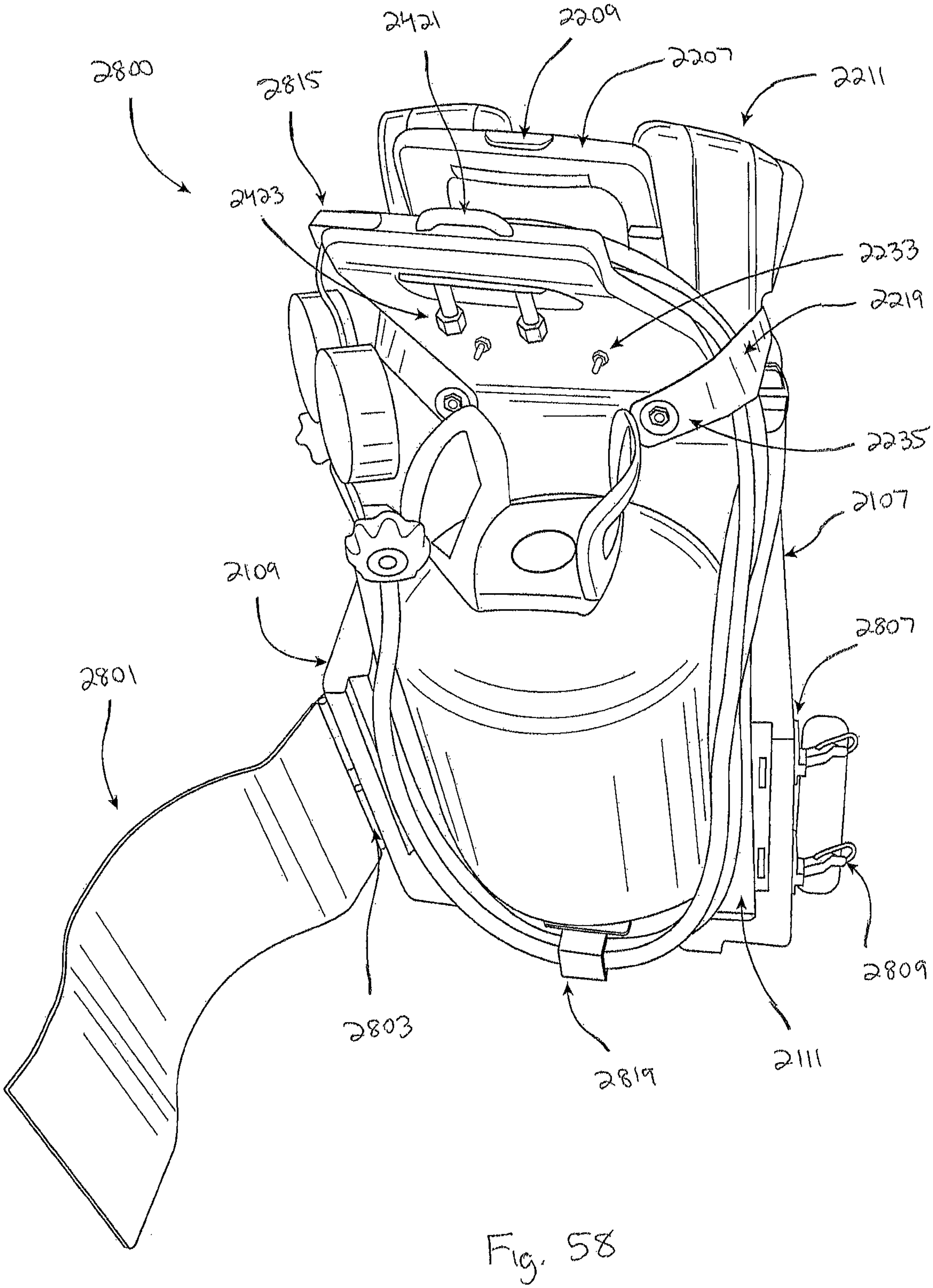
FIG. 58 is a perspective view of the tank carrier of FIG. 57.
Figure 59:
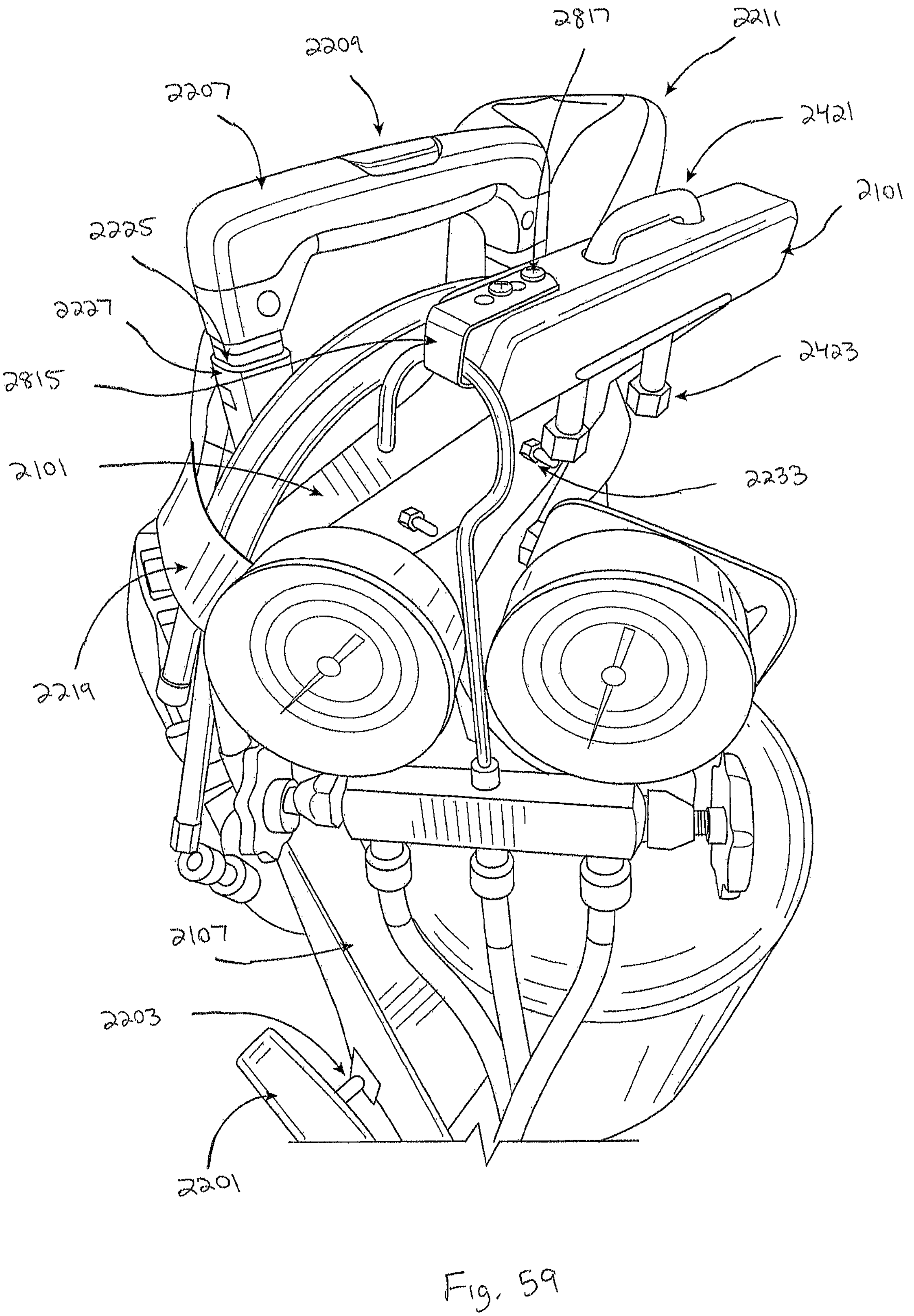
FIG. 59 is a perspective view of the tank carrier of FIG. 57.
Figure 60:
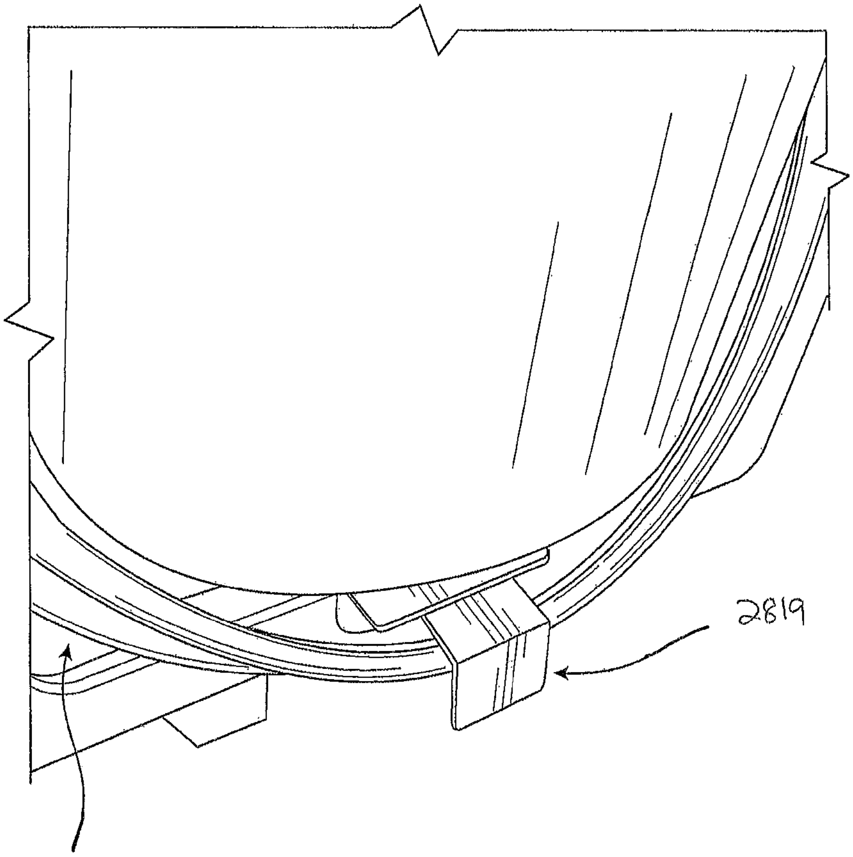
FIG. 60 is a partial perspective view of the tank carrier of FIG. 57.

Referring now also to FIGS. 57-60 in the drawings, an alternative embodiment of a tank carrier is shown. Tank carrier 2800 differs as it is designed to hold a larger, singular tank and changes the design to reflect that. This alternative embodiment comprises parts from the previous embodiment along with bottle access door 2801, hinge 2803, hinge fasteners 2805, base attachment 2807, latch 2809, door attachment 2811, attachment fasteners 2813, hook tab 2815, hook tab fasteners 2817, and hosing tab 2819. It is also noted that this alternative embodiment does not have two handed crossbar double handles 2229, retractable ladder hooks 2309, nor retractable tow cradle 2401. Tank carrier 2800 is preferably used to carry Freon bottles, however, it should be appreciated that alternative items of similar shape and size may also be carried. FIG. 57 also provides a look at back cushion fasteners 2233, and security strap fastener 2235 which are used in all the embodiments to secure the back cushion and security strap to the tank carrier.

Bottle access door 2801 in this embodiment is shaped with a curve in order to accommodate a larger tank, such as but not limited to a Freon tank. These tanks are larger than the tanks that were shown in the original tank carrier 2100 and would likely not have been properly fit in the original. The doors being curved here is designed as such for proper securement of the tanks. Access door 2801 is also slim in order to keep carrier 2800 as compact as it can be. Door 2801 is connected to the left side of hollow arched base 2101 by hinge 2803 which is fastened to door 2801 and base 2101 by hinge fasteners 2805. On the right side of the hollow arched base 2101 is base attachment 2807 connected directly to base 2101 which has latch 2809 fastened to it. This latch is used to secure bottle access door 2801 in place during movement by latching onto door attachment 2811 which is fastened to the door by fasteners 2813. This works to secure door 2801 while the carrier is in motion.

At the top of tank carrier 2800, next to where retractable hoist ring 2421 is located, hook tab 2815 is protruding to the left of the carrier. This tab is fastened to the top of arched hollow body 2101 by tab fasteners 2817. Hook tab 2815 is a metal bar that extends from the top of hollow body 2101 out to the side before coming back down and connecting back to hollow body 2101 so as to leave a gap for a hook, or other apparatus used to hold objects, to be inserted there. Hook tab 2815 is there so the user can secure gauges, hoses, and other tank equipment during transportation and storage. At the bottom of hollow body 2101 is hosing tab 2819 which can be used by the individual using tank carrier 2800 to wrap around the hosing of the tank to secure it in place during movement. Hosing tab 2819 accommodates the role that access door 2501 allowed for in tank carrier 2100 by giving the user a location to wrap their hosing around in a secured fashion.

Figure 61:
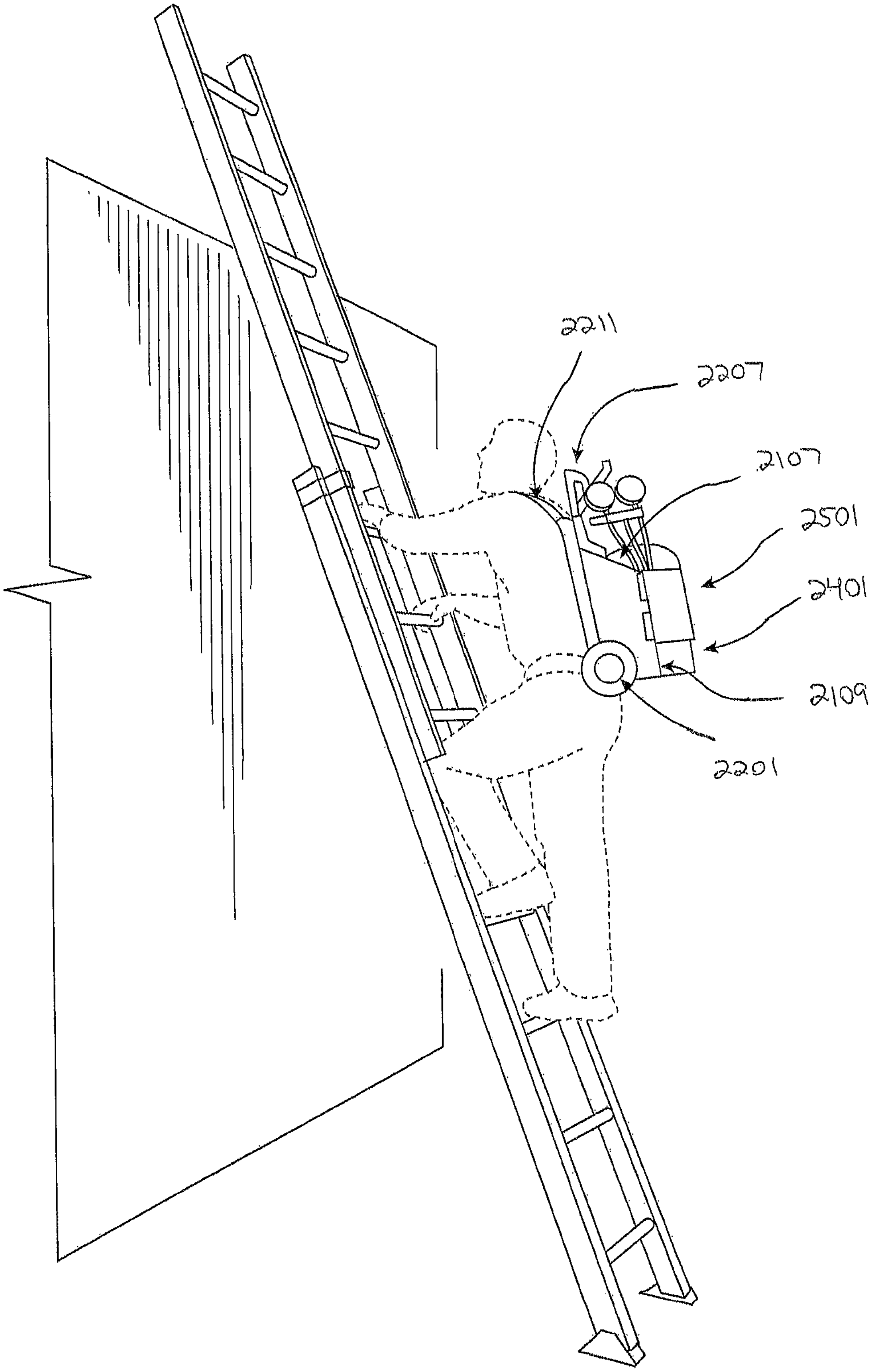
FIG. 61 is a perspective view of the tank carrier of FIG. 57 being carried by a person.

Referring now also to FIG. 61 in the drawings, a side view of tank carrier 2800 is depicted being carried on an individual's back while they are climbing an extension ladder. One of the major parts of tank carrier 2800 is that the user will be able to carry it on their back using the straps there. FIG. 61 shows how this would look on an individual if they were carrying it up an extension ladder in this fashion.

Figure 62:
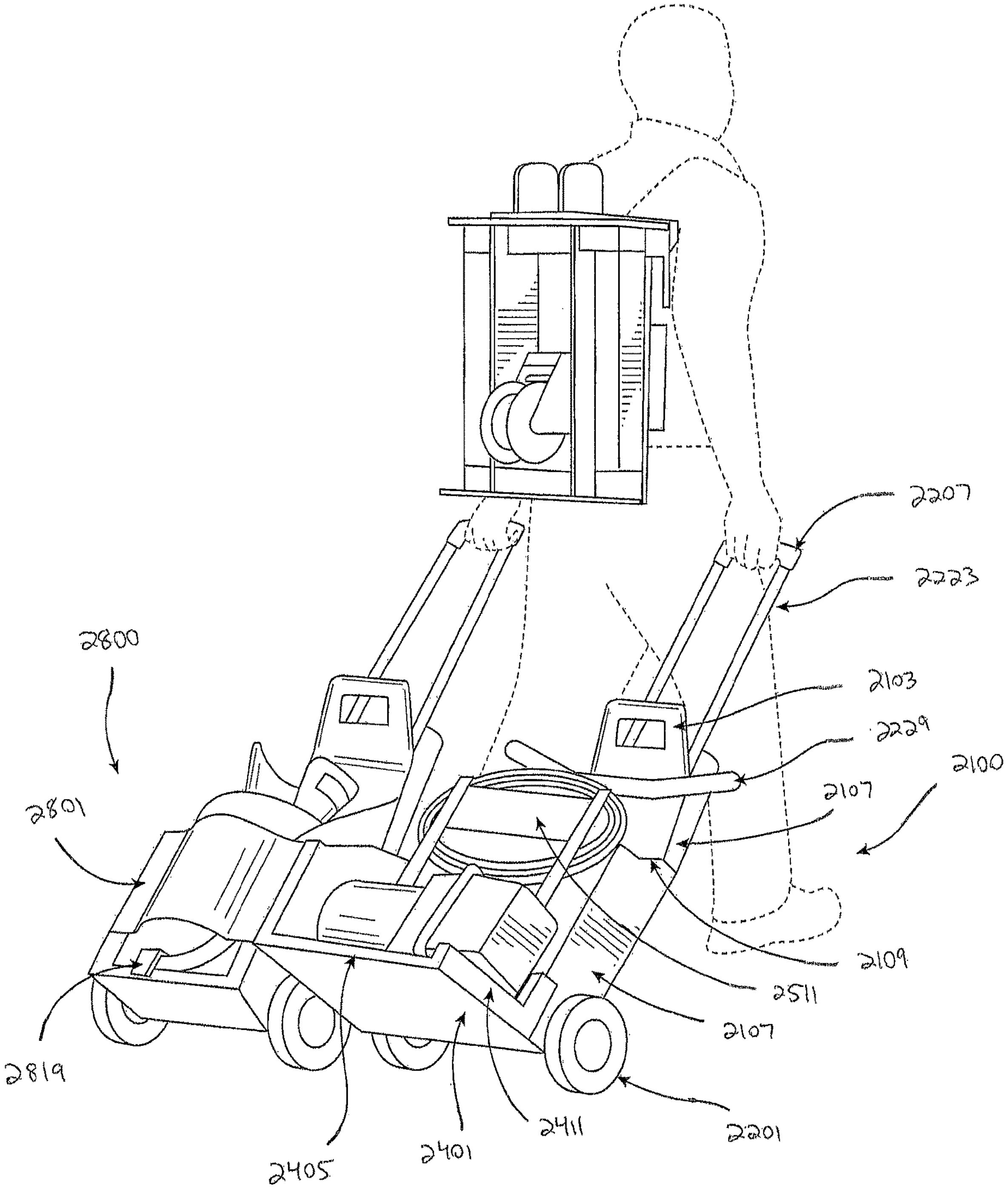
FIG. 62 is a perspective view of the tank carrier of FIG. 57 being pulled by a person.

Referring now also to FIG. 62 in the drawings, a perspective back view of tank carrier 2100 and tank carrier 2800 being pulled by an individual by their tow handle 2207 is depicted. Tow handle 2207, in conjunction with wheels 2201 is an important aspect as it allows the user to use one hand to tow the entire tank carrier around with them. As shown in FIG. 62 as well, when the user utilizes this they will be able to tow a tank carrier in each hand which decreases the amount of trips the user would need to take.

Figure 63:
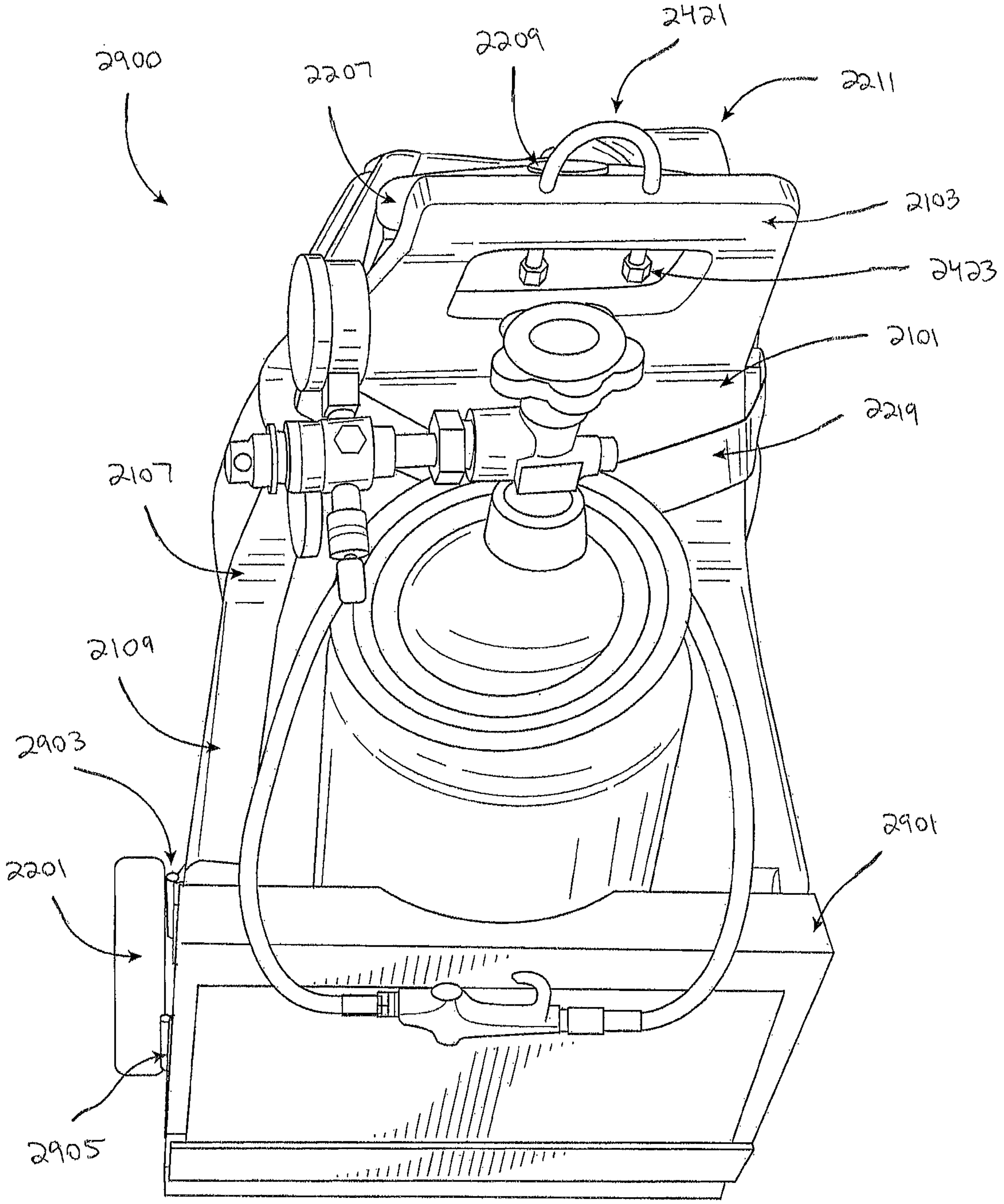
FIG. 63 is a perspective view of a tank carrier according to an alternative embodiment of the present invention.
Figure 64:
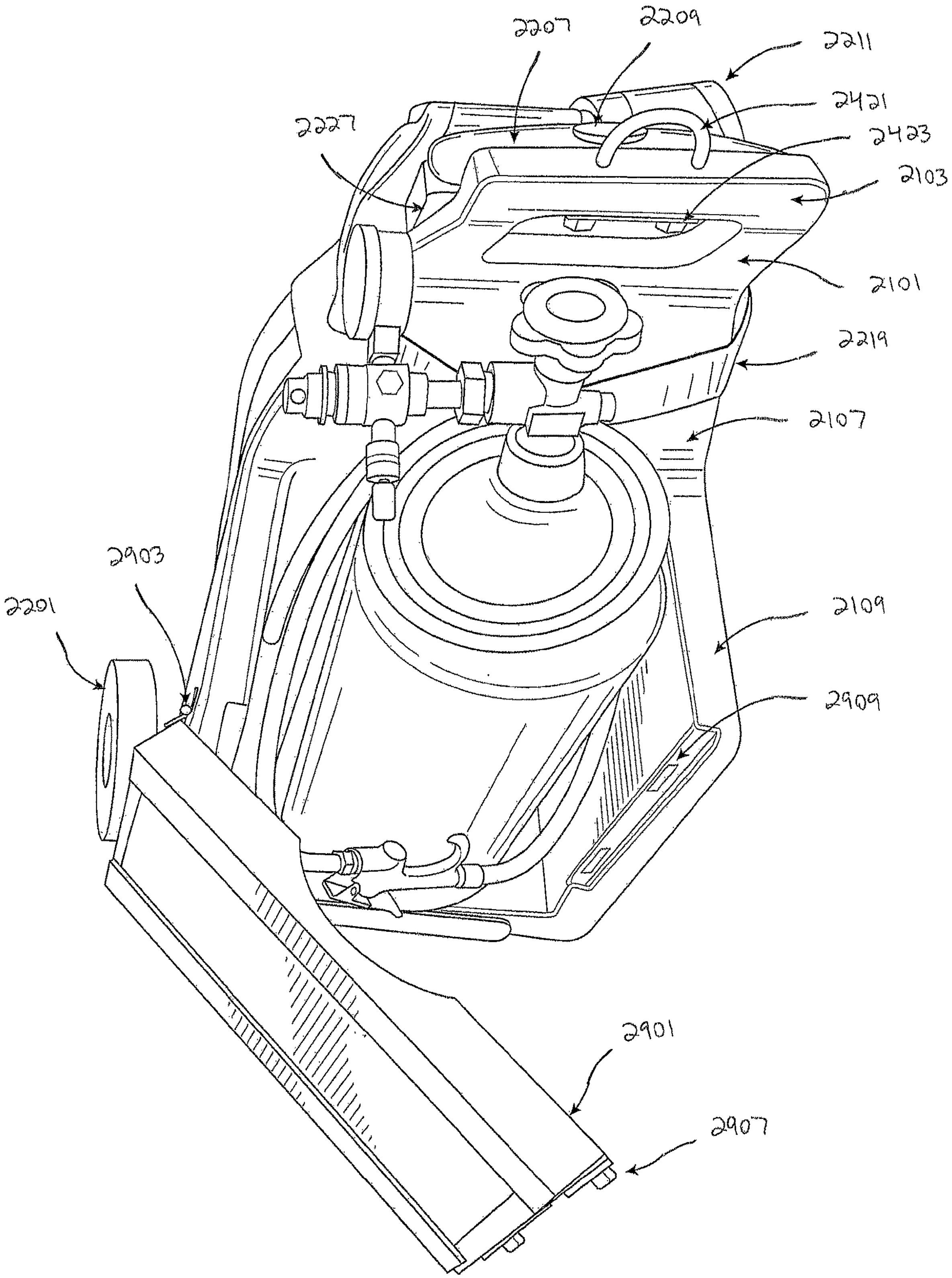
FIG. 64 is a perspective view of the tank carrier of FIG. 63.

Referring now also to FIGS. 63 and 64 in the drawings, another alternative embodiment of a tank carrier is shown. Like the embodiment in FIG. 57, tank carrier 2900 does not have two handed crossbar double handles 2229, retractable ladder hooks 2309, nor retractable tow cradle 2401. In this figure, the modifications that can be seen is access door 2901, access door hinge 2903, hinge fasteners 2905, locking inserts 2907, and insert housing 2909. Tank carrier 2900 is used to carry, but is not limited to carrying, nitrogen bottles.

As was mentioned in the previous alternative embodiment, tank carrier 2900 is designed for situations where the tank carrier is too large for the previous tank carrier 2100. The tank in this situation is not as round as the one in FIG. 57, however, it is still too large for tank carrier 2100. Unlike the door in FIG. 57, access door 2901 is not curved and is straight along its outside length. The inside length of door 2901 is curved to fit the dimensions of the tank used. Using this method will keep the tank securely fixed in position when tank carrier 2900 is in movement. Door 2901 is also thicker than previous embodiments which allows it to be straight on its outside face but curved inward on the inward face. Like tank carrier 2800, tank carrier 2900 also uses a hinge connecting door 2901 to arched hollow base 2101 that is secured to both object by hinge fasteners 2905. Unlike tank carrier 2800, connecting door 2901 is secured in the closed position by locking inserts 2907, found on the side of door 2901, inserting into insert housing 2909 found on arched hollow base 2101. Once inserted, access door 2901 will be secured and will not come loose.

Figure 65:
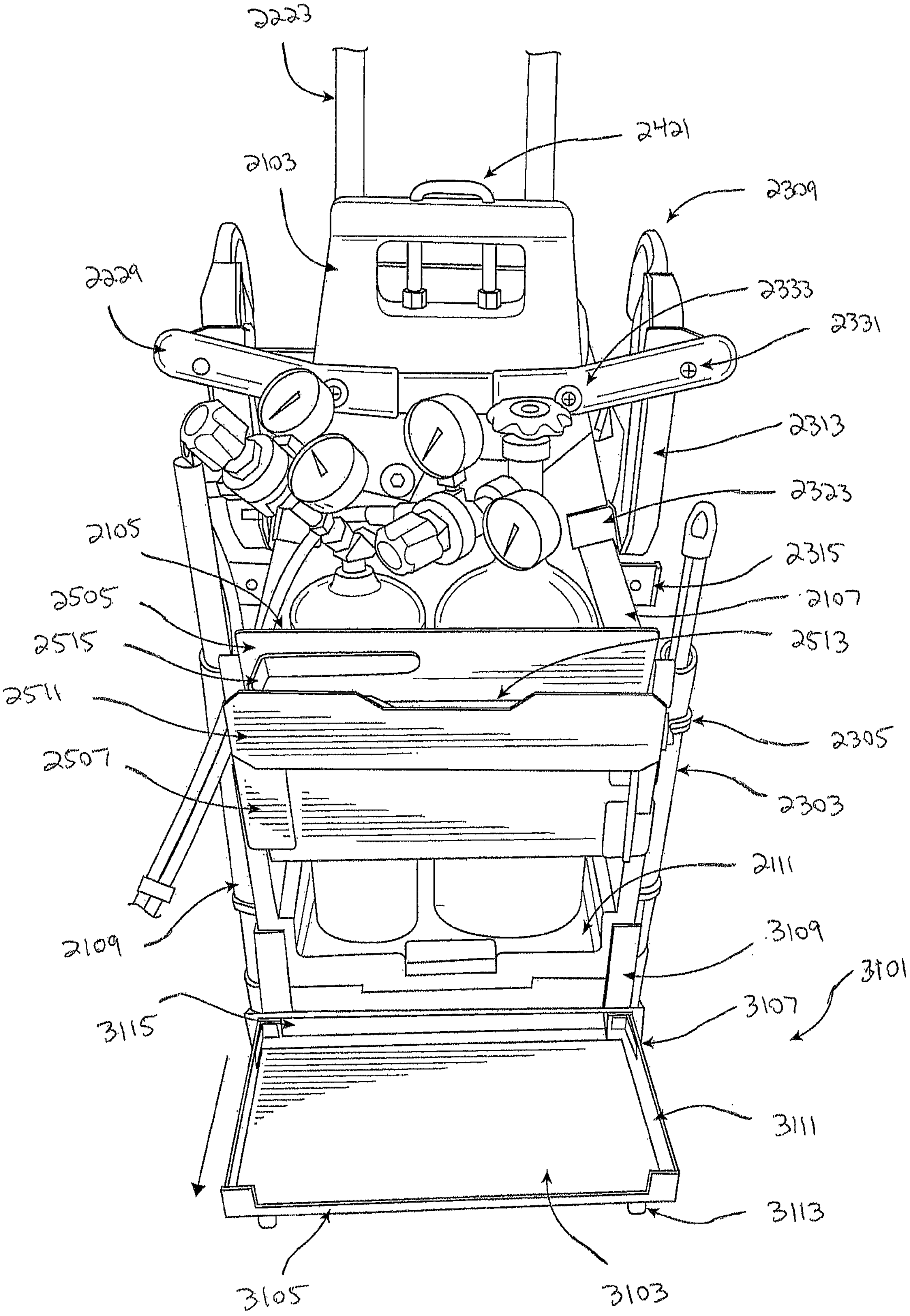
FIG. 65 is a perspective view of a tank carrier according to an alternative embodiment of the present invention.

Referring now also to FIG. 65 in the drawings, a perspective front view of an alternative embodiment of a tank carrier is depicted. This alternative embodiment, hereinafter carrier 3100, shares a majority of its structure with tank carrier 2900. The main difference is that carrier 3100 is designed to carry other objects that are not tanks, such as, but not limited to, tools, compressors, motors, or other objects. Carrier 3100 has slide out dolly 3101 which is comprised of base 3103, crenellated walls 3105, L support 3107, base fastener 3109, side walls 3111, support legs 3113, and slide out housing 3115. Slide out dolly 3101 functions the same as retractable dolly 2401 but instead the user will be able to slide dolly 3101 out of housing 3115 when they wish to use it instead of taking out pins to put it in the down position.

It is apparent that an invention with significant advantages has been described and illustrated. Although the present application is shown in a limited number of forms, it is not limited to just these forms, but is amendable to various changes and modifications without departing from the spirit thereof.

What is claimed is:

1. A ladder hoist comprising:
- a removable carrier casing, comprising:
  - a first set of side walls;
  - a first top portion; and
  - a dolly, comprising:
    - a pair of straight end walls;
    - a straight back wall;
    - a segmented front wall;
    - a segmented side support;
    - at least one support cube; and
    - at least one support tab;
- a winch casing, comprising:
  - a second set of side walls;
  - a second top portion; and
  - a base; and
- at least one fastener pin connecting the removable carrier casing and the winch casing.

2. The ladder hoist according to claim 1, wherein the removable carrier casing further comprises:
- a tow handle;
- at least one wheel attached to at least one side wall of the first set of side walls;
- at least one support plate; and
- at least one horizontal support bar.

3. The ladder hoist according to claim 2, wherein the tow handle comprises:

a handle;

at least one handle bar;

at least one handle support plate; and at least one handle bar stopper.

4. The ladder hoist according to claim 1, wherein the winch casing comprises:

a winch;

a winch strap;

a retractable boom;

a side plate; and a hinge;

wherein there is a linear and nonlinear groove in the side plate;

wherein there is a winch strap edge support attached to an end of the retractable boom;

wherein there is at least one support bar connecting the retractable boom to the second top portion of the winch casing; and wherein a hook is attached at an end of the winch strap.

5. The ladder hoist according to claim 4, wherein the winch comprises:

a winch support base;

at least one support bar;

at least one gear;

an axle;

at least one winch plate;

a handle; and a security bar;

wherein the handle is attached to winch support base, such that operation of the handle turns the at least one gear; and wherein the winch strap is wrapped around the axle when not in use.

* * * * *